US012610064B2

(12) United States Patent
Park et al.

(10) Patent No.: US 12,610,064 B2
(45) Date of Patent: *Apr. 21, 2026

(54) IMAGE ENCODING/DECODING METHOD AND APPARATUS

(71) Applicant: University-Industry Cooperation Group of Kyung Hee University, Yongin-si (KR)

(72) Inventors: Gwang Hoon Park, Seongnam-si (KR); Dae Young Lee, Ansan-si (KR); Tae Hyun Kim, Hwaseong-si (KR)

(73) Assignee: University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,270

(22) Filed: Dec. 24, 2024

(65) Prior Publication Data

US 2025/0133222 A1 Apr. 24, 2025

Related U.S. Application Data

(63) Continuation of application No. 16/354,331, filed on Mar. 15, 2019, now Pat. No. 12,225,212.

(30) Foreign Application Priority Data

Mar. 15, 2018 (KR) ........................ 10-2018-0030510
Mar. 15, 2018 (KR) ........................ 10-2018-0030511
(Continued)

(51) Int. Cl.
H04N 19/18 (2014.01)
G06T 3/02 (2024.01)
(Continued)

(52) U.S. Cl.
CPC ............... H04N 19/18 (2014.11); G06T 3/02 (2024.01); H04N 19/105 (2014.11);
(Continued)

(58) Field of Classification Search
CPC ...... G06T 3/02; H04N 19/105; H04N 19/109; H04N 19/139; H04N 19/154; H04N 19/18; H04N 19/527; H04N 19/573; H04N 19/70
See application file for complete search history.

(56) References Cited

U.S. PATENT DOCUMENTS

2003/0123738 A1* 7/2003 Frojdh ................. H04N 19/527
375/E7.199
2003/0202594 A1* 10/2003 Lainema .............. H04N 19/109
375/E7.211
(Continued)

FOREIGN PATENT DOCUMENTS

EP           1287702 B1 * 7/2016   ........... H04N 19/137
KR     10-2007-0007380 A     1/2007
(Continued)

OTHER PUBLICATIONS

"Global and Locally Adaptive Warped Motion Compensation in Video Compression"—Sarah Parker, Yue Chen, David Barker, Peter de Rivaz, Debargha Mukherjee; 2017 IEEE International Conference on Image Processing (ICIP), Date of Conference: Sep. 17-20, 2017. (Year: 2017).*
(Continued)

*Primary Examiner* — Mainul Hasan
(74) *Attorney, Agent, or Firm* — NSIP Law

(57) ABSTRACT

There is provided a method of decoding/encoding an image. The method of the present invention includes receiving a transform picture reference skip flag; determining whether the transform picture reference skip flag is on or off; and
(Continued)

$$p = \begin{bmatrix} x \\ y \\ 1 \end{bmatrix} \quad p' = \begin{bmatrix} x' \\ y' \\ 1' \end{bmatrix} \quad p' = M_1 M_2 ... M_n p = Ap \quad M_i = T \text{ or } S \text{ or } R$$

$$A = \begin{bmatrix} a_1 & a_2 & a_3 \\ a_4 & a_5 & a_6 \\ 0 & 0 & 1 \end{bmatrix}$$

$T$ : Translation transform matrix
$S$ : Size transform matrix
$R$ : Rotation transform matrix performing inter prediction on a current block on the basis of the transform picture reference skip flag.

4 Claims, 45 Drawing Sheets

(30) Foreign Application Priority Data

| Mar. 14, 2019 | (KR) | ......................... 10-2019-0029513 |
|---|---|---|
| Mar. 14, 2019 | (KR) | ......................... 10-2019-0029514 |

(51) Int. Cl.

| H04N 19/105 | (2014.01) |
|---|---|
| H04N 19/109 | (2014.01) |
| H04N 19/139 | (2014.01) |
| H04N 19/154 | (2014.01) |
| H04N 19/527 | (2014.01) |

(52) U.S. Cl.
CPC ......... H04N 19/109 (2014.11); H04N 19/139 (2014.11); H04N 19/154 (2014.11); H04N 19/527 (2014.11)

(56) References Cited

U.S. PATENT DOCUMENTS

| 2004/0252230 | A1* | 12/2004 | Winder | .......... H04N 21/440281 348/E7.071 |
|---|---|---|---|---|
| 2005/0094852 | A1* | 5/2005 | Kumar | ................. H04N 19/527 375/E7.114 |
| 2006/0257042 | A1* | 11/2006 | Ofek | ....................... H04N 23/68 382/255 |
| 2010/0215101 | A1* | 8/2010 | Jeon | ..................... H04N 19/583 375/E7.243 |
| 2012/0307155 | A1* | 12/2012 | Gleicher | ................... G06T 3/18 348/580 |
| 2013/0230103 | A1* | 9/2013 | Lim | .................... H04N 19/176 375/240.12 |
| 2014/0233647 | A1* | 8/2014 | Hendry | ................ H04N 19/573 375/240.15 |
| 2016/0182914 | A1* | 6/2016 | Kim | ....................... H04N 19/51 375/240.16 |
| 2016/0227244 | A1* | 8/2016 | Rosewarne | ............ H04N 19/70 |
| 2017/0013279 | A1* | 1/2017 | Puri | ........................ H04N 19/85 |
| 2017/0061582 | A1* | 3/2017 | Lim | ........................ G06F 18/22 |
| 2017/0236257 | A1* | 8/2017 | Wu | ..................... H04N 23/6811 348/208.4 |
| 2018/0220149 | A1* | 8/2018 | Son | ....................... H04N 19/182 |
| 2019/0082179 | A1* | 3/2019 | Ahn | ...................... H04N 19/136 |

FOREIGN PATENT DOCUMENTS

| KR | 10-2010-0015456 | A | 2/2010 |
|---|---|---|---|
| KR | 10-1589334 | B1 | 1/2016 |
| KR | 10-2017-0059422 | A | 5/2017 |
| KR | 10-2017-0059423 | A | 5/2017 |
| WO | WO 2005/109896 | A2 | 11/2005 |
| WO | WO 2010/100672 | A1 | 9/2010 |

OTHER PUBLICATIONS

"Global Motion Segmentation for Mid-Level Representation of Moving Images"—T. Saito; T. Komatsu; Y. Akimoto; Proceedings, International Conference on Image Processing; Date of Conference: Oct. 23-26, 1995. (Year: 1995).*

"Geometric transforms and reference picture list optimization for efficient disparity compensation" - Ricardo J. S. Monteiro, Nuno M. M. Rodrigues and S'ergio M. M. Faria; 2015 International Conference on Image Processing Theory, Tools and Applications (IPTA) (Year: 2015).*

"Disparity Compensation Using Geometric Transforms"—Ricardo J. S. Monteiro, Nuno M. M. Rodrigues, S'ergio M. M. Faria; 2014 3DTV-Conference: The True Vision—Capture, Transmission and Display of 3D Video (3DTV-CON) (Year: 2014).*

"Real-Time Affine Global Motion Estimation Using Phase Correlation and its Application for Digital Image Stabilization"—Sanjeev Kumar, Haleh Azartash, Mainak Biswas, and Truong Nguyen; IEEE Transactions on Image Processing, vol. 20, No. 12 , Dec. 2011. (Year: 2011).*

"Post-Rendering 3D Image Warping: Visibility, Reconstruction, and Performance for Depth-Image Warping"—William R. Mark; Graphics and Image Processing Laboratory, Department of Computer Science, University of North Carolina at Chapel Hill; Apr. 21, 1999 (Year: 1999).*

ITU-T H. 265(Apr. 2013), Series H: Audiovisual and Multimedia Systems Infrastructure of audiovisual services—Coding of moving video/High efficiency video coding.

Gang, et al. "A new video coding scheme using warped reference pictures" *Joint Video Exploration Team (JVET) of ITU-T SG 16 WP 3 and ISO/IEC JTC 1/SC 29/WG 11* 10th Meeting. (Apr. 10-20, 2018). pp. 1-54.

* cited by examiner

FIG. 11

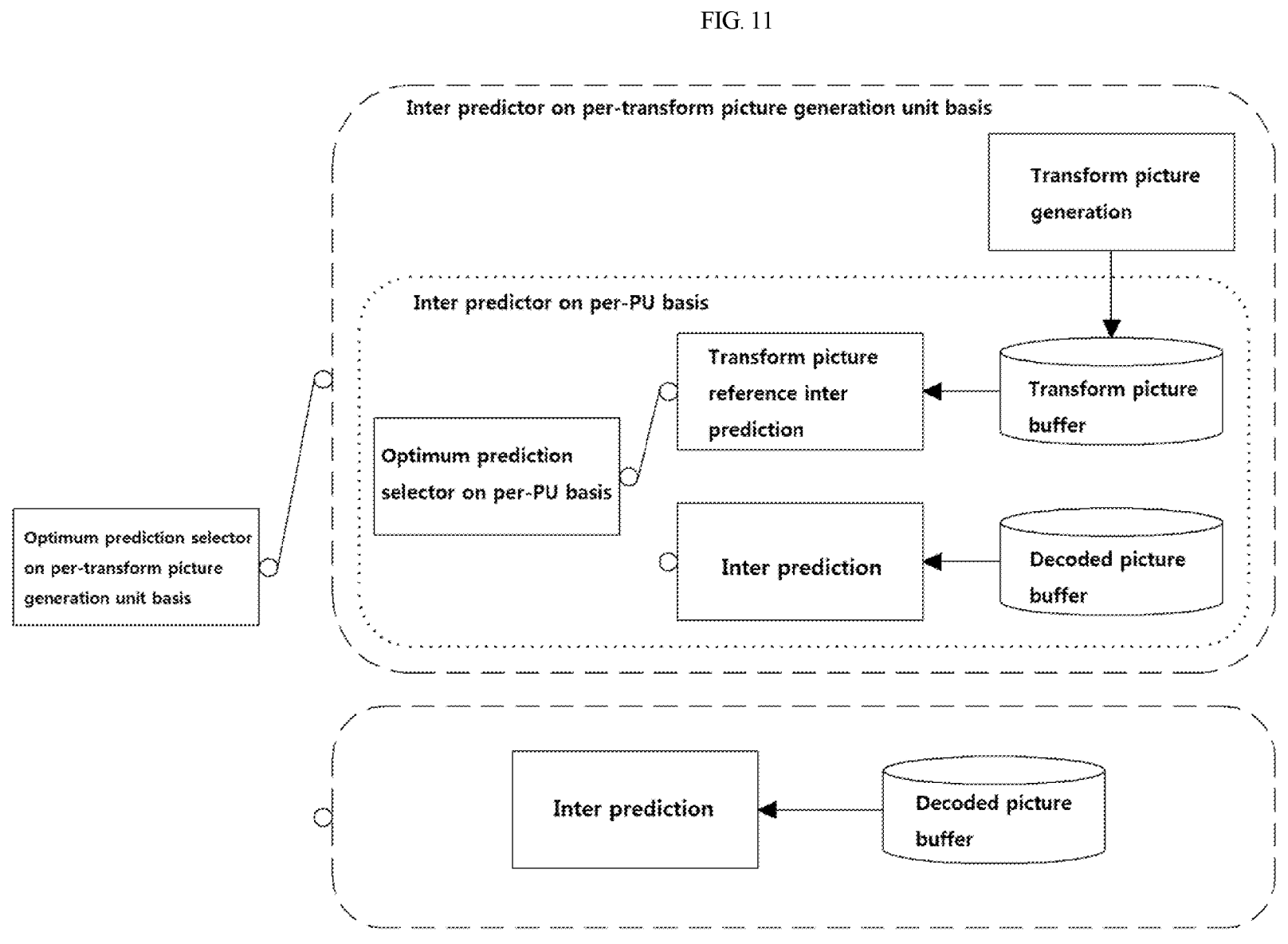

Inter predictor on per-transform picture generation unit basis

Transform picture generation

Transform picture buffer

Decoded picture buffer

Inter predictor on per-PU basis

Transform picture reference inter prediction

Inter prediction

Optimum prediction selector on per-PU basis

Optimum prediction selector on per-transform picture generation unit basis

Decoded picture buffer

Inter prediction

Figure 16A:
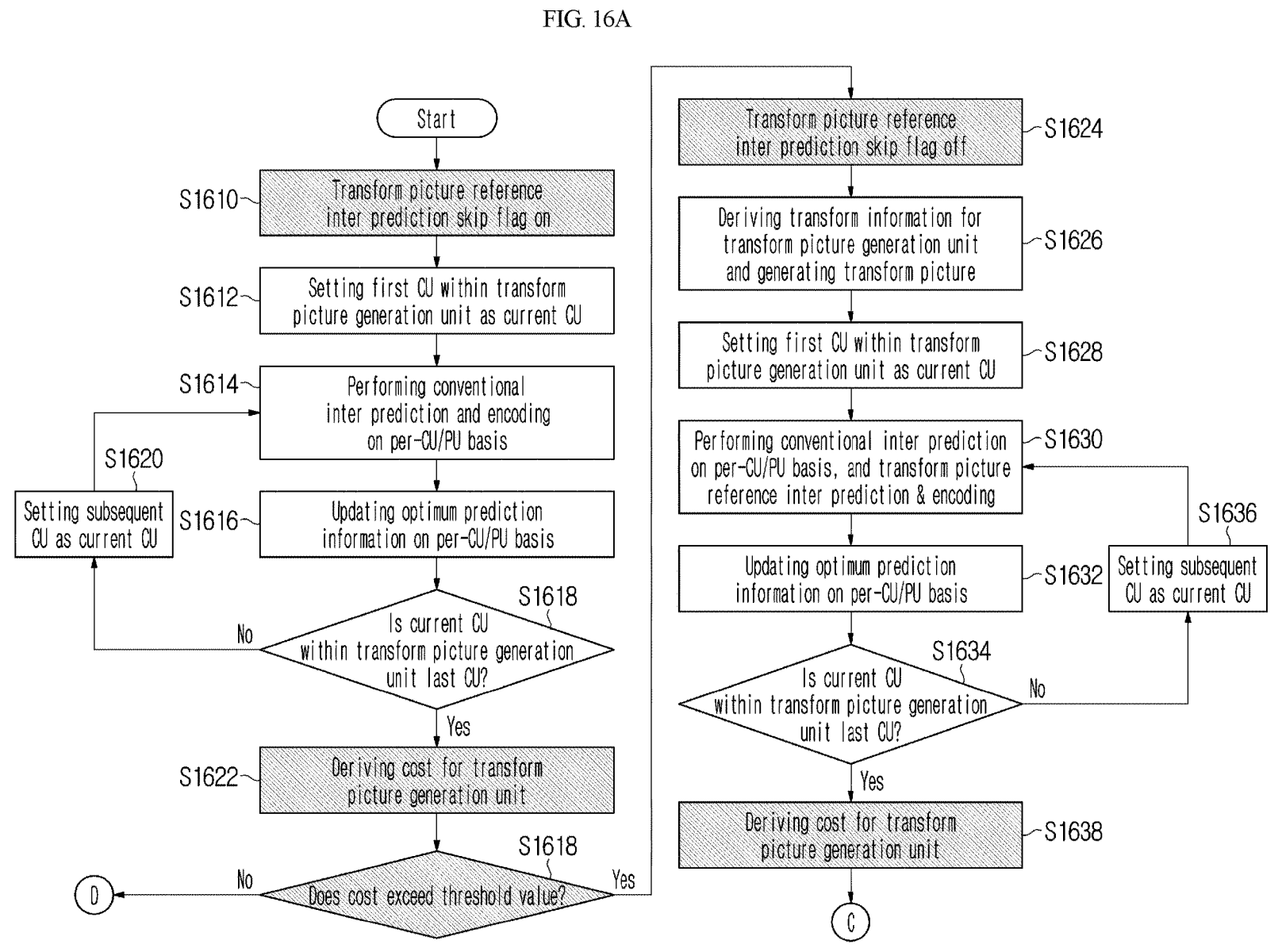

Start

Transform picture reference inter prediction skip flag on — S1610

Setting first CU within transform picture generation unit as current CU — S1612

Performing conventional inter prediction and encoding on per-CU/PU basis — S1614

Updating optimum prediction information on per-CU/PU basis — S1616

Is current CU within transform picture generation unit last CU? — S1618

Setting subsequent CU as current CU — S1620

Deriving cost for transform picture generation unit — S1622

Does cost exceed threshold value? — S1618

Transform picture reference inter prediction skip flag off — S1624

Deriving transform information for transform picture generation unit and generating transform picture — S1626

Setting first CU within transform picture generation unit as current CU — S1628

Performing conventional inter prediction on per-CU/PU basis, and transform picture reference inter prediction & encoding — S1630

Updating optimum prediction information on per-CU/PU basis — S1632

Is current CU within transform picture generation unit last CU? — S1634

Setting subsequent CU as current CU — S1636

Deriving cost for transform picture generation unit — S1638

FIG. 19

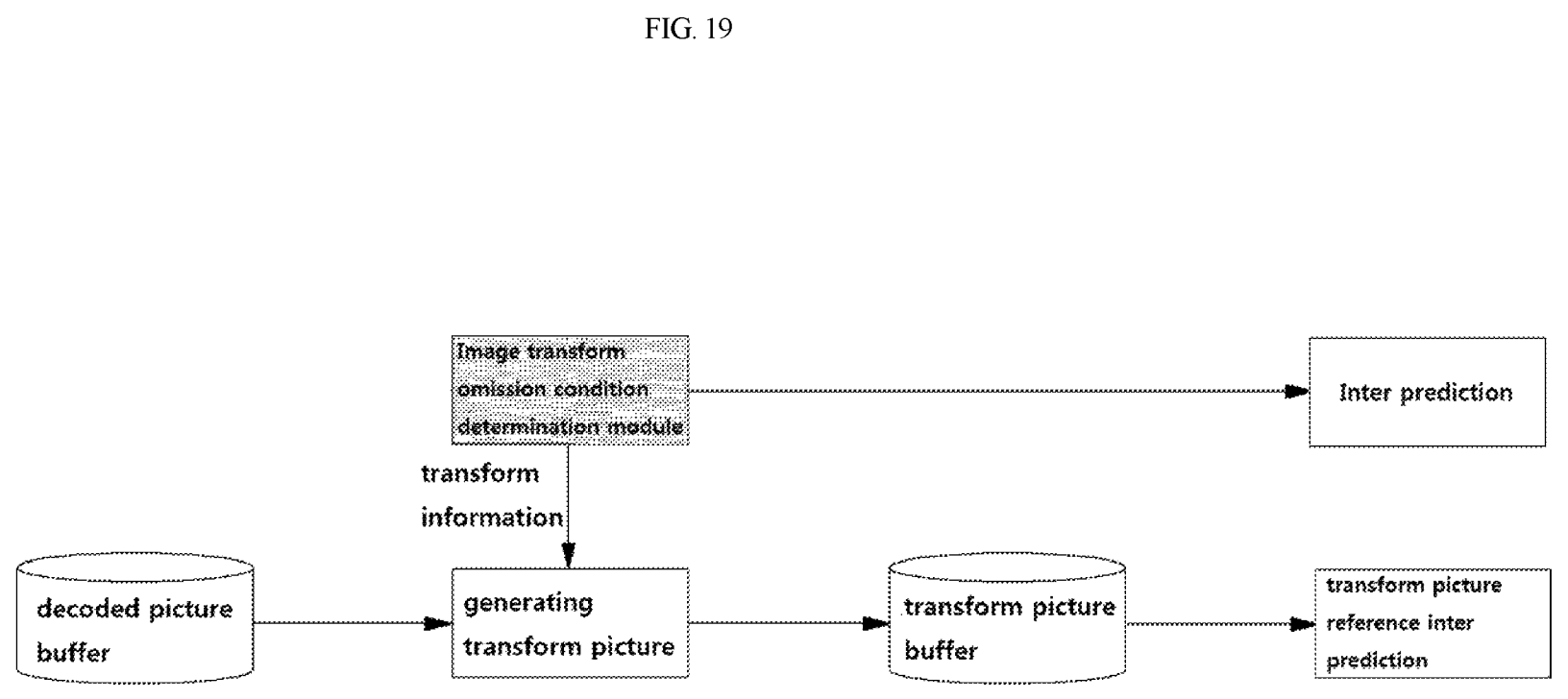

Inter prediction transform picture
reference inter
prediction

Image transform
omission condition
determination module transform
information generating
transform picture transform picture
buffer decoded picture
buffer

FIG. 23A global movement direction of objects(images) in screen photographing area position of camera at time t position of camera at time t+n photographing area position of camera at time t FIG. 23B
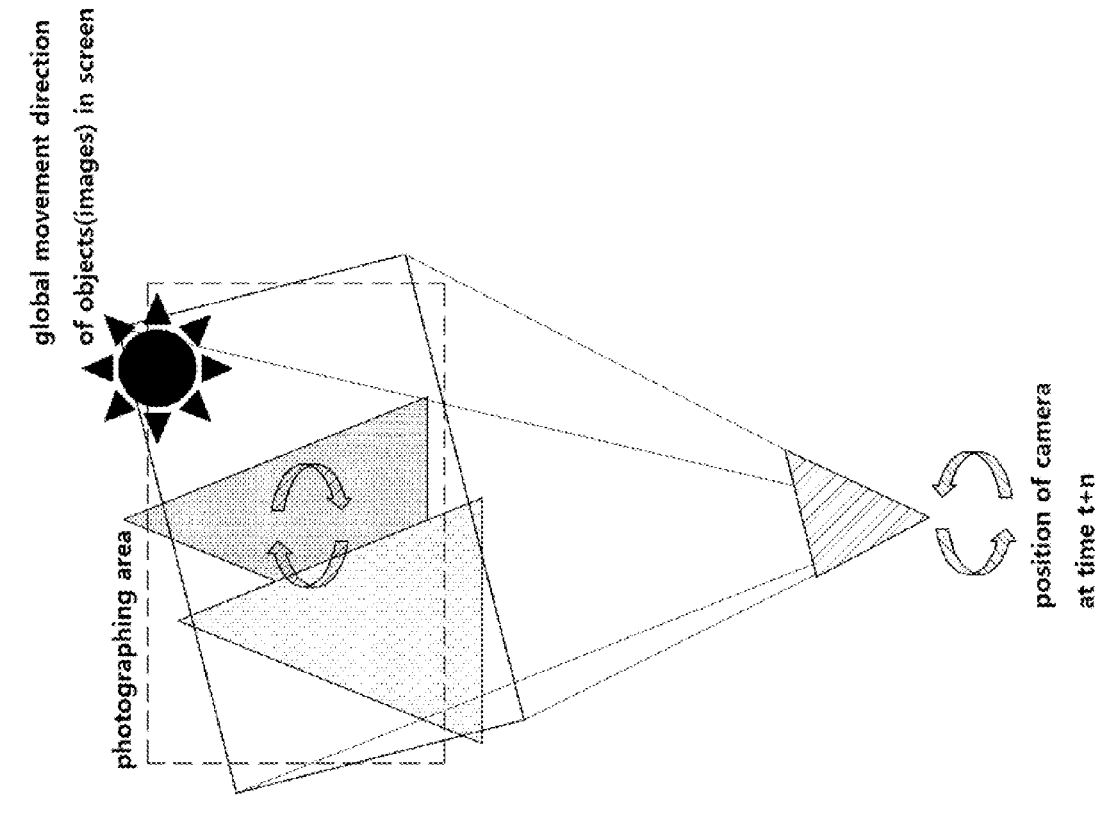
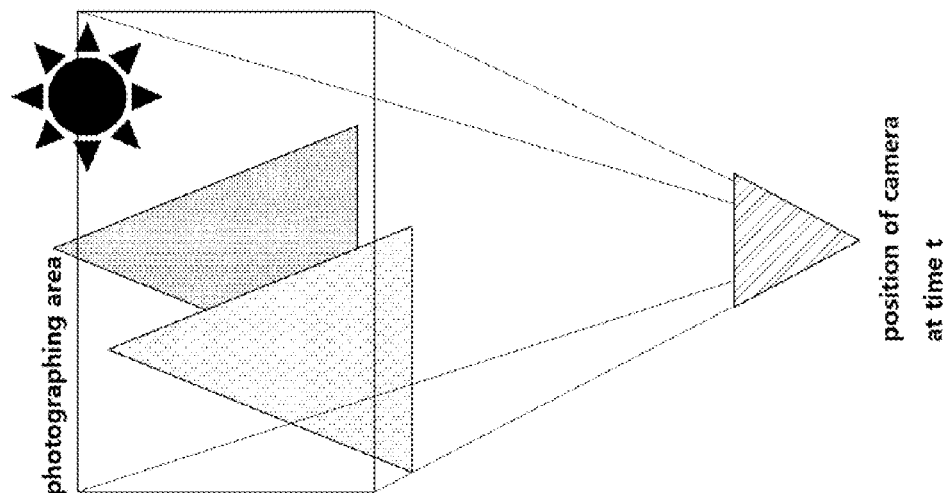

FIG. 23C
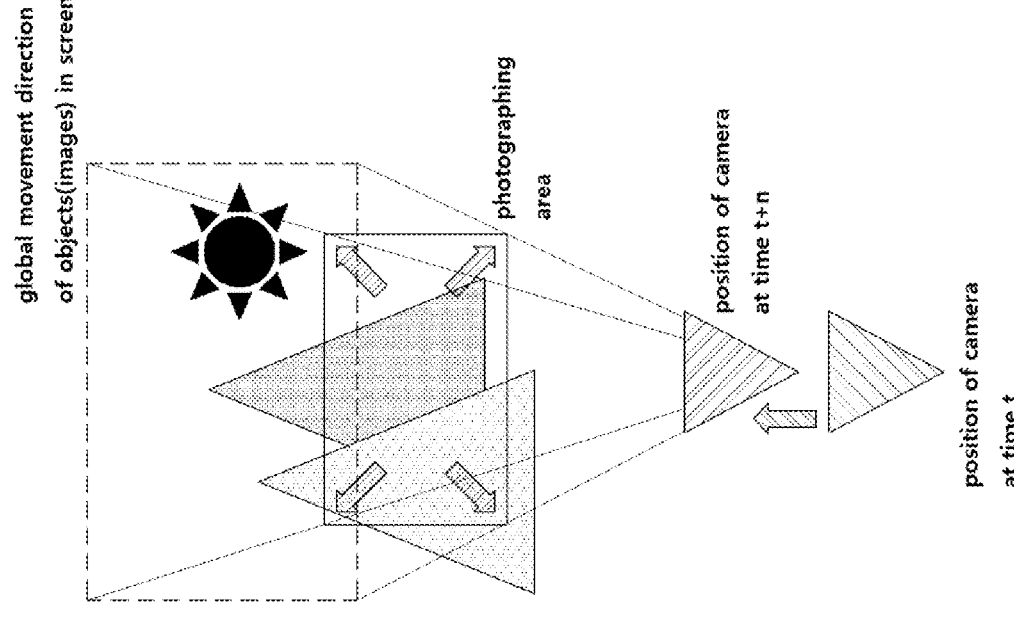
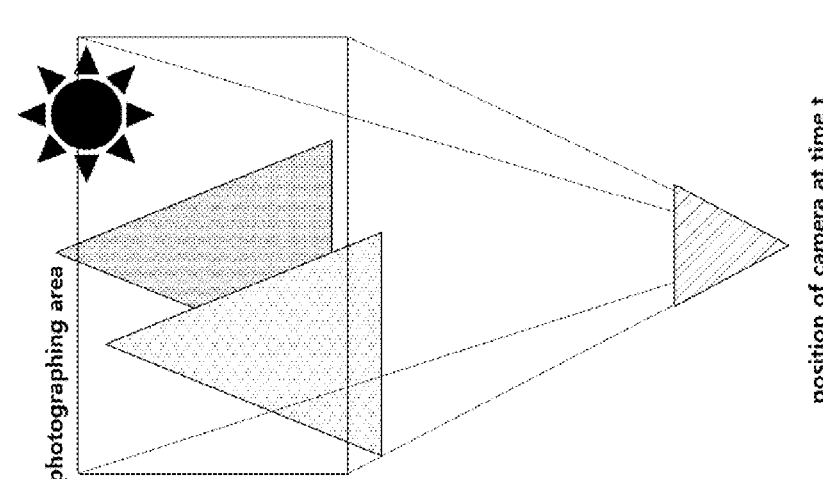

FIG. 23D
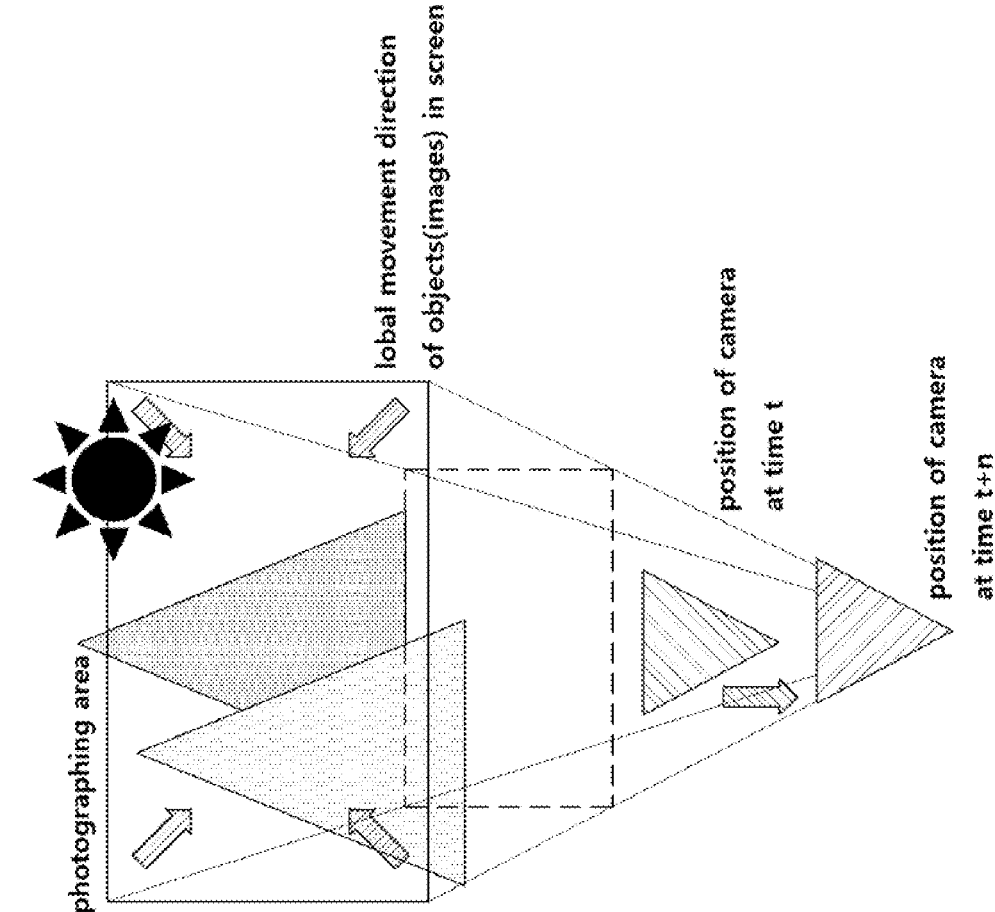
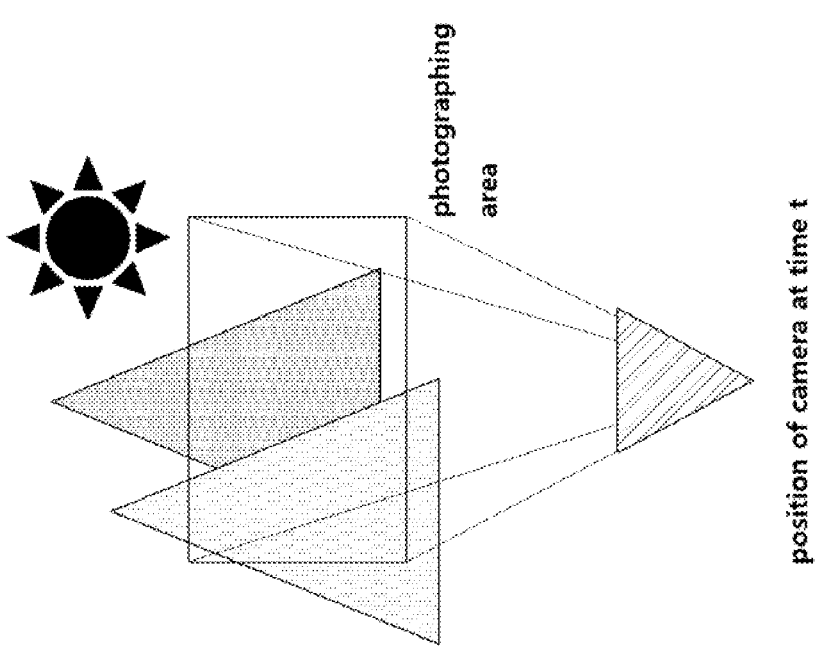

(a) Encoder               (b) Decoder

FIG. 28
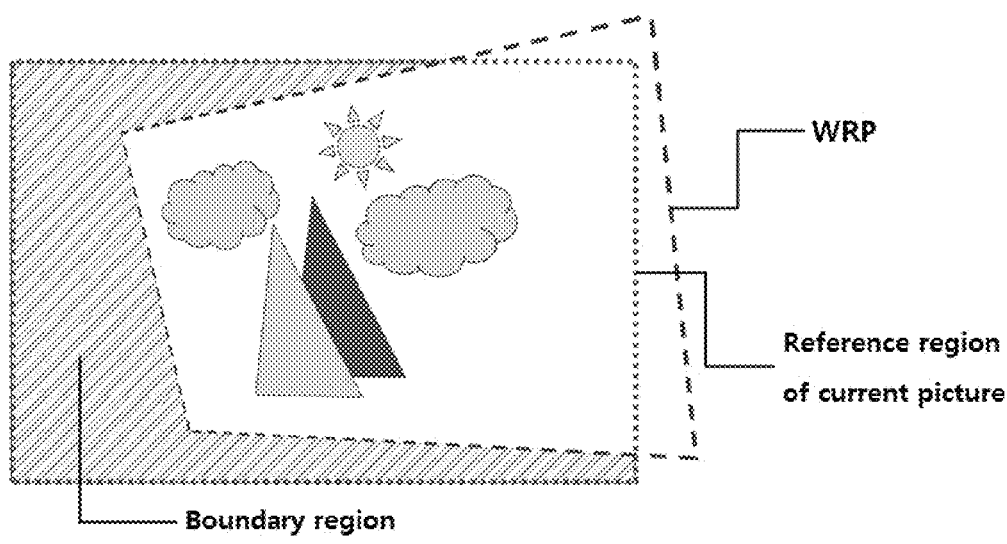
(a) Example of boundary region in WRP
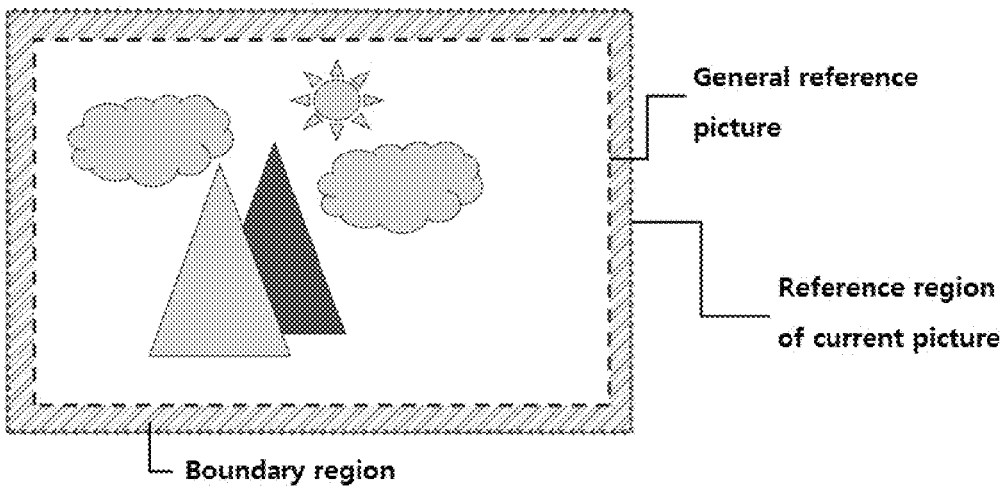
(b) Example of boundary region in general reference picture FIG. 29
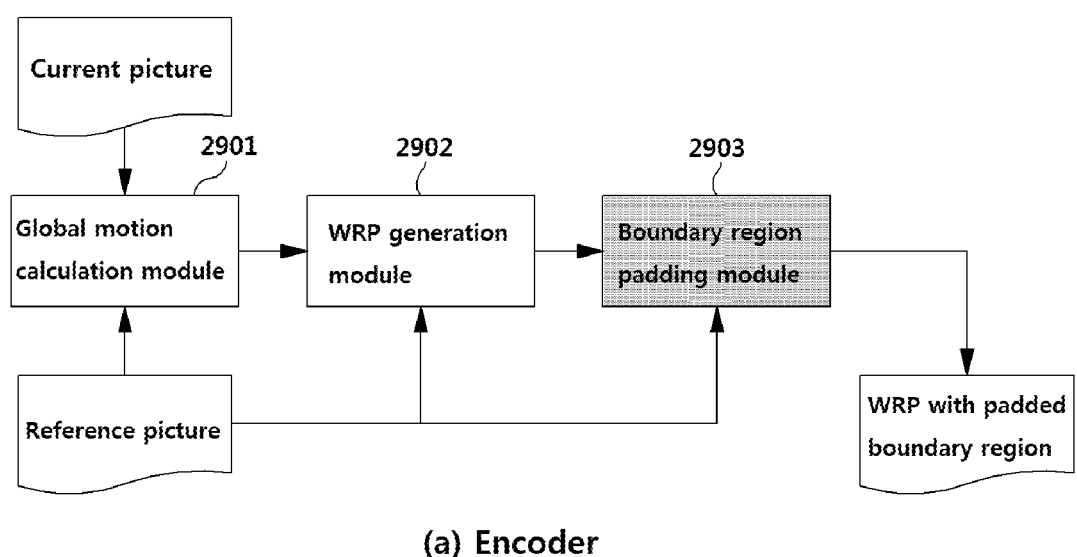
(a) Encoder
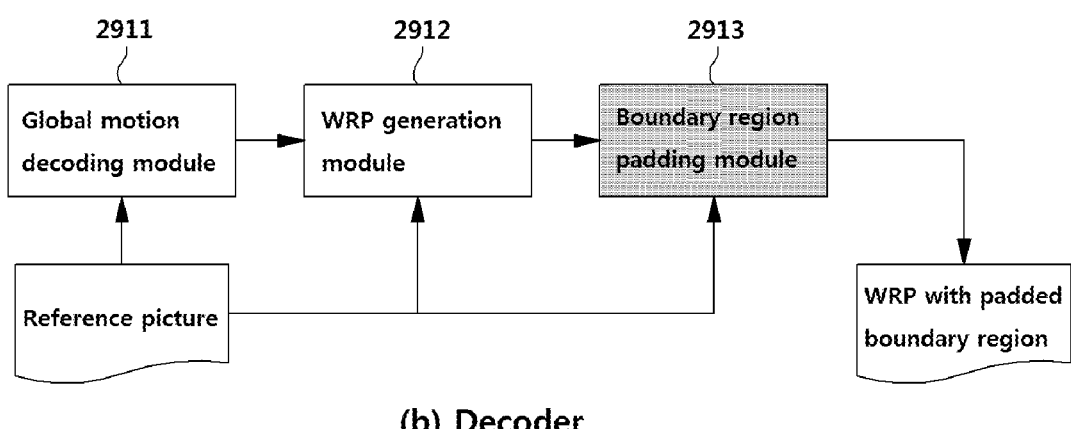
(b) Decoder (a) Encoder                    (b) Decoder (a) Encoder (b) Decoder

FIG. 32

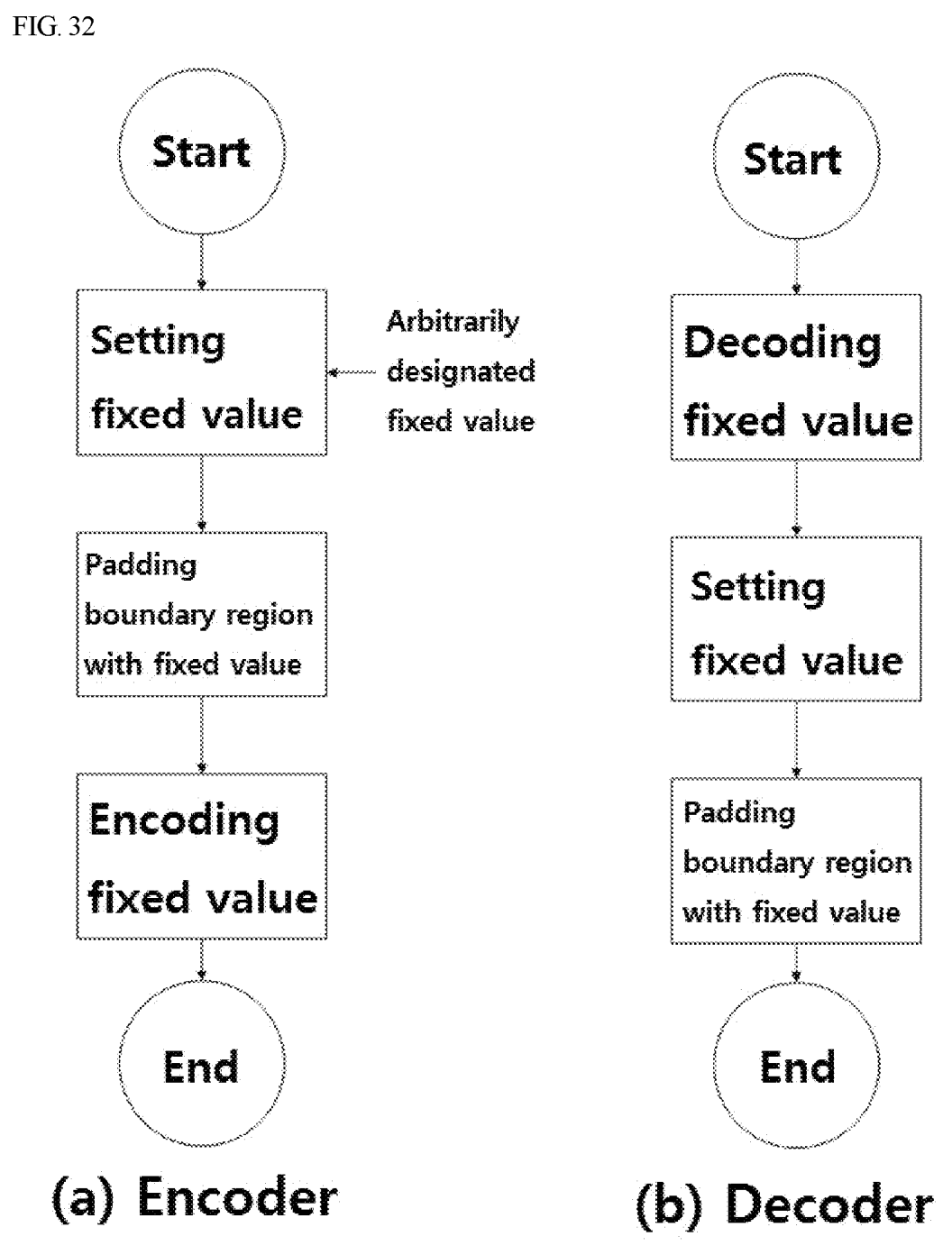

Start

Setting fixed value  ←---- Arbitrarily designated fixed value

Padding boundary region with fixed value

Encoding fixed value

End

(a) Encoder

Start

Decoding fixed value

Setting fixed value

Padding boundary region with fixed value

End

(b) Decoder

(a) Encoder  (b) Decoder (a) WRP A and boundary region of WRP A (b) WRP B and boundary region of WRP B (c) Example of padding boundary region of WRP A with WRP B (a) General reference picture A and boundary region of general reference picture A (b) WRP A and boundary region of WRP A (c) Example of padding boundary region of WRP A with general reference picture A (d) Example of padding boundary region of general reference picture A with WRP A (a) Example of padding boundary region of WRP A with WRP B (b) Example of brightness value correction after padding boundary region of WRP A with WRP B

IMAGE ENCODING/DECODING METHOD AND APPARATUS

CROSS REFERENCE TO RELATED APPLICATION

The present application is a Continuation Application of U.S. patent application Ser. No. 16/354,331, filed on Mar. 15, 2019, which claims priority to Korean Patent Application No. 10-2018-0030510, filed Mar. 15, 2018, Korean Patent Application No. 10-2018-0030511, filed Mar. 15, 2018, Korean Patent Application No. 10-2019-0029513, filed Mar. 14, 2019, and Korean Patent Application No. 10-2019-0029514, filed Mar. 14, 2019 the entire contents of which are incorporated herein for all purposes by this reference.

BACKGROUND OF THE INVENTION

Field of the Invention

The present invention relates to a method and an apparatus for encoding/decoding an image. More particularly, the present invention relates to a method and an apparatus for encoding/decoding an image, the method and the apparatus determining whether to refer to a transform picture considering bit loss.

Description of the Related Art

Recently, demands for multimedia data such as a video have rapidly increased on the Internet. However, the rate at which a bandwidth of a channel develops is difficult keep up with the amount of multimedia data that is also rapidly increasing. As part of this trend, the Video Coding Expert Group (VCEG) of ITU-T and the Moving Picture Expert Group (MPEG) of ISO/IEC, which is the International Organization for Standardization, study video compression standards through steady collaborative research.

Compression of image information may be performed by eliminating temporal and/or spatial redundancy of signals that constitute an image. Inter prediction for eliminating temporal redundancy is a method of compressing an image signal by using, as a prediction region, a similar region between a current image and another image which are temporally different from each other. In inter prediction, a reference picture is searched for a region (hereinafter, referred to as a reference region) similar to a region (hereinafter, referred to as a prediction region) of the original picture, and displacement information between the prediction region and the reference region and a prediction error which is the difference between the prediction region and the reference region are encoded. Thus, when the similarity of the image signal between the original picture and the reference picture is high, the prediction error is reduced, resulting in increase in compression efficiency.

A reference picture of inter prediction may be generated by transforming a picture through image transform. The transformed picture by image transform is referred to as a transform picture. The transform picture may be a picture obtained by deriving motion information of a pixel position between a reference picture and a current picture and geometrically transforming the reference picture by using the derived information. The transform picture and the current picture may have similar pixel distribution. Therefore, when the transform picture is referenced in inter prediction, image compression efficiency is enhanced.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a method and an apparatus for encoding/decoding an image, the method and the apparatus determining a prediction method considering loss caused by additional information, thereby enhancing compression efficiency.

Also, the present invention is intended to propose a method and an apparatus for encoding/decoding an image, the method and the apparatus determining whether to transmit transform information according to whether to refer to a transform picture, thereby enhancing compression efficiency.

Also, the present invention is intended to propose a method and an apparatus for encoding/decoding an image, the method and the apparatus omitting a transform picture generation process according to whether to refer to a transform picture, thereby improving complexity.

Also, the present invention is intended to propose a recording medium storing a bitstream that is generated by the method or apparatus for encoding an image of the present invention.

It is to be understood that technical problems to be solved by the present invention are not limited to the aforementioned technical problems and other technical problems which are not mentioned will be apparent from the following description to a person with an ordinary skill in the art to which the present invention pertains.

A method of decoding an image according the present invention, the method may comprise receiving a transform picture reference skip flag; determining whether the transform picture reference skip flag is on or off; and performing inter prediction on a current block on the basis of the transform picture reference skip flag.

In the method of decoding the image according the present invention, wherein the transform picture reference skip flag is determined for each transform picture generation unit.

In the method of decoding the image according the present invention, wherein the transform picture generation unit is at least one among a picture, a slice, a tile group, and a tile. In the method of decoding the image according the present invention, wherein when the transform picture reference skip flag is on, the inter prediction on the current block is performed referring to a reference picture stored in a reference picture buffer.

In the method of decoding the image according the present invention, wherein when the transform picture reference skip flag is off, the method further comprises: receiving transform information; and generating, on the basis of the transform information, a transform picture from a reference picture stored in a reference picture buffer, wherein the inter prediction on the current block is performed referring to at least one among the reference picture and the transform picture.

In the method of decoding the image according the present invention, wherein the generating of the transform picture comprises performing geometric transform computation on the reference picture by using the transform information.

In the method of decoding the image according the present invention, wherein the transform information is a matrix containing multiple real numbers or integers.

In the method of decoding the image according the present invention, wherein the inter prediction on the current block comprises: receiving prediction information on the current block; selecting, on the basis of the prediction information, one among the reference picture and the transform picture; and performing the inter prediction by referring to the selected picture.

Also, a method of encoding an image according the present invention, the method may comprise calculating a first cost of encoding a transform picture generation unit without referring to a transform picture; calculating a second cost of encoding the transform picture generation unit by selectively referring to the transform picture or a reference picture; comparing the first cost and the second cost; and setting a transform picture reference skip flag on the basis of a result of the comparison.

In the method of encoding the image according the present invention, wherein the transform picture is generated by performing geometric transform computation for the reference picture by using transform information.

In the method of encoding the image according the present invention, wherein when the first cost is smaller than the second cost, the method further comprises: setting the transform picture reference skip flag to on; and performing encoding by containing, in a bitstream, the transform picture reference skip flag and prediction information on the transform picture generation unit.

In the method of encoding the image according the present invention, wherein when the first cost is larger than the second cost, the method further comprises: setting the transform picture reference skip flag to off; and performing encoding by containing, in a bitstream, the transform picture reference skip flag, prediction information on the transform picture generation unit, and the transform information.

In the method of encoding the image according the present invention, wherein the prediction information is determined for each block included in the transform picture generation unit, and includes information for selecting one among the reference picture and the transform picture.

In the method of encoding the image according the present invention, wherein the transform picture reference skip flag is determined by an input of a user or an encoding environment, and one among the calculating of the first cost and the calculating of the second cost is performed on the basis of the determined transform picture reference skip flag.

In the method of encoding the image according the present invention, further comprising: checking whether the first cost exceeds a predetermined threshold value, wherein when the first cost does not exceed the predetermined threshold value, encoding is performed by containing, in a bitstream, the transform picture reference skip flag which is set to on and prediction information on the transform picture generation unit, and the calculating of the second cost; the comparing of the first cost and the second cost; and the setting of the transform picture reference skip flag on the basis of the result of the comparison are not performed.

In the method of encoding the image according the present invention, further comprising: checking whether the first cost exceeds a predetermined threshold value, wherein when the first cost exceeds the predetermined threshold value, the calculating of the second cost; the comparing of the first cost and the second cost; and the setting of the transform picture reference skip flag on the basis of the result of the comparison are performed.

In the method of encoding the image according the present invention, wherein the threshold value is determined on the basis of a predicted number of bits of transform information according to a configuration of the reference picture or to a maximum number of bits that the transform information is able to have.

Also, an apparatus for decoding an image according to the present invention, the apparatus may comprise an image transform omission condition determination module receiving a transform picture reference skip flag and determining whether the transform picture reference skip flag is on or off; and an inter prediction module performing inter prediction on a current block on the basis of the transform picture reference skip flag.

Also, an apparatus for encoding an image according to the present invention, the apparatus may comprise an inter prediction module performing first inter prediction selectively referring to a transform picture and a reference picture or performing second inter prediction referring to only the reference picture; and a transform picture reference omission determination module configured to: calculate a first cost according to the first inter prediction and a second cost according to the second inter prediction; compare the first cost and the second cost; and determine a transform picture reference skip flag on the basis of a result of the comparison.

Also, a computer-readable recording medium according to the present invention may store a bitstream generated by a video encoding method according to the present invention.

According to the present invention, there is provided a method and an apparatus for encoding/decoding an image, the method and the apparatus determining a prediction method considering loss caused by additional information, thereby enhancing compression efficiency. Also, according to the present invention, there is a method and an apparatus for encoding/decoding an image, the method and the apparatus determining whether to transmit transform information according to whether to refer to a transform picture, thereby enhancing compression efficiency.

Also, according to the present invention, there is provided a method and an apparatus for encoding/decoding an image, the method and the apparatus omitting a transform picture generation process according to whether to refer to a transform picture, thereby improving complexity.

Also, a computer-readable recording medium according to the present invention may store a bitstream generated by the method or apparatus for encoding the image according to the present invention.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 11 is a diagram illustrating an inter prediction method according to another embodiment of the present invention;

FIGS. 12A and 12B are diagrams illustrating an operation of a video encoder performing transform picture reference inter prediction according to another embodiment of the present invention;

FIGS. 16A and 16B are diagrams illustrating an operation of a video encoder performing transform picture reference inter prediction according to still another embodiment of the present invention;

FIG. 19 is a diagram illustrating an embodiment of a video decoder that further includes an image transform omission condition determination module;

FIGS. 23A to 23D are diagrams illustrating generation of global motion caused by motion of a camera according to an embodiment of the present invention;

FIG. 28 includes diagrams illustrating a boundary region according to an embodiment of the present invention;

FIG. 29 includes block diagrams illustrating a configuration of an encoder/decoder using a padding technique of a boundary region according to an embodiment of the present invention;

FIG. 32 includes flowcharts illustrating an operation of an encoder/decoder using a specified fixed value according to an embodiment of the present invention;

DETAILED DESCRIPTION OF THE INVENTION

Figure 1:
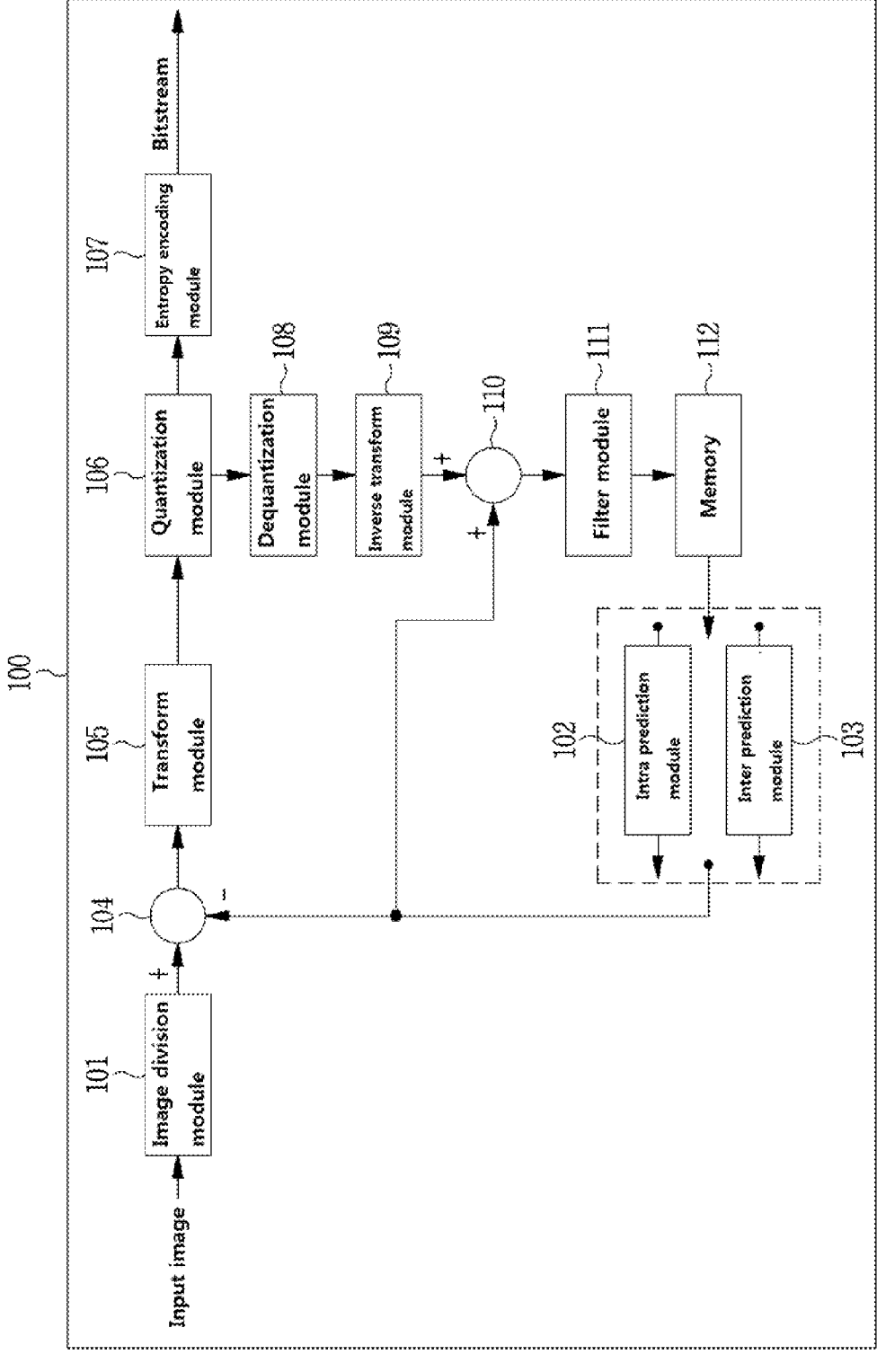
FIG. 1 is a block diagram illustrating an apparatus for encoding an image according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar elements described in the drawings.

Terms used in the specification, "first", "second", etc. can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. The term "and/or" includes a combination of a plurality of items or any one of a plurality of terms.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. Hereinafter, the same elements in the drawings are denoted by the same reference numerals, and a repeated description of the same elements will be omitted.

FIG. 1 is a block diagram illustrating an apparatus for encoding an image according to an embodiment of the present invention.

Referring to FIG. 1, an apparatus 100 for encoding an image may include an image division module 101, an intra prediction module 102, an inter prediction module 103, a subtractor 104, a transform module 105, a quantization module 106, an entropy encoding module 107, a dequantization module 108, an inverse transform module 109, an adder 110, a filter module 111, and a memory 112.

The constituents shown in FIG. 1 are independently shown so as to represent characteristic functions different from each other in the apparatus for encoding the image. Thus, it does not mean that each constituent is constituted in a constituent unit of separated hardware or software. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

The image division module 100 may divide an input image into one or more blocks. Here, the input image may have various shapes and sizes, such as a picture, a slice, a tile, a segment, a tile group, and the like. A block may mean a coding unit (CU), a prediction unit (PU), or a transform unit (TU). The dividing may be performed on the basis of at least one among a quad tree, a binary tree, and a ternary tree. Quad tree division is a method of dividing the upper block into four lower blocks of which width and height are half of those of the upper block. Binary tree division is a method of dividing the upper block into two lower blocks of which either width or height is half of that of the upper block. Ternary tree division is a method of dividing the upper block into three lower blocks. For example, the three lower blocks may be obtained by dividing the width or the height of the upper block at a ratio of 1:2:1. Through binary tree-based division, a block may be in a square shape as well as a non-square shape. A block may be divided in the quad tree first. A block corresponding to a leaf node in the quad tree may not be divided, or may be divided in the binary tree or the ternary tree. The leaf node in the binary tree or the ternary tree may be a unit of encoding, prediction, and/or transform.

The prediction modules 102 and 103 may include an inter prediction module 103 performing inter prediction and an intra prediction module 102 performing intra prediction. Whether to perform inter prediction or intra prediction for the prediction unit may be determined, and detailed information (for example, an intra prediction mode, a motion vector, a reference picture, and the like) according to each prediction method may be determined. Here, the processing unit subjected to prediction may be different from the processing unit in which the prediction method and the detailed content are determined. For example, the prediction method, the prediction mode, and the like may be determined by the prediction unit, and prediction may be performed by the transform unit.

A residual value (residual block) between the generated prediction block and an original block may be input to the transform module 105. Also, prediction mode information used for prediction, motion vector information, and the like may be encoded with the residual value by the entropy encoding module 107 and may be transmitted to an apparatus for decoding. When a particular encoding mode is used, the original block is intactly encoded and transmitted to a decoding module without generating the prediction block by the prediction modules 102 and 103.

The intra prediction module 102 may generate a prediction block on the basis of reference pixel information around a current block, which is pixel information in the current picture. When the prediction mode of the nearby block of the current block on which intra prediction is to be performed is inter prediction, a reference pixel included in the nearby block to which inter prediction has been applied is replaced by a reference pixel within another nearby block to which intra prediction has been applied. That is, when a reference pixel is unavailable, at least one reference pixel of available reference pixels is used instead of unavailable reference pixel information. For intra prediction, multiple reference pixel lines may be available. When multiple reference pixel lines are available, information on which reference pixel line is referenced is signaled.

Prediction modes in intra prediction may include a directional prediction mode using reference pixel information depending on a prediction direction and a non-directional mode not using directional information in performing prediction. A mode for predicting luma information may be different from a mode for predicting chroma information, and in order to predict the chroma information, intra prediction mode information used to predict the luma information or predicted luma signal information may be utilized.

The intra prediction module 102 may include an adaptive intra smoothing (AIS) filter, a reference pixel interpolation module, and a DC filter. The AIS filter is a filter performing filtering on the reference pixel of the current block, and whether to apply the filter may be determined adaptively according to the prediction mode, the size, the shape of the current prediction unit, and/or whether the reference pixel is included in the reference pixel line immediately adjacent to the current block. When the prediction mode of the current block is a mode in which AIS filtering is not performed, the AIS filter is not applied.

When the prediction unit is in the intra prediction mode where intra prediction is performed on the basis of the pixel value obtained by interpolating the reference pixel, the reference pixel interpolation module of the intra prediction module 102 interpolates the reference pixel to generate the reference pixel at the fraction unit position. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

With respect to the prediction block generated by intra prediction, additional filtering may be performed. The additional filtering may be performed on the basis of the intra prediction mode, the size, the shape of the block, and/or the position of the pixel within the prediction block.

The inter prediction module 103 generates a prediction block using a pre-reconstructed reference image stored in the memory 112 and motion information. Motion information may contain, for example, a motion vector, a reference picture index, a list 1 prediction flag, a list 0 prediction flag, and the like.

A residual block including residual value information that is a difference value between a prediction unit generated by the prediction modules 102 and 103 and the original block of the prediction unit. The generated residual block may be input to the transform module 130 for transform.

The inter prediction module 103 may derive a prediction block on the basis of information on at least one picture among the previous picture and the subsequent picture of the current picture. Further, the prediction block of the current block may be derived on the basis of information on a partial region with encoding completed within the current picture. According to the embodiment the inter prediction module 103 may include a reference picture interpolation module, a motion prediction module, and a motion compensation module.

The reference picture interpolation module may receive reference picture information from the memory 112 and may generate pixel information of an integer pixel or less from the reference picture. In the case of luma pixels, an 8-tap DCT-based interpolation filter having different coefficients may be used to generate pixel information on an integer pixel or less on a per-¼ pixel basis. In the case of chroma signals, a 4-tap DCT-based interpolation filter having different filter coefficients may be used to generate pixel information on an integer pixel or less on a per-⅛ pixel basis.

The motion prediction module may perform motion prediction based on the reference picture interpolated by the reference picture interpolation module. As methods for calculating a motion vector, various methods, such as a full search-based block matching algorithm (FBMA), a three step search (TSS) algorithm, a new three-step search (NTS) algorithm, and the like may be used. The motion vector may have a motion vector value on a per-½ or ¼ pixel basis on the basis of the interpolated pixel. The motion prediction module may predict a prediction block of a current block by changing the motion prediction method. As motion prediction methods, various methods, such as a skip method, a merge method, an advanced motion vector prediction (AMVP) method, and the like may be used.

The subtractor 104 generates the residual block of the current block by subtracting the block to be encoded now from the prediction block generated by the intra prediction module 102 or the inter prediction module 103.

The transform module 105 may transform the residual block containing residual data, by using transform methods, such as DCT, DST, Karhunen-Loeve transform (KLT), and the like. Here, the transform method may be determined on the basis of the prediction method (inter or intra prediction) of the prediction unit that is used to generate the residual block, the intra prediction mode, and the size and/or the shape of the transform unit. For example, depending on the intra prediction mode, DCT may be used in the horizontal direction, and DST may be used in the vertical direction. For example, when the size of the transform unit is in a predetermined range, DST is used in the direction corresponding to the short one among the width and the height of the transform unit, and DCT is used in the direction corresponding to the long one. For example, DST may be DST-7, and DCT may be DCT-2.

The quantization module 106 may quantize values transformed into a frequency domain by the transform module 105. Quantization coefficients may vary according to a block or importance of an image. The value calculated by the quantization module 106 may be provided to the dequantization module 108 and the entropy encoding module 107.

The transform module 105 and/or the quantization module 106 may be selectively included in the apparatus 100 for encoding an image. That is, the apparatus 100 for encoding an image may perform at least one between transform and quantization on residual data of the residual block, or may encode the residual block by skipping both transform and quantization. Even though the apparatus 100 for encoding an image does not perform either transform or quantization or does not perform both transform and quantization, the block that is input to the entropy encoding module 107 is generally referred to as a transform block. The entropy encoding module 107 entropy encodes the input data. Entropy encoding may use various encoding methods, for example, exponential Golomb coding, context-adaptive variable length coding (CAVLC), and context-adaptive binary arithmetic coding (CABAC).

The entropy encoding module 107 may encode a variety of information, such as coefficient information of a transform block, block type information, prediction mode information, division unit information, prediction unit information, transmission unit information, motion vector information, reference frame information, interpolation information of a block, filtering information, and the like. The coefficients of the transform block may be encoded on a per-sub-block basis within the transform block.

In order to encode a coefficient of a transform block, various syntax elements may be encoded in the reverse scan order, such as the first syntax element Last_sig that informs of the position of a non-zero coefficient, a flag Coded_sub_blk_flag that informs whether at least one non-zero coefficient is present within a sub-block, a flag Sig_coeff_flag that informs whether the coefficient is a non-zero coefficient, a flag Abs_greater1_flag that informs whether the absolute value of the coefficient is larger than one, a flag Abs_greater2_flag that informs whether the absolute value of the coefficient is larger than two, a flag Sign_flag indicating the sign of the coefficient, and the like. The remaining value of the coefficient that is not encoded only with the syntax elements may be encoded through a syntax element remaining_coeff.

The dequantization module 108 dequantizes the values quantized by the quantization module 106, and the inverse transform module 109 inversely transforms the values transformed by the transform module 105. The residual value generated by the dequantization module 108 and the inverse transform module 109 may be combined with the prediction unit predicted by a motion estimation module, a motion compensation module, and the intra prediction module 102 of the prediction modules 102 and 103 such that a reconstructed block may be generated. The adder 110 generates a reconstructed block by adding the prediction block generated by the prediction modules 102 and 103 and the residual block generated by the inverse transform module 109.

The filter module 111 may include at least one of a deblocking filter, an offset correction module, and an adaptive loop filter (ALF).

The deblocking filter may eliminate block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking filter is applied to the block, a strong filter or a weak filter is applied depending on required deblocking filtering intensity. Further, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, it is possible to use a method of separating pixels of the image into the predetermined number of regions, determining a region to be subjected to offset, and applying the offset to the determined region or a method of applying an offset considering edge information of each pixel.

Adaptive loop filtering (ALF) may be performed on the basis of the value obtained by comparing the filtered reconstruction image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU), and the shape and the filter coefficient of the ALF filter to be applied may vary depending on each block. Further, the ALF filter in the same form (fixed form) may be applied regardless of the characteristic of the application target block.

The memory 112 may store the reconstructed block or picture calculated through the filter module 111, and the stored reconstructed block or picture may be provided to the prediction modules 102 and 103 when performing inter prediction.

Figure 2:
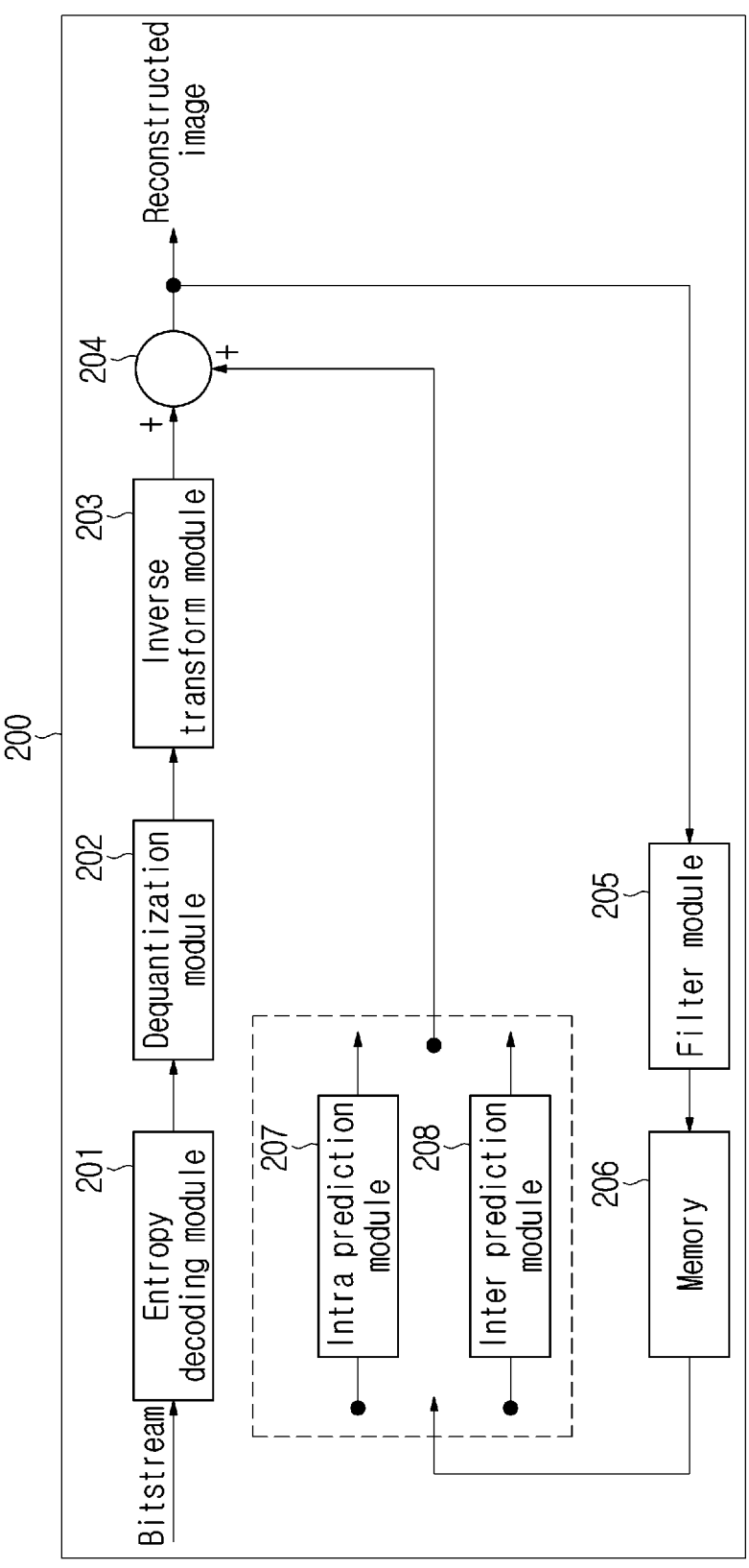
FIG. 2 is a block diagram illustrating an apparatus for decoding an image according to an embodiment of the present invention.

Next, an apparatus for decoding an image according to the present invention will be described with reference to the drawings. FIG. 2 is a block diagram illustrating an apparatus 200 for decoding an image according to an embodiment of the present invention.

Referring to FIG. 2, the apparatus 200 for decoding an image may include an entropy decoding module 201, a dequantization module 202, an inverse transform module 203, an adder 204, a filter module 205, a memory 206, and prediction modules 207 and 208.

When an image bitstream generated by the apparatus 100 for encoding an image is input to the apparatus 200 for decoding an image, the input bitstream is decoded according to a reverse process of the process performed in the apparatus 100 for encoding an image.

The entropy decoding module 201 may perform entropy decoding according to the reverse procedure of the entropy encoding performed by the entropy encoding module 107 of the apparatus 100 for encoding an image. For example, corresponding to the methods performed by the image encoder, various methods, such as exponential Golomb coding, context-adaptive variable length coding (CAVLC), and context-adaptive binary arithmetic coding (CABAC) may be applied. The entropy decoding module 201 may decode syntax elements, as described above, namely, Last_sig, Coded_sub_blk_flag, Sig_coeff_flag, Abs_greater1_flag, Abs_greater2_flag, Sign_flag, and remaining_coeff. Further, the entropy decoding module 201 may decode information on intra prediction and inter prediction performed by the apparatus 100 for encoding an image.

The dequantization module 202 may generate a transform block by performing dequantization on the quantized transform block. It operates substantially in the same manner as the dequantization module 108 in FIG. 1.

The inverse transform module 203 generates the residual block by performing inverse transform on the transform block. Here, the transform method may be determined on the basis of the prediction method (inter or intra prediction), information on the size and/or the shape of the block, the intra prediction mode, and the like. It operates substantially in the same manner as the inverse transform module 109 in FIG. 1.

The adder 204 generates a reconstructed block by adding the prediction block generated by the intra prediction module 207 or the inter prediction module 208 and the residual block generated by the inverse transform module 203. It operates substantially in the same manner as the adder 110 in FIG. 1.

The filter module 205 reduces various types of noises occurring in the reconstructed blocks.

The filter module 205 may include the deblocking filter, the offset correction module, and the ALF.

From the apparatus 100 for encoding the image, it is possible to receive information on whether the deblocking filter is applied to the block or picture and information on whether the strong filter or the weak filter is applied when the deblocking filter is applied. The deblocking filter of the apparatus 200 for decoding an image may receive information on the deblocking filter from the apparatus 100 for encoding an image, and the apparatus 200 for decoding an image may perform deblocking filtering on the block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the apparatus 100 for encoding an image. The ALF information may be provided by being included in a particular parameter set. The filter module 205 operates substantially in the same manner as the filter module 111 in FIG. 1.

The memory 206 stores a reconstructed block generated by the adder 204. It operates substantially in the same manner as the memory 112 in FIG. 1.

The prediction modules 207 and 208 may generate a prediction block on the basis of information on prediction block generation received from the entropy decoding module 201 and information on a previously decoded block or picture received from the memory 206.

The prediction modules 207 and 208 may include an intra prediction module 207 and an inter prediction module 208. Although not shown, the prediction modules 207 and 208 may further include a prediction unit determination module. The prediction unit determination module may receive a variety of information, such as prediction unit information, prediction mode information of an intra prediction method, information on motion prediction of an inter prediction method, and the like from the entropy decoding module 201, may distinguish a prediction unit in a current coding unit, and may determine whether inter prediction or intra prediction is performed on the prediction unit. By using information required in inter prediction of the current prediction unit received from the apparatus 100 for encoding the image, the inter prediction module 208 may perform inter prediction on the current prediction unit on the basis of information on at least one among the previous picture and the subsequent picture of the current picture including the current prediction unit. Alternatively, inter prediction may be performed on the basis of information on some pre-reconstructed regions in the current picture including the current prediction unit.

In order to perform inter prediction, it may be determined which of a skip mode, a merge mode, and an AMVP mode is used for the motion prediction method of the prediction unit included in the coding unit, on the basis of the coding unit.

The intra prediction module 207 generates the prediction block using the pre-reconstructed pixels positioned near the block to be currently encoded. When multiple reference pixel lines are available, which reference pixel line is referenced is identified on the basis of the information provided from the apparatus 100 for encoding an image.

The intra prediction module 207 may include an adaptive intra smoothing (AIS) filter, a reference pixel interpolation module, and a DC filter. The AIS filter is a filter performing filtering on the reference pixel of the current block, and whether to apply the filter may be determined adaptively according to the prediction mode, the size, the shape of the current prediction unit, and/or whether the reference pixel is included in the reference pixel line adjacent to the current block. The prediction mode of the prediction unit received from the apparatus 100 for encoding the image and AIS filter information are used for performing AIS filtering on the reference pixel of the current block. When the prediction mode of the current block is a mode in which AIS filtering is not performed, the AIS filter is not applied.

When the prediction unit is in the prediction mode where intra prediction is performed on the basis of the pixel value obtained by interpolating the reference pixel, the reference pixel interpolation module of the intra prediction module 207 interpolates the reference pixel to generate the reference pixel at the fraction unit position. The generated reference pixel at the traction unit position may be used as a prediction pixel of a pixel within the current block. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

It is described above that additional filtering may be performed on the prediction block generated by intra prediction.

The intra prediction module 207 operates substantially in the same manner as the intra prediction module 102 in FIG. 1.

The inter prediction module 208 generates an inter prediction block using a reference picture stored in the memory 206, and motion information. The inter prediction module 208 operates substantially in the same manner as the inter prediction module 103 in FIG. 1.

Hereinafter, various embodiments of the present invention will be described in detail with reference to the drawings.

Figure 3:
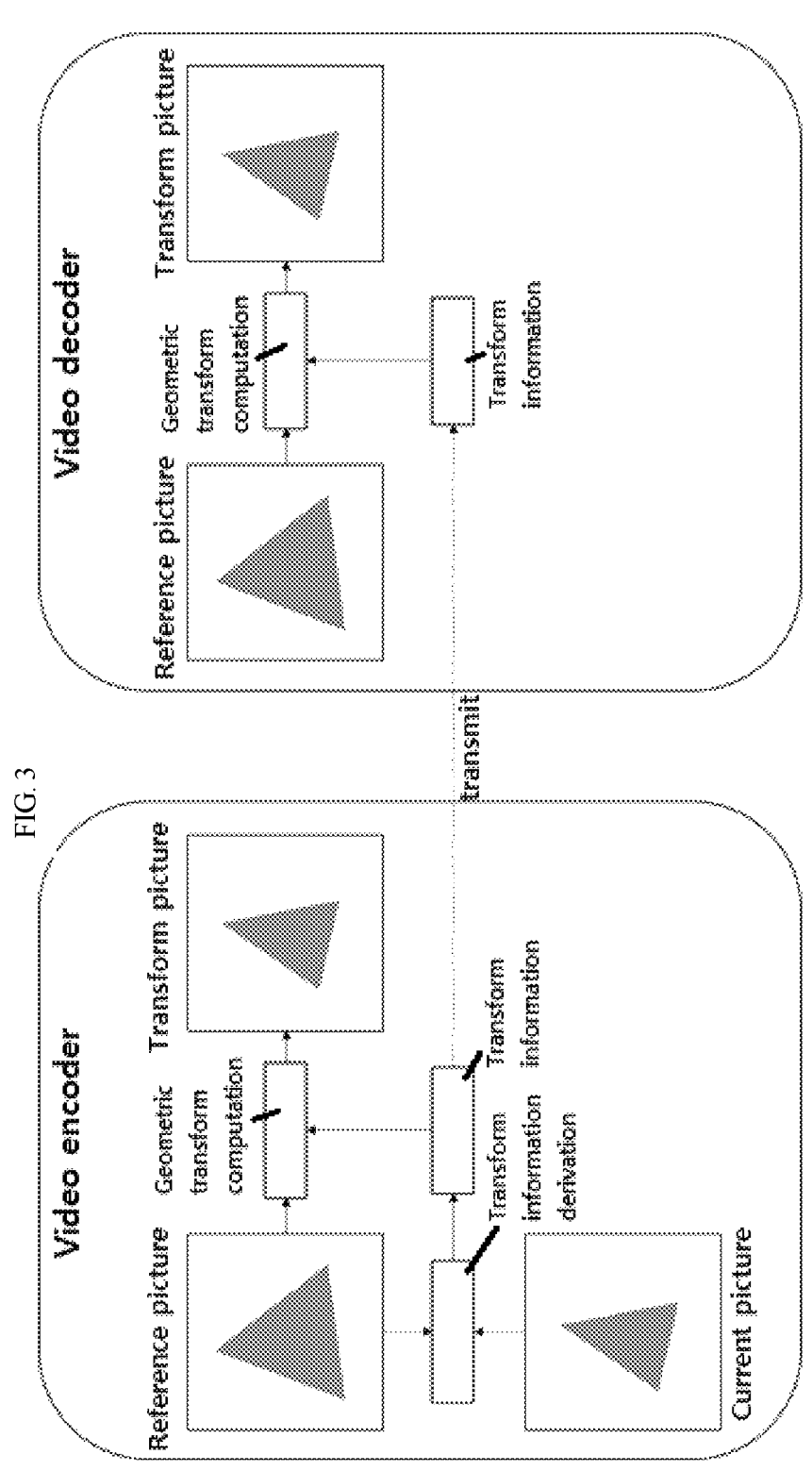
FIG. 3 is a diagram illustrating the concept of a video encoder and a video decoder that generate a transform picture for reference in inter prediction.

FIG. 3 is a diagram illustrating the concept of a video encoder and a video decoder that generate a transform picture for reference in inter prediction.

The video encoder has original information of the current picture as an input signal. Therefore, transform information may be derived by computing a geometric transform relationship from the reference picture and the original of the current picture. The video encoder uses the derived transform information to perform geometric transform computation for the reference picture such that a transform picture is generated. The generated transform picture may be used as reference information of inter prediction.

The video encoder may transmit the derived transform information to the video decoder. The video decoder uses the transform information received from the video encoder to perform geometric transform computation for the reference picture, such that a transform picture is generated. Since video transform information is the same as the reference picture, the transform picture generated by the decoder may be the same as the transform picture generated by the video encoder.

Inter prediction and encoding may be performed on a per-coding unit (hereinafter, referred to as "a CU") basis and/or on a per-prediction unit (hereinafter, referred to as "a PU") basis. Prediction information for inter prediction may include motion information. Motion information may refer to a displacement between a position of a prediction target CU or a prediction target PU (hereinafter, referred to as "a current CU", "a current PU", "a current block", or "a prediction target block") within the current picture and a position of a reference region (hereinafter, referred to as "a reference block") within the reference picture.

In order to reduce the number of bits that represent motion information, motion information may be obtained from the nearby block (or adjacent block) adjacent to the current block and may be used as motion information of the current block. This method is called a merge method, and the merge method is performed when the current block and the nearby block have the same motion information. Therefore, when the motion information of the current block is not similar to that of the nearby block, compression performance by merging is lowered.

For example, when the video image contains non-linear motion such as global rotation, zoom-in, zoom-out, and the like, there is high likelihood that the similarity between motion information of the current block and motion information of the nearby block will decrease. Therefore, in this case, the merging performance is degraded and the encoding performance may be lowered.

When the global motion occurs in a video image, there is a method of referring to a transform picture as a method of predicting an image signal by computing geometric transform for global motion. The global motion may occur in units of various regions, such as an image picture, a slice, a tile group, a tile, and the like. Here the computed geometric transform may include both linear motion such as parallel translation, and non-linear motion such as rotation, zoom-in, and zoom-out.

The transform picture may mean a picture in which both a linear geometric transform relationship and a non-linear geometric transform relationship are computed. The transform picture and the current picture are configured to have similar pixel distributions. Therefore, with respect to an image in which non-linear global motion occurs, the encoding performance is higher when referring to the transform picture than when using only the reference picture conventionally.

In the case of encoding/decoding referring to the transform picture, a geometric transform relationship reflecting non-linear motion between images may be computed. Therefore, transform information reflecting the non-linear geometric transform relationship may be derived. Here, transform information may be composed of multiple real numbers or integers.

Figure 4:
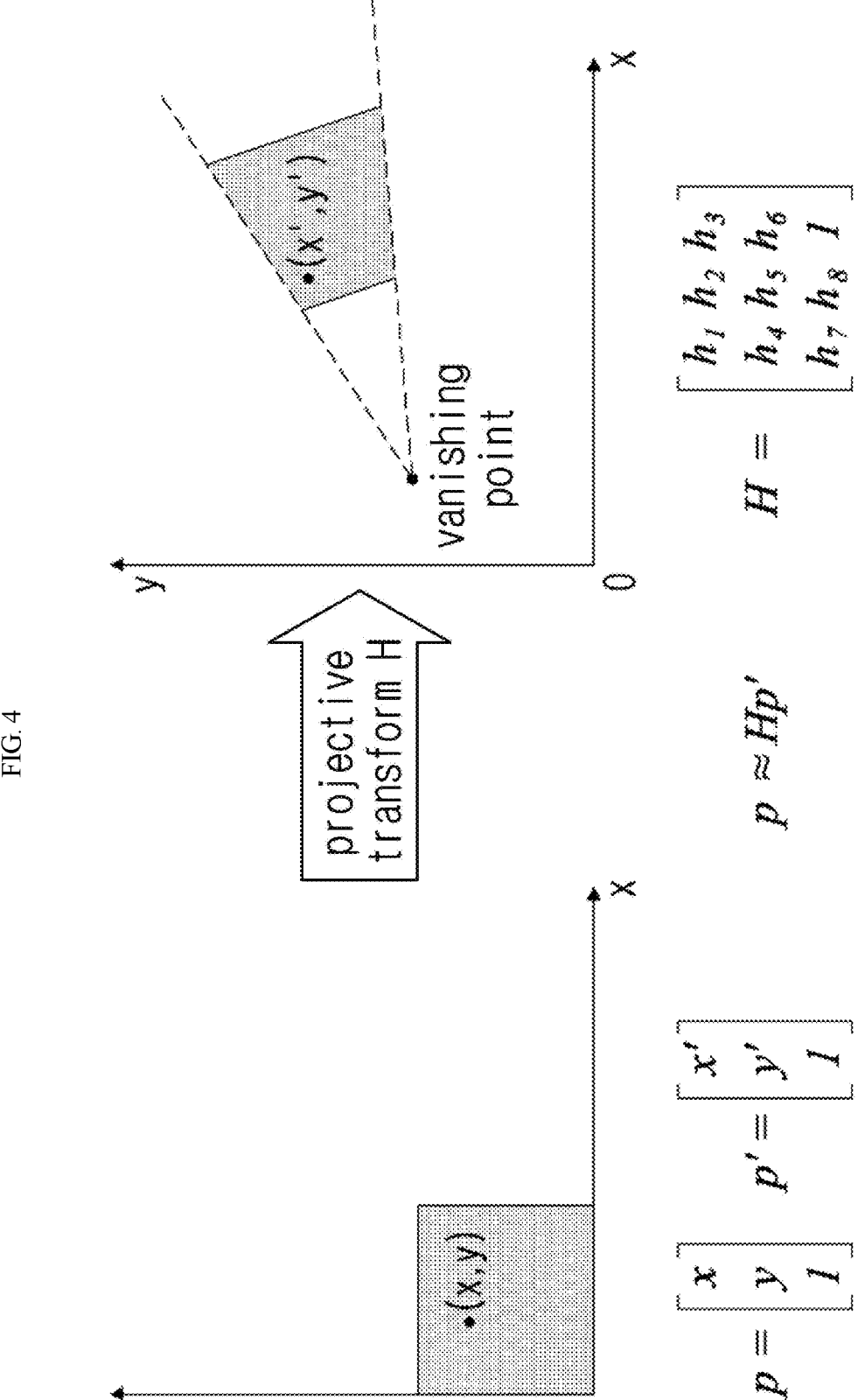
FIG. 4 is a diagram illustrating a projection transform model.
Figure 5:
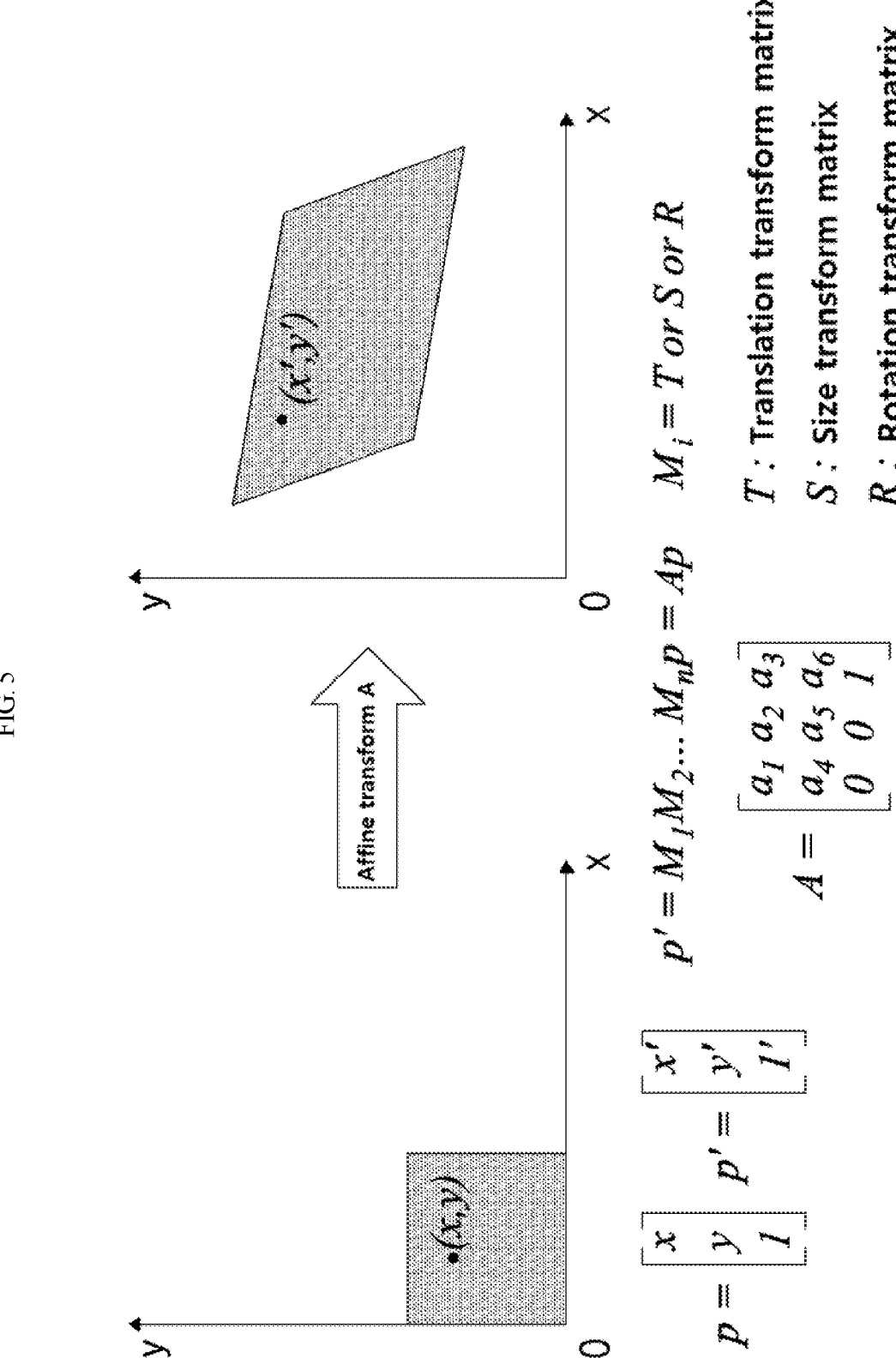
FIG. 5 is a diagram illustrating an affine transform model.

With reference to FIGS. 4 and 5, various embodiments of a model representing a geometric transform relationship between two images will be described.

FIG. 4 is a diagram illustrating a projection transform model.

FIG. 5 is a diagram illustrating an affine transform model.

Transform information of a projection transform model (a homography model) may be represented by one fixed value and eight real numbers as shown in matrix H in FIG. 4.

Transform information of an affine transform model may be represented by three fixed integer values and six real numbers as shown in matrix A in FIG. 5.

As described above, the transform information is a data set composed of multiple real numbers and integers. Further, transform information needs to be derived each time the transform picture is generated. Therefore, when using the transform picture, additional number of bits is required to transmit the transform information from the encoder to the decoder. Thus, there is likelihood that overall coding efficiency is degraded.

In other words, since the transform information is derived by computing the geometric transform relationship between two images, when there are many local motions between two images or when it is difficult to compute the geometric transform relationship, the derived transform information contains many errors. When the transform information contains an error, it is likely that the transform picture generated on the basis thereof will contain an error. Thus, in inter prediction referring to the transform picture, it may be difficult to expect good performance.

Further, for inter prediction referring to transform picture, it is necessary to further transmit additional information such as transform information, so the number of bits corresponding thereto is added. Therefore, compared with the conventional case of referring to only the reference picture, there is likelihood that encoding/decoding performance will be degraded in the case of referring to the transform picture.

According to an embodiment of the present invention, when it is determined that conventional inter prediction referring to only the reference picture is better than inter prediction referring to the transform picture in terms of the compression performance, the encoder omits inter prediction referring to the transform picture. In this case, the encoder may transmit information indicating omission of inter prediction referring to the transform picture, to the decoder.

According to another embodiment of the present invention, when it is determined that the performance of the inter prediction referring to the transform picture will be good, but the performance of the inter prediction referring to the transform picture is bad as the result of encoding, the information indicating omission of the inter prediction referring to the transform picture is transmitted to the decoder.

According to the embodiments, a signal indicating omission of the inter prediction referring to the transform picture is transmitted to the decoder, and additional information required for generating the transform picture is not transmitted, thereby minimizing the number of bits for transmission. Further, a procedure for generating the transform picture may be omitted, so the complexity of the encoder/decoder may be reduced.

According to the present invention, in video encoder and decoder utilizing the reference picture and the transform picture as reference information, when it is the omission of the inter prediction referring to the transform picture is expected to be advantageous in terms of coding efficiency, the inter prediction process referring to the transform picture and transmission of the transform information are omitted. Consequently, the performance of the video encoder/decoder may be enhanced and the complexity is reduced.

Figure 6:
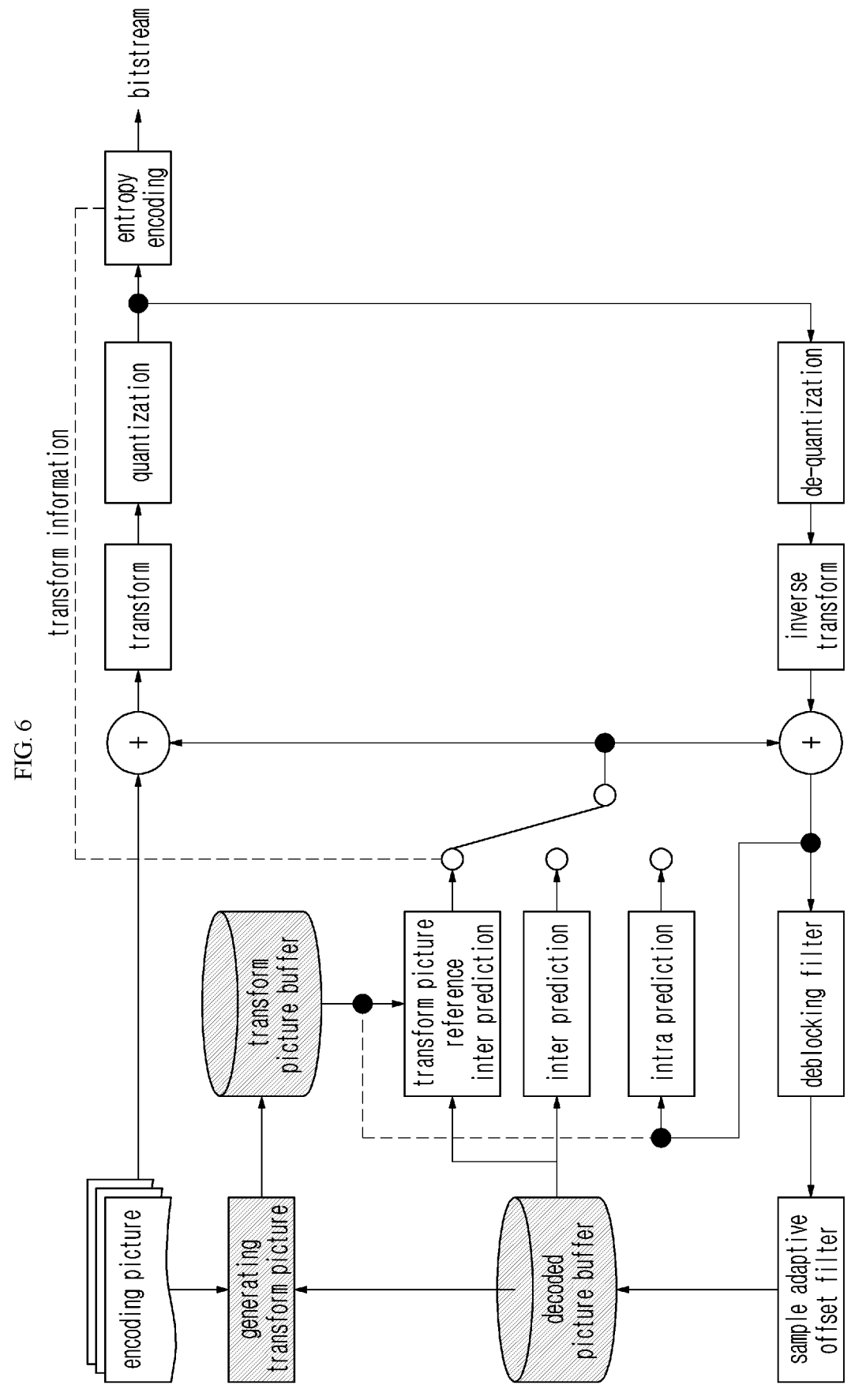
FIG. 6 is a diagram illustrating an embodiment of a video encoder that utilizes a reference picture and a transform picture as reference information.

FIG. 6 is a diagram illustrating an embodiment of a video encoder that utilizes a reference picture and a transform picture as reference information.

The video encoder that utilizes the reference picture and the transform picture as reference information performs intra prediction with inter prediction using only the reference picture stored in a decoded picture buffer (DBP) as reference information or transform picture reference inter prediction referring to both the reference picture within the decoded picture buffer and a transform picture within a transform picture buffer, thereby generating the optimum prediction information.

Here, the referenced transform picture may be generated in a manner that a geometric transform relationship between an encoding target picture (current picture) on which current encoding is performed and a reference picture is computed to derive transform information, then the derived transform information is used to compute the geometric transform relationship of the reference picture.

When it is determined that the transform picture reference inter prediction method is the optimum prediction in the video encoder, the derived transform information is output in the form of a bitstream through entropy encoding by the video encoder.

Figure 7:
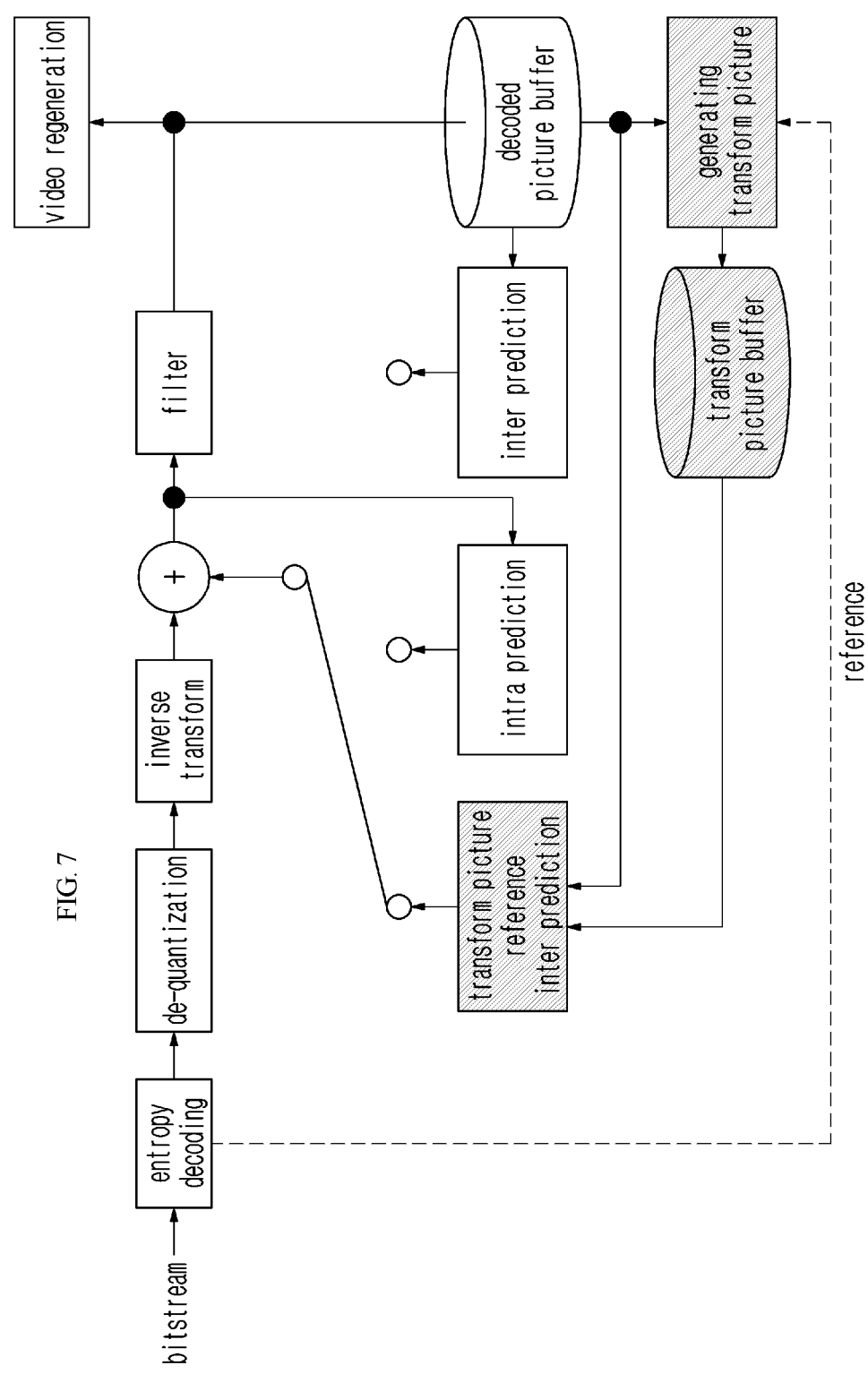
FIG. 7 is a diagram illustrating an embodiment of a video decoder that utilizes a reference picture and a transform picture as reference information.

FIG. 7 is a diagram illustrating an embodiment of a video decoder that utilizes a reference picture and a transform picture as reference information.

The video decoder receives the bitstream output from the video encoder to decode the transform information through entropy decoding.

The video decoder uses the decoded transform information to generate a transform picture from the reference picture in the decoded picture buffer. The generated transform picture may be stored in the transform picture buffer, and the stored transform picture may be referenced to perform transform picture reference inter prediction.

Among the constituents shown in FIGS. 6 and 7, a detailed description of the same constituents as those shown in FIGS. 1 and 2 will be omitted.

Figure 8:
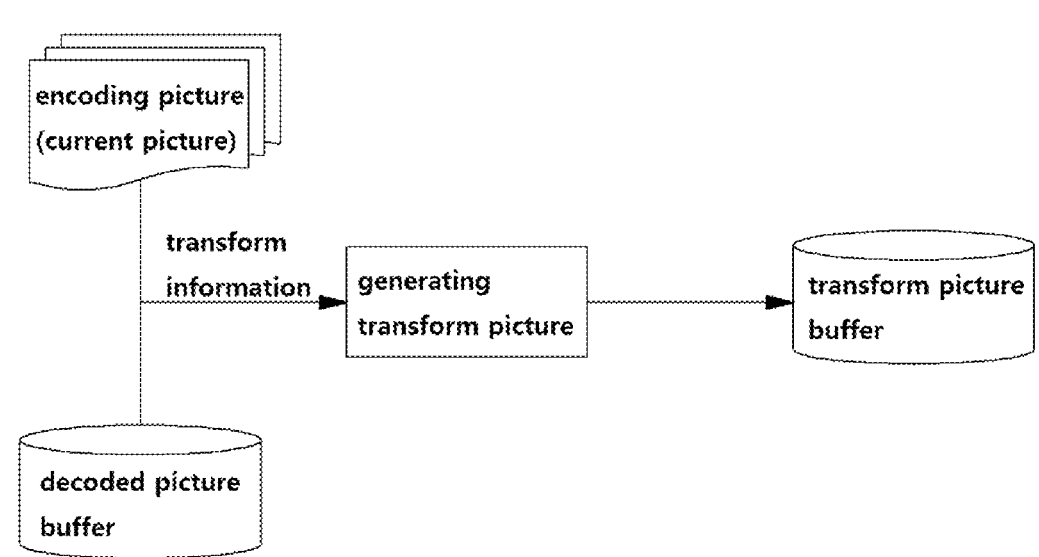
FIG. 8 is a diagram illustrating a process of generating a transform picture according to an embodiment of the present invention.

FIG. 8 is a diagram illustrating a process of generating a transform picture according to an embodiment of the present invention.

The encoder may derive the transform information on the basis of the current picture and the reference picture stored in the decoded picture buffer. The derived transform picture may be used to generate a transform picture from a reference picture, then the generated transform picture may be stored in the transform picture buffer.

Figure 9:
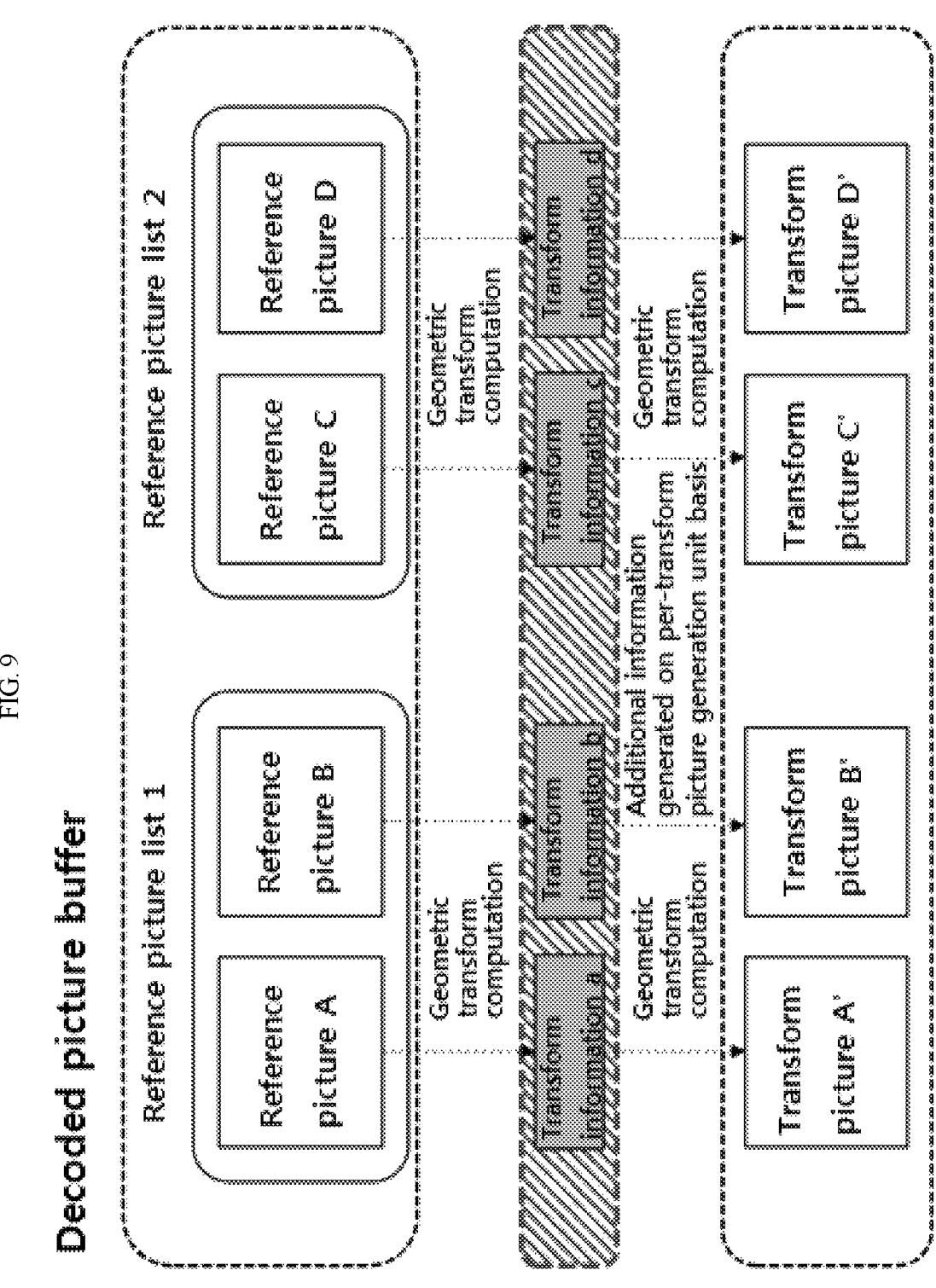
FIG. 9 is a diagram illustrating a case where additional information is generated according to an embodiment of the present invention.

FIG. 9 is a diagram illustrating a case where additional information is generated according to an embodiment of the present invention.

In the embodiment shown in FIG. 9, there are two reference picture lists, but without limited thereto, N reference picture lists may be present. Further, the number of pieces of transform information for each limit is not also limited to two, and M pieces of transform information may be present. Here, N and M may be integers of one or more.

The transform information is required to generate the transform picture by computing geometric transform. Therefore, the transform information may be generated in a unit in which the transform picture is generated. In the embodiment shown in FIG. 9, the video encoder may have total four reference pictures (reference picture A, reference picture B, reference picture C, and reference picture D), and transform pictures (transform picture A', transform picture B', transform picture C', and transform picture D') may be generated for the respective reference pictures. That is, the transform picture may be generated on a per-reference picture basis.

In the embodiment shown in FIG. 9, total four pieces of transform information (transform information a, transform information b, transform information c, and transform information d) may be derived. As described above, each piece of transform information may be composed of multiple integers or real numbers. Therefore, in order to transmit the derived transform information, an additional number of bits is required, and when the additional number of bits is large, coding efficiency of the encoder/decoder is hindered.

Figure 10:
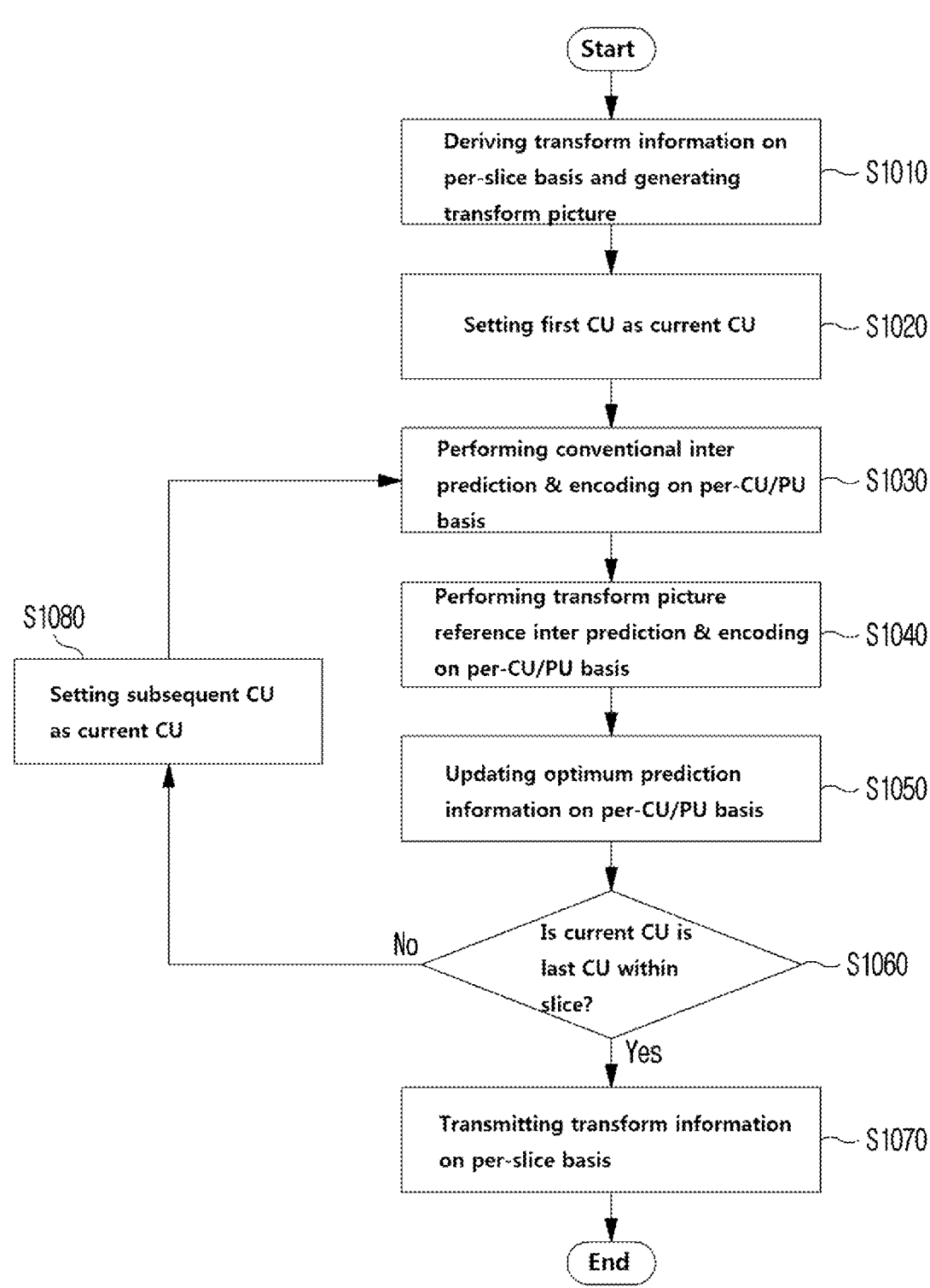
FIG. 10 is a diagram illustrating inter prediction when a transform picture generation unit is a slice according to an embodiment of the present invention.

FIG. 10 is a diagram illustrating inter prediction when a transform picture generation unit is a slice according to an embodiment of the present invention.

First, the transform information may be derived on a per-slice basis, and the transform picture may be generated on the basis of the derived transform information at step S1010. The current block (CU or PU) may be set within the slice at step S1020, and inter prediction referring only the reference picture and encoding may be performed on the current block at step S1030. Further, inter prediction referring the transform picture and encoding may be performed on the current block at step S1040. By comparing the compression performance at step S1030 with the compression performance at step S1040, the optimum prediction information for the current block may be determined at step S1050. Whether the current block is the last block within the slice is checked at step S1060. When the current block is not the last block, the subsequent block within the slice is set as the current block at step S1080, then proceeding to step S1030 takes place to repeat the above-described process. The process is repeated until the last block within the slice, then the transform information may be transmitted on a per-slice basis at step S1070.

Referring to FIG. 10, in the described embodiment, the transform picture is generated/transmitted on a per-slice basis, but the optimum efficiency is determined on a per-block basis. Therefore, when the transform picture generation unit is a region like the slice larger than the CU or the PU, it is difficult to consider the number of bits for the transform information that is generated on a per-slice basis. Thus, in practice, loss may occur in terms of encoding. Therefore, it may be desired to select the optimum prediction method in the transform picture generation unit considering bit loss caused by additional information (namely, the transform information) generated in the transform picture generation unit.

FIG. 11 is a diagram illustrating an inter prediction method according to another embodiment of the present invention.

In the embodiment shown in FIG. 11, "an inter predictor on a per-PU basis" selects the optimum prediction method for the current block, then measures bit loss caused by the additional information (namely, the transform information) that is generated when generating the transform picture. The optimum prediction method for the transform picture generation unit may be selected by "an optimum prediction selector on a per-transform picture generation unit basis".

"The optimum prediction selector on a per-PU basis" within "the inter predictor on a per-PU basis" may select the optimum prediction method referring to both the transform picture and the reference picture. Afterward, the transform picture generation unit compares the cost considering bit loss caused by generation of the transform information with the cost of inter prediction referring to only the reference picture, thereby finally selecting a cost-effective method. Here, examples of the transform picture generation unit may include various regions, such as a picture, a slice, a tile group, a tile, an arbitrary region, or the like. Further, the cost may be a value calculated by various conversion methods that are applicable to image quality evaluation such as the bitrate versus the image quality, and the like.

Figure 12A:
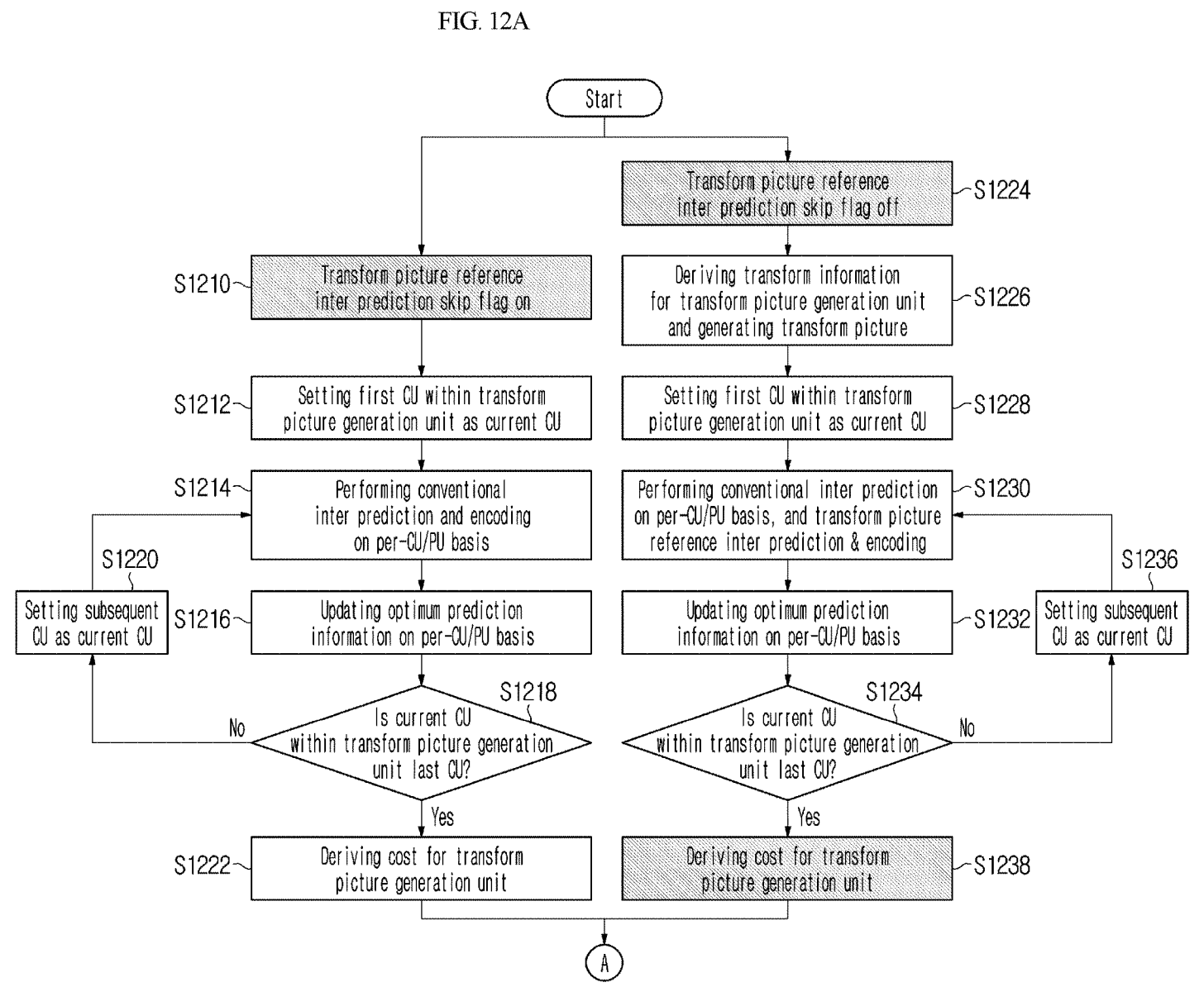
Figure 12B:
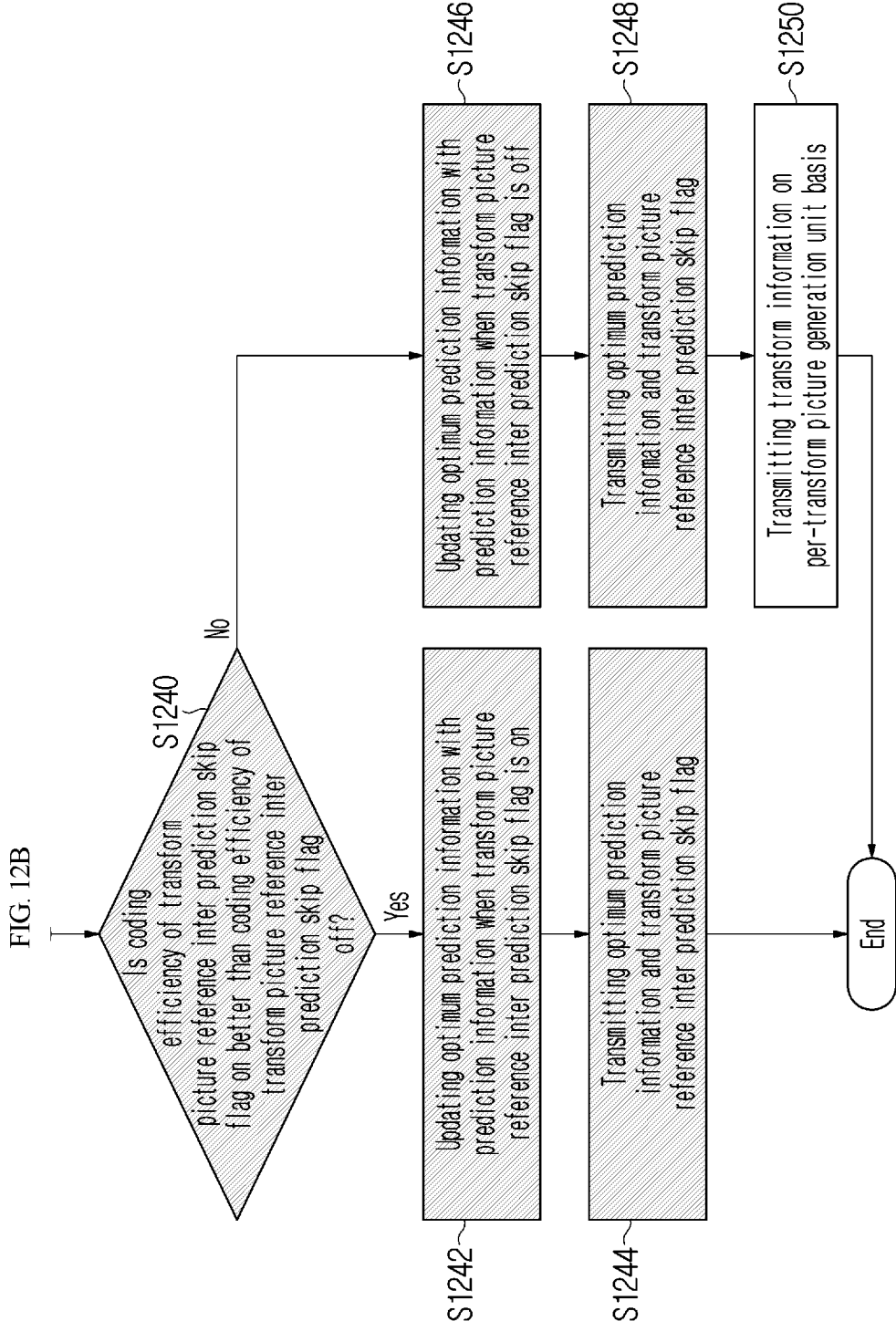

FIGS. 12A and 12B are diagrams illustrating an operation of a video encoder performing transform picture reference inter prediction according to another embodiment of the present invention.

In the embodiment shown in FIGS. 12A and 12B, a transform picture reference skip flag (or, a transform picture reference inter prediction skip flag) indicating whether the transform picture is referenced may be signaled. Regarding the transform picture reference skip flag, the optimum prediction selector on a per-transform picture generation unit basis may determine and transmit the value for each transform picture generation unit.

When the transform picture reference skip flag is on at step S1210, the current block within the transform picture generation unit is set at step S1212, inter prediction referring to only the reference picture and encoding is performed on a per-current block basis at step S1214, and the optimum prediction information is updated at step S1216. At step S1218, whether the current block is the last block is checked. When the current block is not the last block, the subsequent block is set as the current block at step S1220. The above steps are performed repeatedly until the last block within the transform picture generation unit, then the cost for the transform picture generation unit may be calculated at step S1222.

When the transform picture reference skip flag is off at step S1224, derivation of the transform information and generation of the transform picture of the transform picture generation unit are performed at step S1226. Afterward, the current block within the transform picture generation unit is set at step S1228, inter prediction referring to the transform picture/encoding and inter prediction referring to only the reference picture/encoding are performed on a per-current block basis at step S1230, and the optimum prediction information is updated on a per-current block basis at step S1232. At step S1234, whether the current block is the last block is checked. When the current block is not the last block, the subsequent block is set as the current block at step S1236. The above steps are performed repeatedly until the last block within the transform picture generation unit, then the cost for the transform picture generation unit may be calculated at step S1238.

Afterward, the encoder may determine, on the basis of the cost derived at step S1222 and the cost derived at step S1238, the case having high coding efficiency among the cases where the transform picture reference skip flag is on and off at step S1240. In the case of Yes at step S1240, the optimum prediction information may be updated with prediction information of the case where the transform picture reference skip flag is on at step S1242, and the optimum prediction information and the transform reference skip flag may be transmitted at step S1244. In the case of No at step S1240, the optimum prediction information may be updated with prediction information of the case where the transform picture reference skip flag is off at step S1246, and the optimum prediction information and the transform reference skip flag may be transmitted at step S1248, and further the transform information may be transmitted at step S1250.

When the transform picture reference skip flag is on, inter prediction referring to only the reference picture is performed, so the transform information is not transmitted to the decoder. When the transform picture reference skip flag is off, the transform information for generating the transform picture is transmitted to the decoder.

In the described embodiment with reference to FIGS. 12A and 12B, different configurations are possible depending on the prediction method or order, and parallel processing. For example, the steps having no casual relations therebetween may be performed in parallel, or the processing order may be changed.

In FIGS. 12A and 12B, the ending may mean the end of a partial process of inter prediction according to the embodiment of the present invention, and may not mean the end of the entire encoding process.

Figure 13:
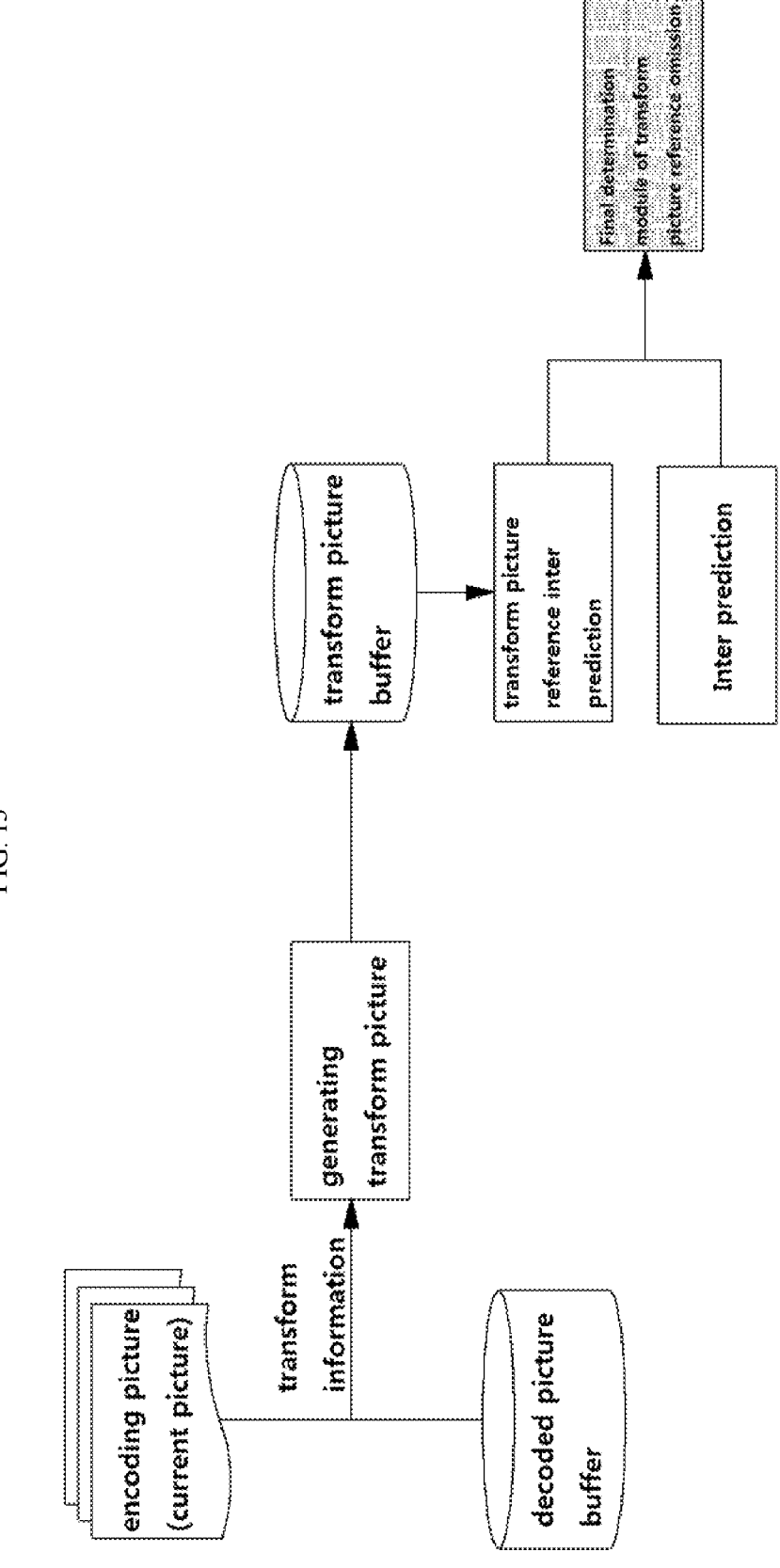
FIG. 13 is a diagram illustrating an embodiment of an encoder to which a final determination module of transform picture reference omission is added.

FIG. 13 is a diagram illustrating an embodiment of an encoder to which a final determination module of transform picture reference omission is added.

According to the present invention, the encoder may perform first inter prediction in which inter prediction referring to the transform picture and inter prediction referring to the reference picture are performed in parallel, and second inter prediction referring to only the reference picture. The final determination module of transform picture reference omission determines whether to refer to the transform picture through the comparison with the cost in the transform picture generation unit, thereby determining the optimum coding efficiency including the transform information.

Figure 14A:
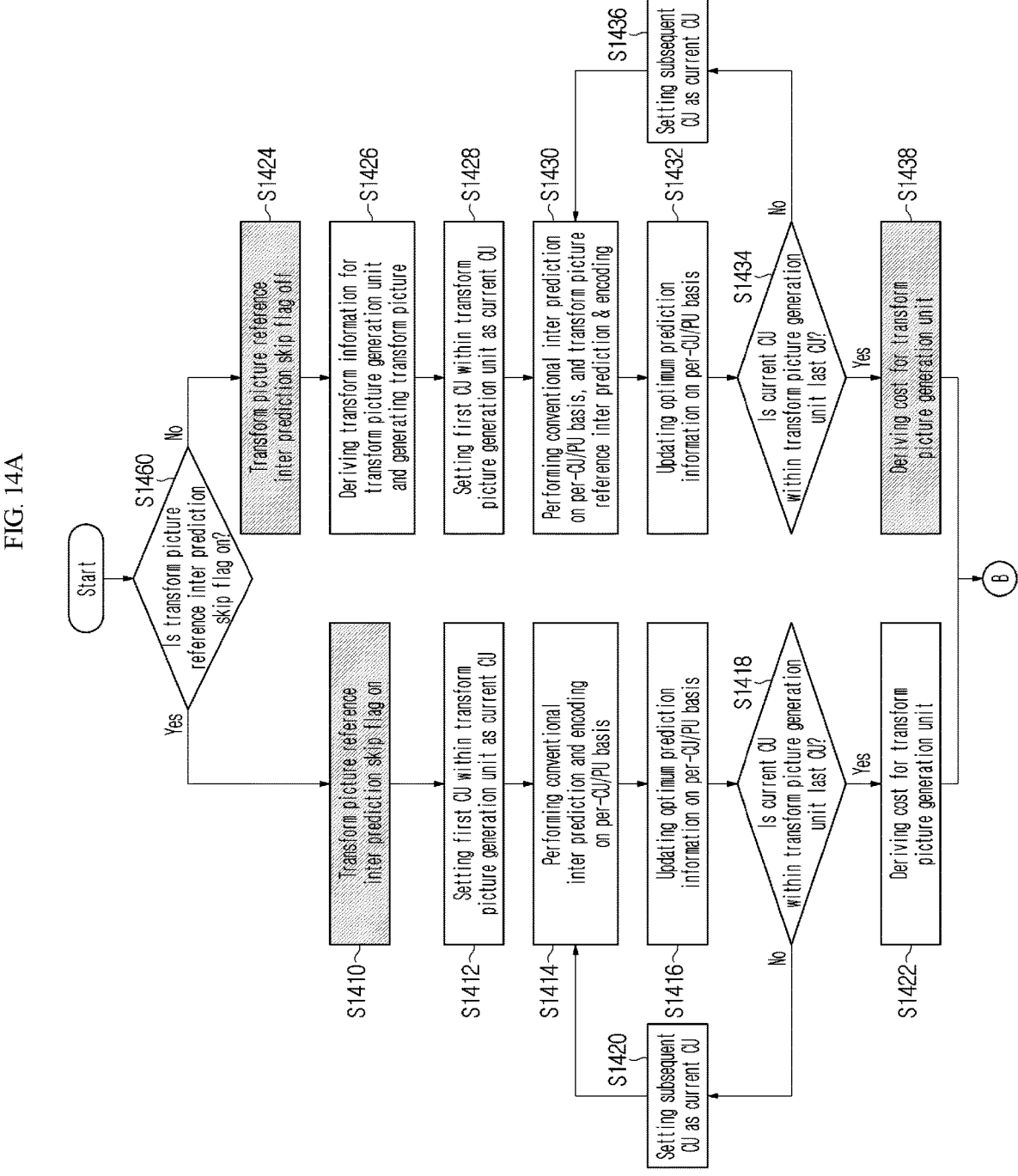
FIGS. 14A and 14B are diagrams illustrating an operation of a video encoder performing transform picture reference inter prediction according to another embodiment of the present invention.
Figure 14B:
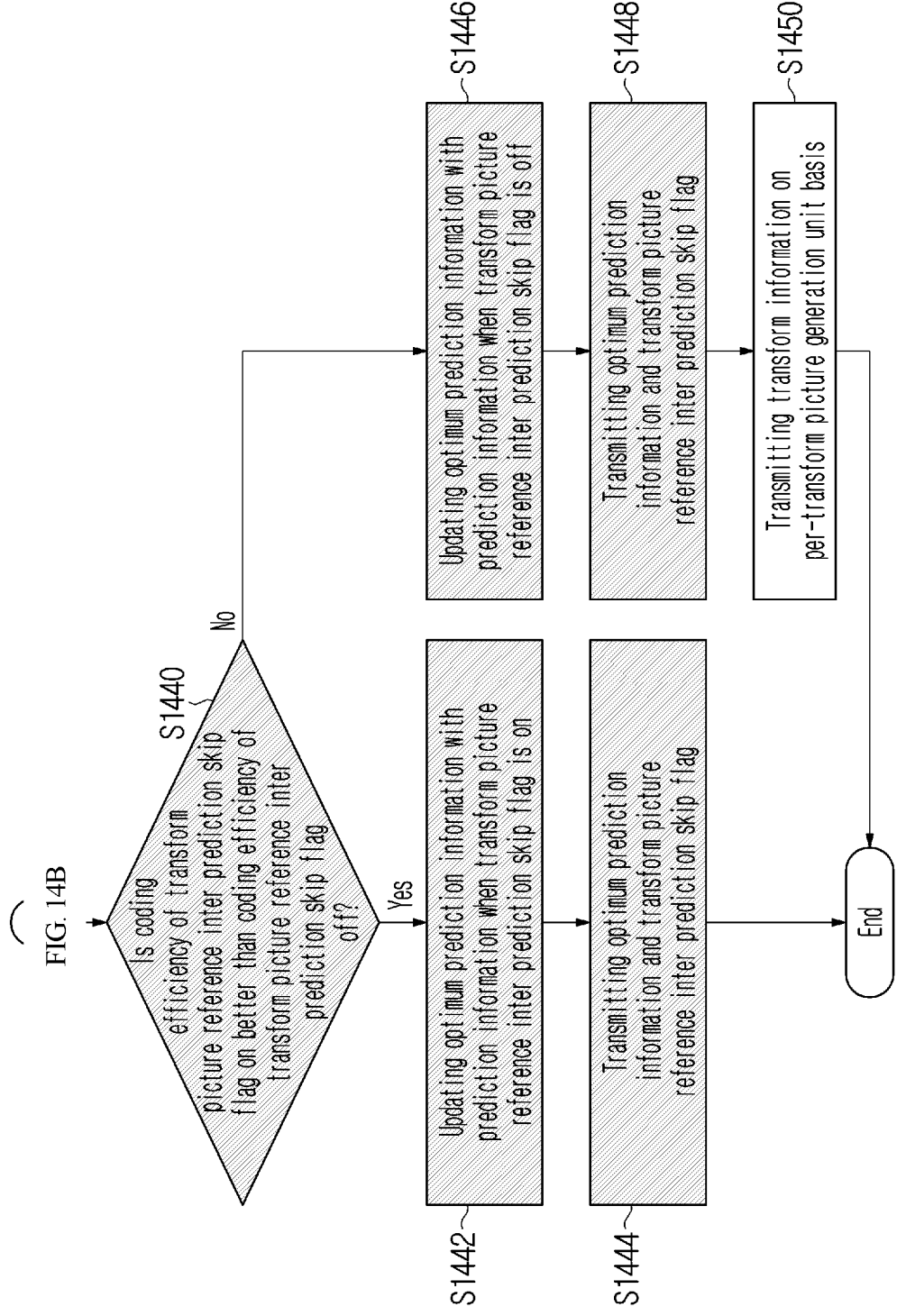

FIGS. 14A and 14B are diagrams illustrating an operation of a video encoder performing transform picture reference inter prediction according to another embodiment of the present invention.

The embodiment in FIGS. 14A and 14B is the same as the embodiment described with reference to FIGS. 12A and 12B except that determining the transform picture reference skip flag in advance at step S1460 is included.

In the embodiment shown in FIGS. 14A and 14B, the transform picture reference skip flag may be determined in advance by the user or environment setting of the encoding method.

Since the steps after step S1460 are the same as those in the embodiment described with reference to FIGS. 12A and 12 B, a detailed description thereof will be omitted.

In the embodiment shown in FIGS. 14A and 14B, considering the characteristic of an image, the encoding condition, and the like, whether to calculate the cost for the transform picture reference inter prediction method may be determined first through the environment setting of the image encoder, and the like.

Figure 15:
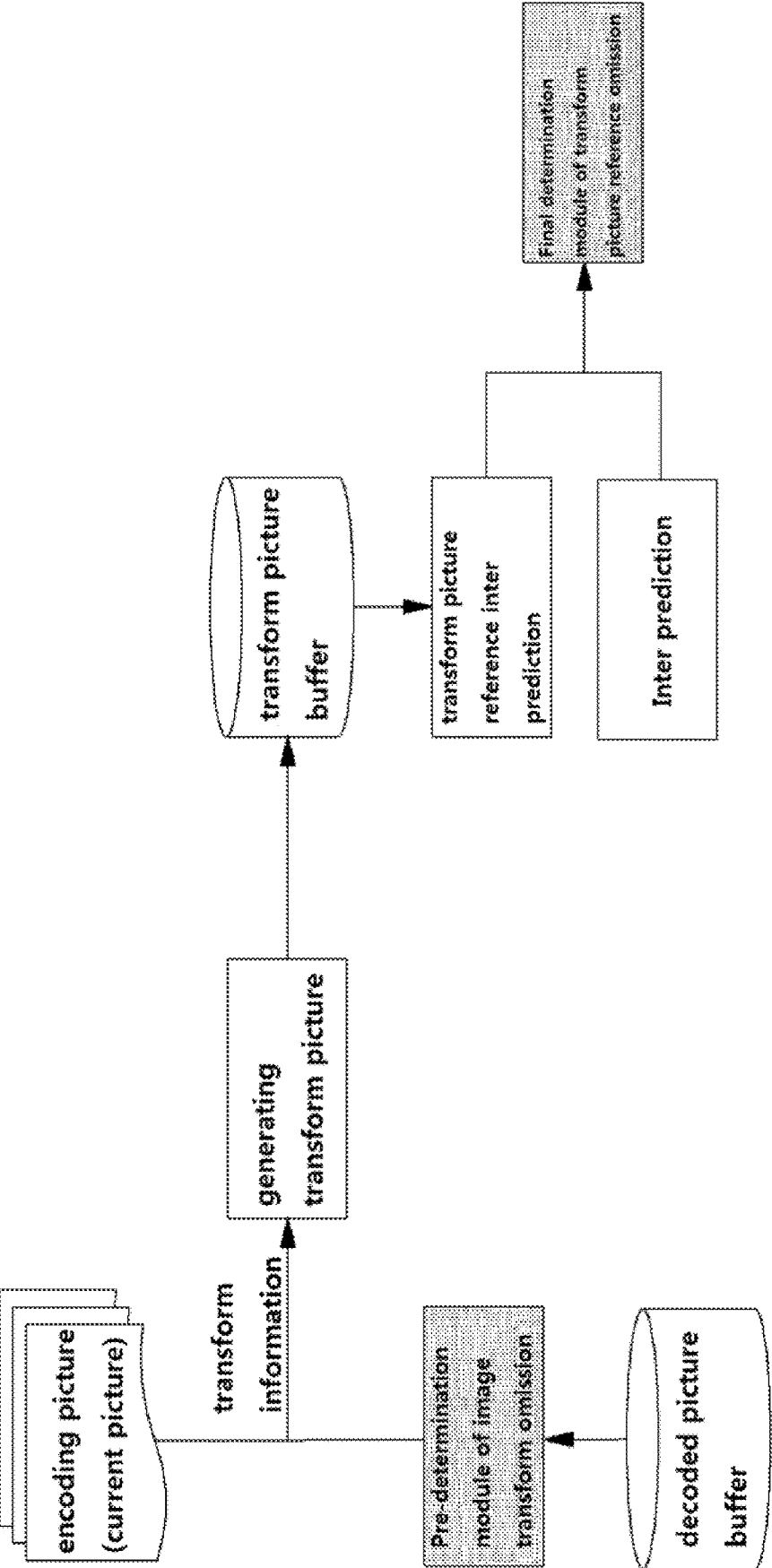
FIG. 15 is a diagram illustrating an embodiment of a video encoder including a final determination module of transform picture reference omission.

FIG. 15 is a diagram illustrating an embodiment of a video encoder including a final determination module of transform picture reference omission.

The embodiment shown in FIG. 15 shows an apparatus that performs the operation shown in FIGS. 14A and 14B. Compared with the drawing in FIG. 13, the encoder in FIG. 15 further includes a pre-determination module of image transform omission.

The encoder shown in FIG. 15 may determine, in advance of inter prediction, whether to perform transform picture reference inter prediction in the transform picture generation unit by receiving the value of the environment setting of the encoder or by checking a particular condition, and the like.

Here, the particular condition may include a threshold value, a condition for predicting inter prediction efficiency, or the like.

The pre-determination module of image transform omission may determine whether to perform transform picture reference inter prediction. When it is determined to perform transform picture reference inter prediction, it is possible to perform both an inter prediction method where inter prediction referring to the transform picture and inter prediction referring to the reference picture are performed in parallel, and a method of performing inter prediction referring to only the reference picture.

Next, the final determination module of transform picture reference omission determines whether to refer to the transform picture through comparison with the cost in the transform picture generation unit, thereby determining the optimum coding efficiency including the transform information. When it is determined that the pre-determination module of image transform omission does not perform transform picture reference inter prediction, prediction is performed using the inter prediction method referring to only the reference picture.

FIGS. 16A and 16 B are diagrams illustrating an operation of a video encoder performing transform picture reference inter prediction according to still another embodiment of the present invention.

Figure 16B:
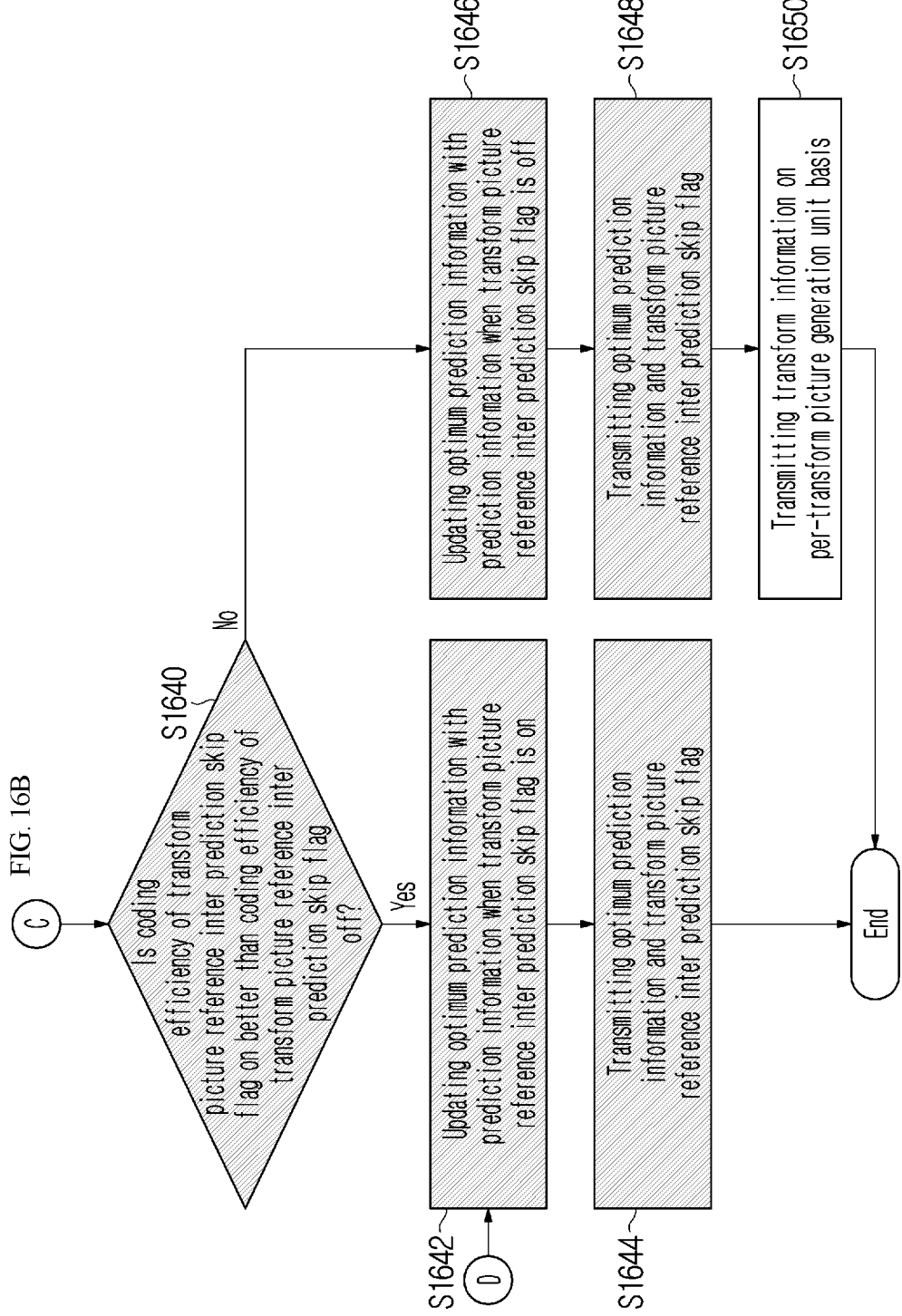

FIGS. 16A and 16B shows an embodiment in which the case where the transform picture reference skip flag is on and the case where the transform picture reference skip flag is off are not processed in parallel, wherein the cases are described in the above embodiment with reference to FIGS. 12A and 12B.

In the embodiment shown in FIGS. 16A and 16B, inter prediction for the case where the transform picture reference skip flag is on is performed. Then, the cost of the transform picture generation unit is derived, whether the cost exceeds a threshold value is checked, and whether to perform inter prediction for the case where the transform picture reference skip flag is off is determined at step S1660.

The threshold value at step S1660 may be determined by predicting the number of bits for the transform information according to the configuration of the reference picture or may use a constant value such as the maximum number of bits that the transform information may have.

At step S1660, when the cost does not exceed the threshold value, the optimum prediction information is updated with the prediction information of the case where the transform picture reference skip flag is on at step S1642, and the optimum prediction information and the transform picture reference skip flag are transmitted to the video decoder at step S1644. Here, the transform information is not transmitted to the video decoder, and the transform picture generation process is not performed, so complexity of the encoder may be reduced.

At step S1660, when the cost exceeds the threshold value, proceeding to step S1624 takes place and the procedure for the case where the transform picture reference skip flag is off is performed.

Next, the cost of the transform picture generation unit is derived at step S1638, the optimum prediction method is set by performing comparison at step S1640, and the optimum prediction information and the transform picture reference skip flag are transmitted to the decoder.

When the transform picture reference skip flag is on, only the conventional inter prediction is performed, so the transform information of the transform picture generation unit is not transmitted to the decoder. When the transform picture reference skip flag is off, the transform information for generating the transform picture is transmitted to the decoder.

Compared with the operation shown in FIGS. 12A and 12B, in the operation shown in FIGS. 16A and 16B, step S1660 is performed additionally, and the order of the steps is partially different. However, except for the differences, since the descriptions of the steps common to the operation shown in FIGS. 12A and 12B and the operation shown in FIGS. 16A and 16B are the same, the detailed description will be omitted.

Figure 17:
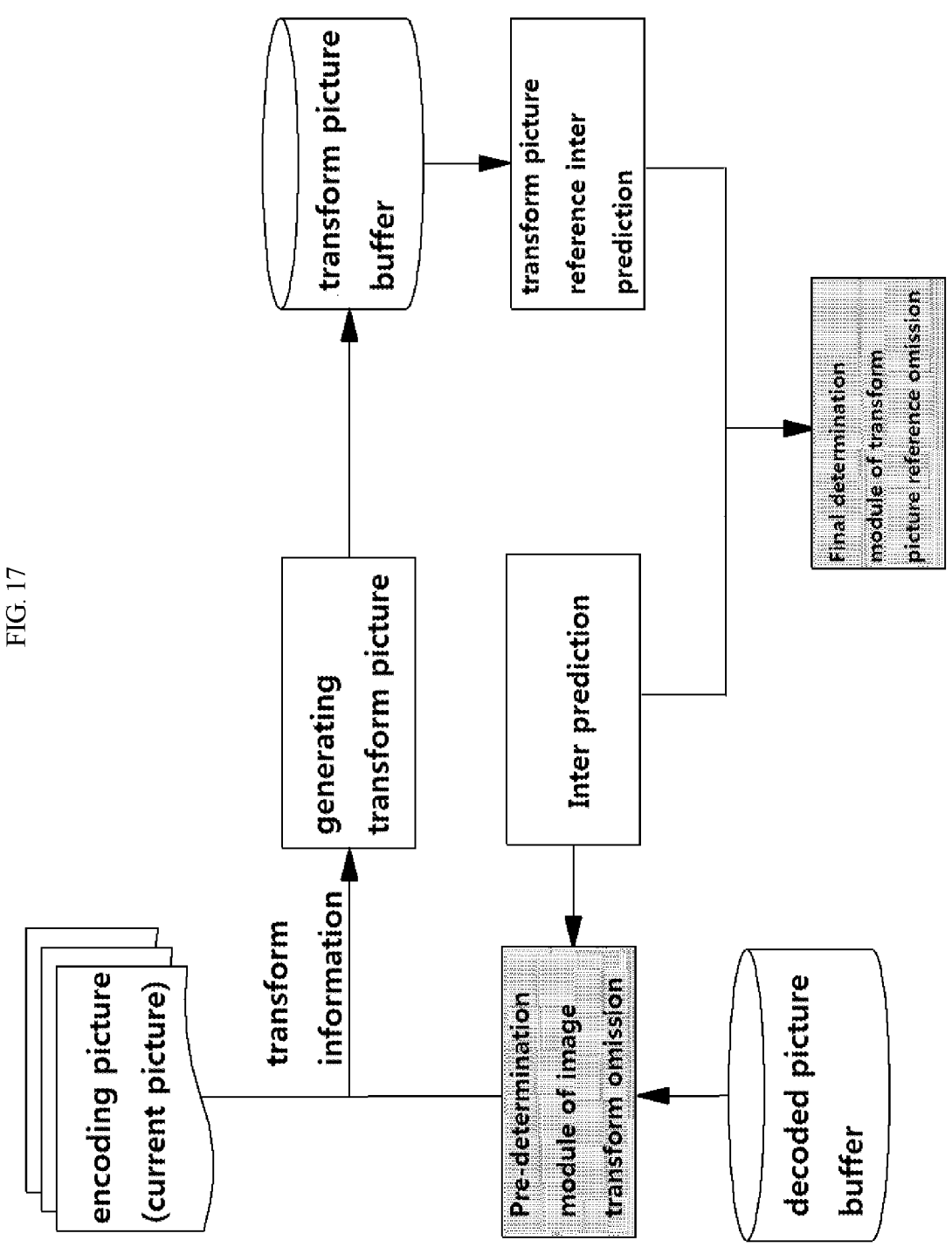
FIG. 17 is a diagram illustrating an embodiment of a video encoder including a final determination module of transform picture reference omission.

FIG. 17 is a diagram illustrating an embodiment of a video encoder including a final determination module of transform picture reference omission.

The embodiment shown in FIG. 17 shows an apparatus that performs the operation shown in FIGS. 16A and 16B. Compared with the drawing in FIG. 15, there is a difference in that the pre determination module of image transform omission in FIG. 17 is able to receive the cost of inter prediction.

The encoder shown in FIG. 17 may receive the cost of the transform picture generation unit of inter prediction, and may determine whether to perform transform picture reference inter prediction.

The pre-determination module of image transform omission may determine whether to perform transform picture reference inter prediction. When it is determined to perform transform picture reference inter prediction, it is possible to perform both an inter prediction method where the transform picture reference inter prediction and the conventional inter prediction (inter prediction referring to the reference picture)

are performed in parallel, and a method of performing only the conventional inter prediction.

Next, the final determination module of transform picture reference omission determines whether to refer to the transform picture through comparison with the cost in the transform picture generation unit, thereby determining the optimum coding efficiency including the transform information. When it is determined that the pre-determination module of image transform omission does not perform transform picture reference inter prediction, prediction is performed using only the conventional inter prediction method.

Figure 18:
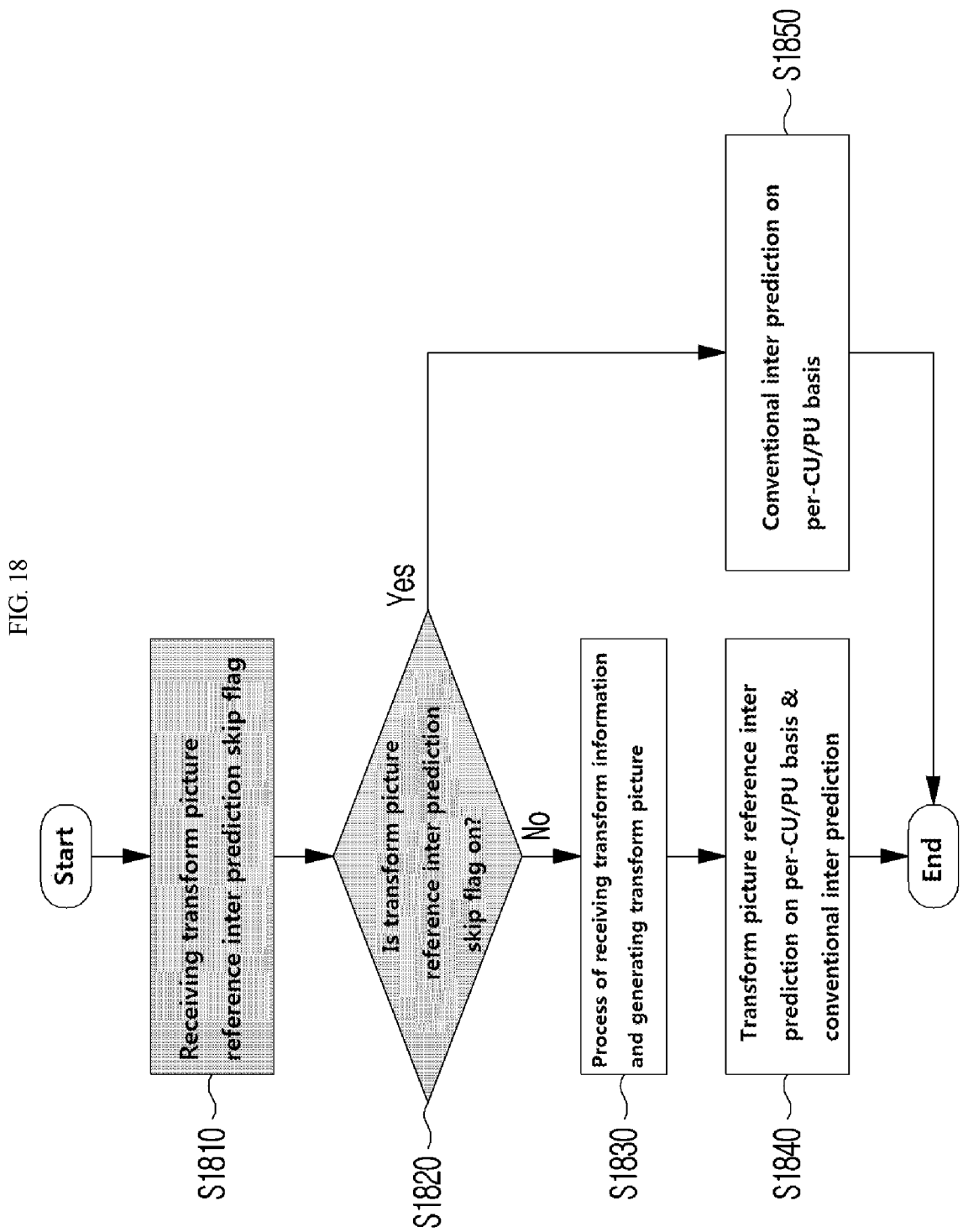
FIG. 18 is a diagram illustrating an operation of a video decoder according to an embodiment of the present invention.

FIG. 18 is a diagram illustrating an operation of a video decoder according to an embodiment of the present invention.

The video decoder may receive the transform picture reference skip flag in the transform picture generation unit at step S1810. Here, the transform picture generation unit may be a picture, a slice, a tile group, a tile, or the like, and may be preset in the encoder and the decoder or may be determined by a preset method.

At step S1820, when the transform picture reference skip flag is on, the conventional inter prediction referring to only the reference picture is performed on the CU or the PU within the transform picture generation unit at step S1850.

At step S1820, when the transform picture reference skip flag is off, a process of receiving the transform information and generating the transform picture is performed at step S1830. Afterward, the CU or the PU within the transform picture generation unit uses both the transform picture reference inter prediction and the conventional inter prediction according to the optimum prediction information determined by the encoder to decode an image signal at step S1840.

In the embodiment shown in FIG. 18, the ending may mean the end of the prediction process according to the present invention, and may not mean the end of the entire decoding process.

FIG. 19 is a diagram illustrating an embodiment of a video decoder that further includes an image transform omission condition determination module.

The image transform omission condition determination module may receive the transform picture reference skip flag in the transform picture generation unit. Here, the transform picture generation unit may be a picture, a slice, a tile group, a tile, or the like, and may be preset in the encoder and the decoder or may be determined by a preset method.

When the transform picture reference skip flag is on, the process of receiving the transform information and generating the transform picture is omitted. Further, the conventional inter prediction referring to only the reference picture is performed on the CU or the PU within the transform picture generation unit.

When the transform picture reference skip flag is off, the process of receiving the transform information and generating the transform picture is performed. Further, the transform picture reference inter prediction and the conventional inter prediction are performed in parallel on the CU or the PU within the transform picture generation unit according to the optimum prediction information determined by the encoder.

According to the decoder in FIG. 19, the transform picture generation process is partially omitted using the transform picture reference skip flag, so complexity of the decoder is reduced.

Figure 20:
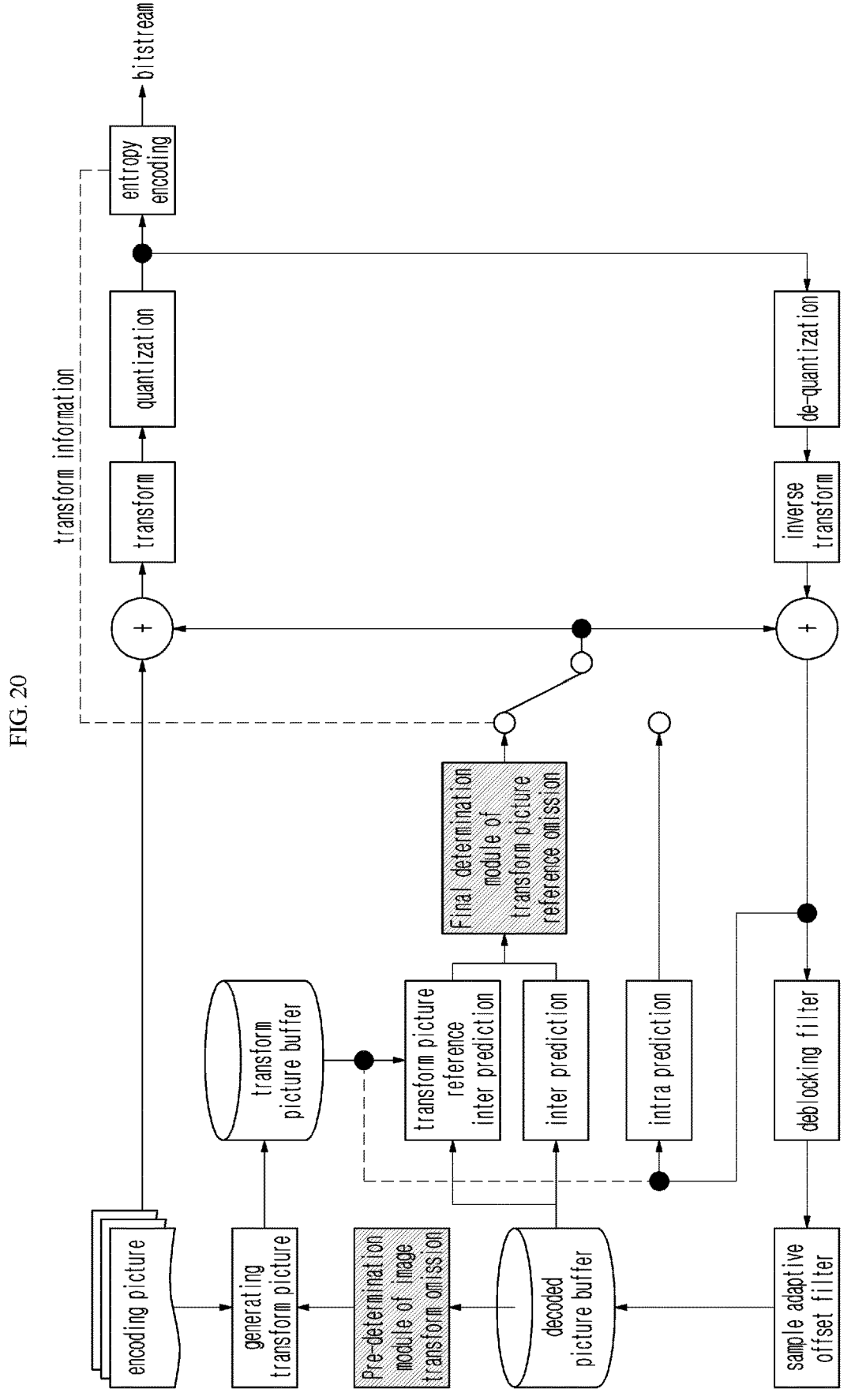
FIG. 20 is a diagram illustrating an embodiment of an encoder, as a video encoder using transform information, which further includes a pre-determination module of image transform omission and a final determination module of transform picture reference omission.

FIG. 20 is a diagram illustrating an embodiment of an encoder, as a video encoder using transform information, which further includes a pre-determination module of image transform omission and a final determination module of transform picture reference omission.

The pre-determination module of image transform omission of the video encoder receives a value set as an encoding condition in the encoder so as to determine whether to perform the transform picture reference inter prediction, or checks a condition where the performance of the transform picture reference inter prediction is predicted so as to determine whether to perform the transform picture reference inter prediction.

The final determination module of transform picture reference omission of the video encoder determines the prediction mode according to the optimum prediction efficiency by comparing the prediction efficiency of the method using only the conventional inter prediction in the transform picture generation unit with the prediction efficiency of the method performing the conventional inter prediction and the transform picture reference inter prediction in parallel. In this case, the cost for generating the transform information in the transform picture generation unit may be considered, so it is possible to prevent bit loss that may occur by using the transform picture reference inter prediction.

Figure 21:
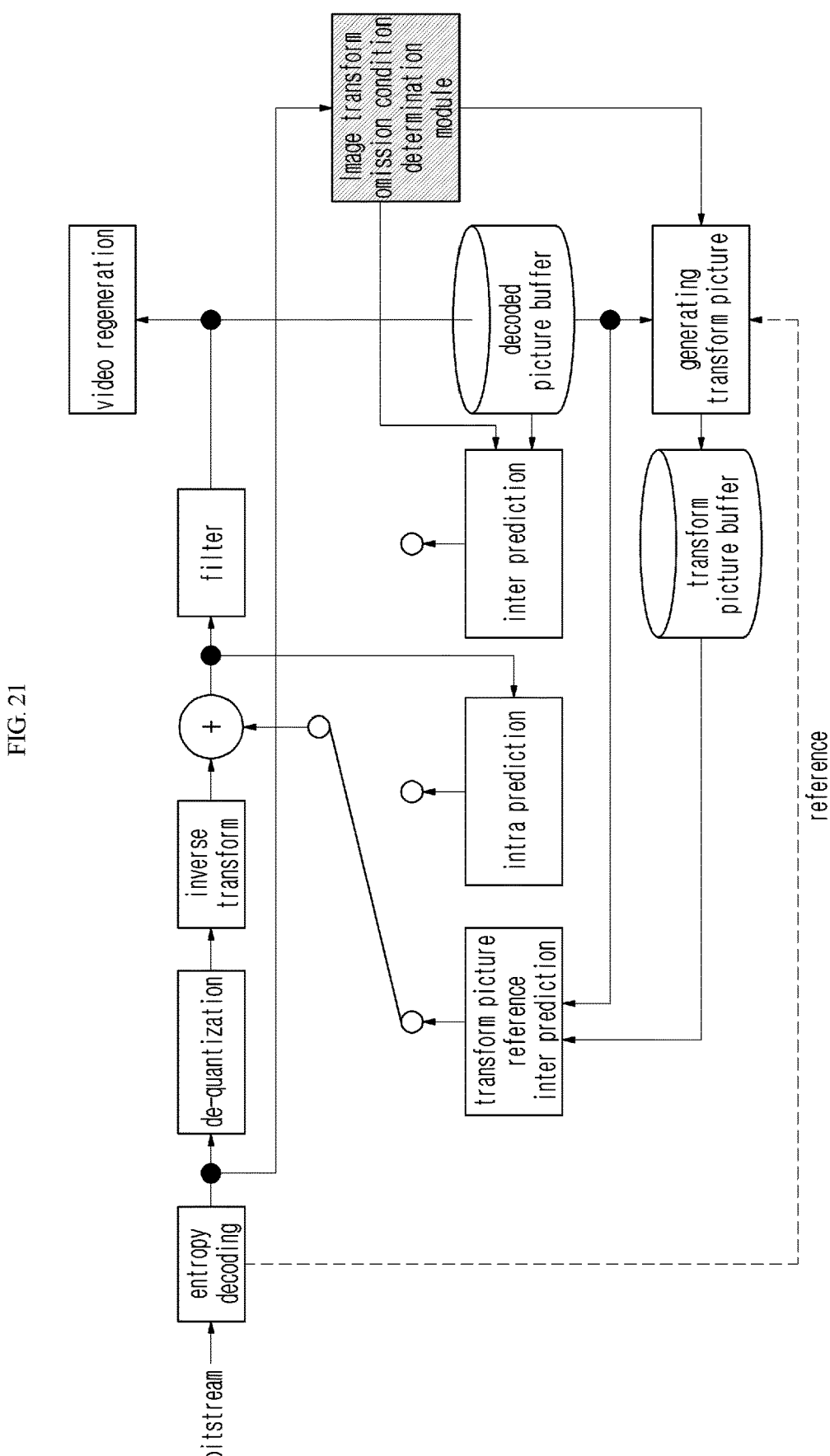
FIG. 21 is a diagram illustrating an embodiment of a decoder, as a video decoder using transform information, which further includes an image transform omission condition determination module.

FIG. 21 is a diagram illustrating an embodiment of a decoder, as a video decoder using transform information, which further includes an image transform omission condition determination module.

The image transform omission condition determination module of the video decoder receives information on whether transform picture reference is omitted from the encoder, determines whether to receive the transform information and whether to generate the transform picture, and performs the decoding process.

According to the present invention, it is possible to increase the compression efficiency by eliminating the redundant prediction information in the process of encoding/decoding a video, and to omit the redundant process of deriving the prediction information, thereby reducing the complexity.

In the meantime, according to the present invention, there is provided a method and an apparatus for encoding/decoding an image on the basis of a geometric transform reference picture.

Further, according to the present invention, there is provided a method and an apparatus for encoding/decoding an image, the method and the apparatus padding the boundary region of the reference picture, thereby enhancing the compression efficiency.

Hereinafter, with reference to FIGS. 22 to 40, the method and the apparatus for encoding/decoding an image on the basis of padding on the boundary region of the reference picture will be described.

Figure 22:
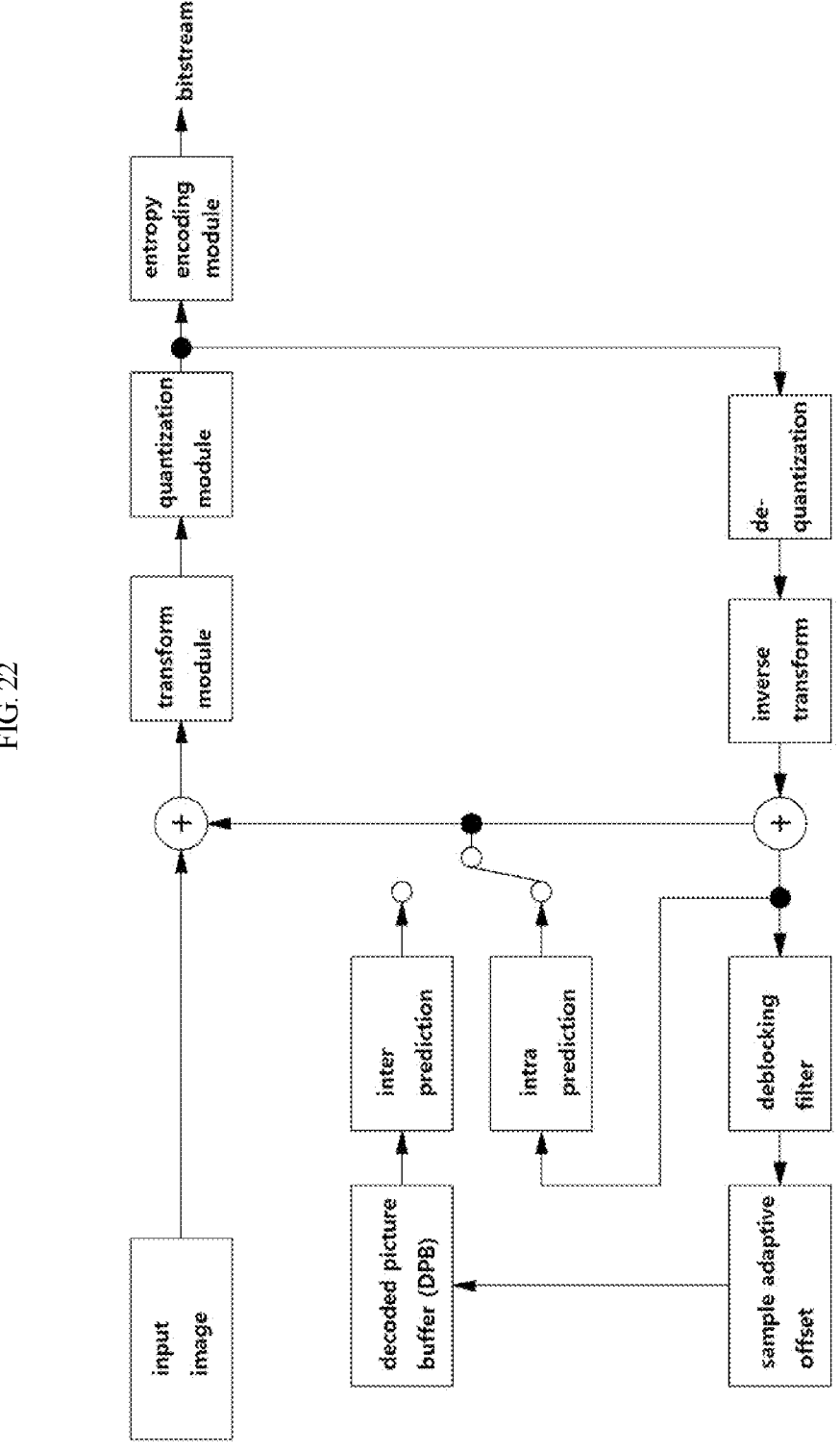
FIG. 22 is a diagram illustrating a HEVC/H.265 encoder system structure according to an embodiment of the present invention.

In the related art, a method of enhancing image coding efficiency by eliminating intra or inter redundancy is used. In order to eliminate intra or inter redundancy, prediction through information with similarity is used. In the case of inter prediction, the fact that the similarity between the current image and the reference picture is high is utilized. The reference picture may mean a reconstructed image obtained by decoding the image that is encoded before the current image. Information on encoding modes such as a pixel value of the current image, a motion vector, a reference picture number, and the like is predicted from the reference picture through inter prediction, so with respect to the pixel value and the encoding modes, only the difference value between the current frame on which encoding or decoding is performed and the reference picture is encoded. Here, when the difference between the reference information used for prediction and an image information value of a current decoding region is small, prediction accuracy is high and coding efficiency increases. FIG. 22 is a diagram illustrating a HEVC/H.265 encoder system structure according to an embodiment of the present invention.

Among the encoding modes, motion information accounts for the largest proportion. The motion information includes information such as a motion vector, a reference image number, a reference direction, and the like, and may be transmitted on a per-prediction unit (hereinafter, referred to as "a PU") basis.

In general, an image has a characteristic that information contains much intra redundancy, and a video has a characteristic that information also contains much inter redundancy. Therefore, when pieces of information of the image are represented by distinguishable symbols, the occurrence frequency of the symbols is biased. As a technique of video encoding using these characteristics, entropy coding is used. The entropy coding is an encoding method considering the occurrence frequency of the symbol of the information, wherein the symbol with high occurrence frequency is represented by a small-size sign and the symbol with low occurrence frequency is represented by a large-size sign, thereby enhancing overall coding efficiency.

In general, a video has global motion and local motion over time in the video. Global motion means motion with the same tendency that the entire image has. Global motion may occur due to camera work or common motion throughout the photographing region.

FIGS. 23A to 23D are diagrams illustrating generation of global motion caused by motion of a camera according to an embodiment of the present invention.

Figure 23A:
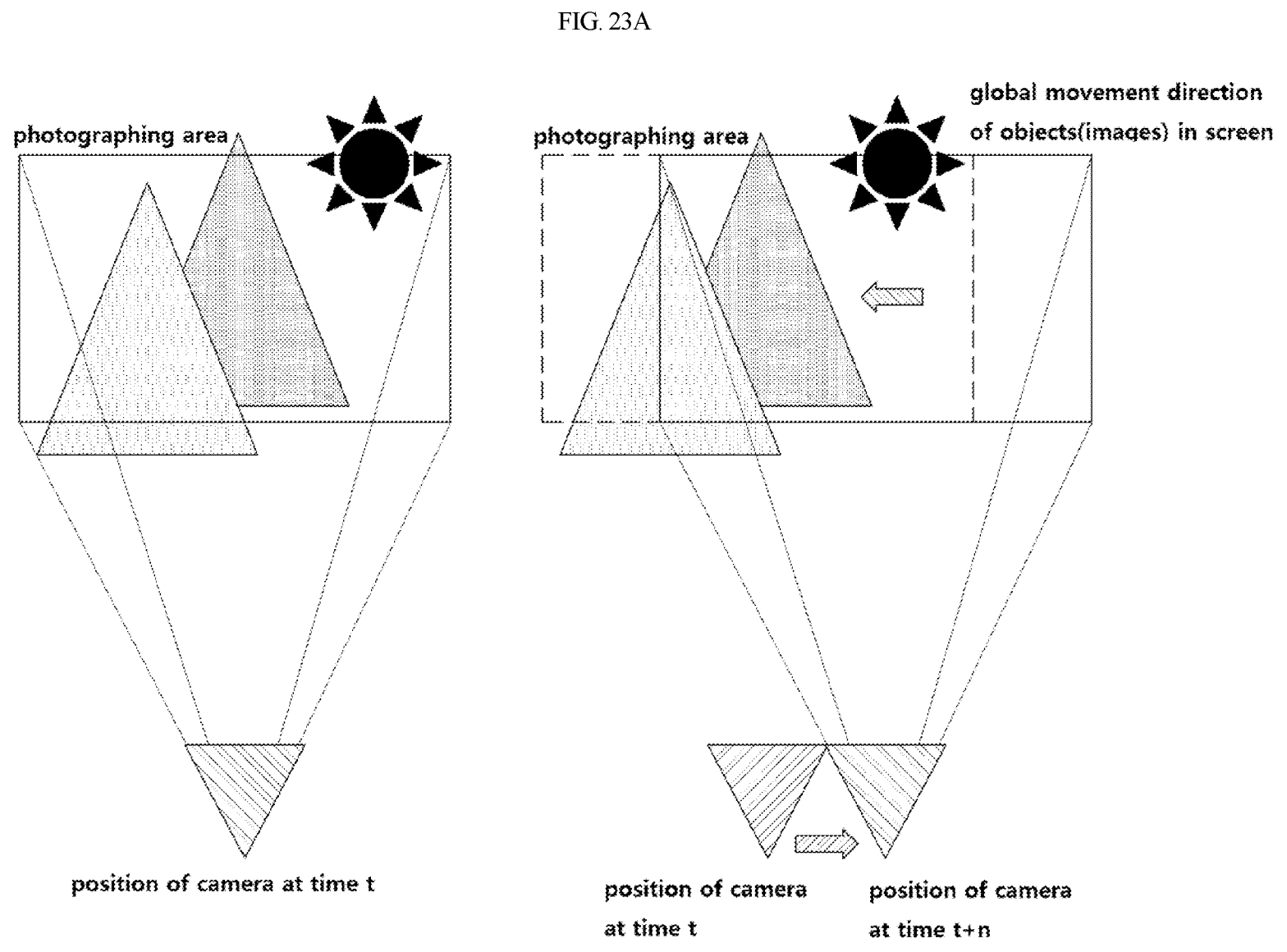

As in the example shown in FIG. 23A, when using camera work with parallel translation, most of the video images have parallel motion in a particular direction. Further, as in the example shown in FIG. 23B, when using camera work rotating the photographing camera, most of the video images have motion rotating in a particular direction. Further, as in the example shown in FIG. 23C, when using camera work moving the camera forward, the video image has motion in the form of zoom-in. Further, as in the example shown in FIG. 23D, when using camera work moving the camera backward, the video image has motion in the form of zoom-out.

In the meantime, local motion may mean motion different from the global motion in an image. That is, the video image may have the global motion as well as additional motion, or may have motion completely different from the global motion. For example, in the image to which the padding technique is applied, when most objects in the image move to the left, if there is an object moving in the opposite direction, the object has local motion.

As a video coding technique reflecting the global motion, there is a coding technique using transform of an image. Image transform may mean that the position of luma information contained in the image is transformed by reflecting geometric motion. Luma information may mean a brightness value, a hue, a chroma, and the like that each point of an image has, and may mean a pixel value in a digital image. Geometric transform means parallel translation, rotation, size change, and the like, of each point having the luma information in the image, and may be used to represent global motion information.

Video coding using image transform is a video coding method that utilizes additional information generated through image transform in the inter prediction technology using the motion information. Additional information (or transform information) means information of all types that makes it possible to more advantageously perform prediction between a referenced image or a partial region thereof and an image performing prediction through reference or a partial region thereof. For example, there may be a global motion vector, an affine transform matrix, a projective transform matrix, a geometric transform matrix (warping matrix), and the like. Further, the transform information may include the global motion information. By utilizing the transform information, it is possible to enhance coding efficiency for an image containing rotation, zoom-in, zoom-out, and the like, which degrade the coding efficiency according to the conventional technology. Transforming an image considering geometric motion of an image, such as parallel translation, rotation, zoom-in, zoom-out, and the like is referred to as geometric transform of an image. A video encoder using geometric transform deduces a relationship between the current picture and the referencing picture and, on the basis of the relationship, generates transform information for transforming the reference picture into the form close to the current picture, thereby generating an additional reference picture (a geometric transform reference picture). Alternatively, it is possible to generate transform information for transforming the current picture into the form close to the reference picture.

In the inter prediction process of the video encoder using geometric transform, the geometric transform reference picture generated through the transform process and/or the original reference picture may be used to find the case for obtaining the optimum coding efficiency.

Figure 24:
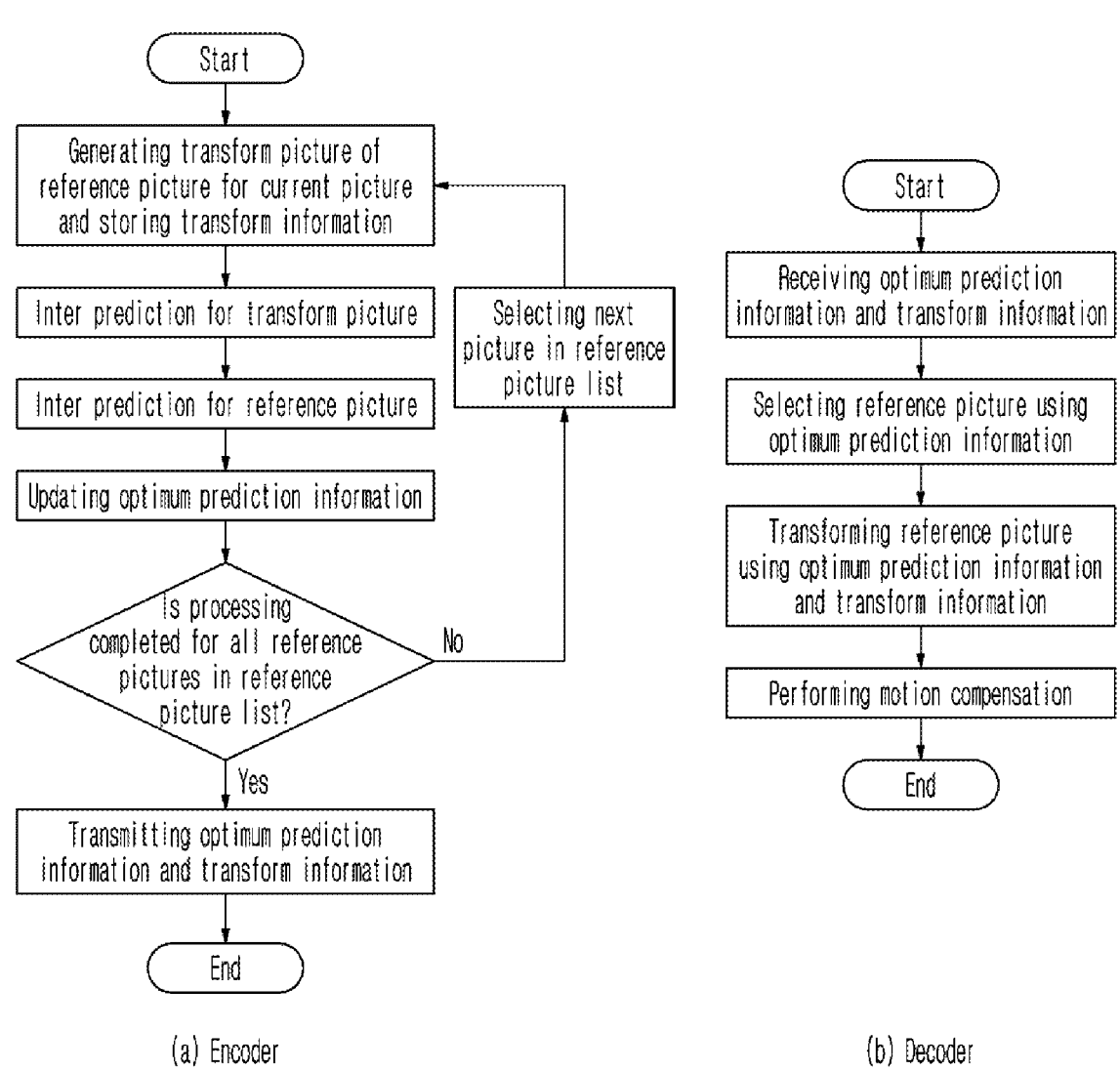
FIG. 24 includes diagrams illustrating a video coding process using geometric transform according to an embodiment of the present invention.

FIG. 24 includes diagrams illustrating a video coding process using geometric transform according to an embodiment of the present invention.

The encoder may perform inter prediction on all reference pictures and transform pictures. Here, the reference picture may mean a general reference picture to which geometric transform is not applied. Further, the transform picture may mean a geometric transform reference picture to which geometric transform is applied.

As shown in the example in FIG. 24 at (a), the encoder may transform each reference picture into the form similar to the current picture through geometric transform to generate the transform picture. Inter prediction may be performed on the generated transform picture, and inter prediction may be performed on the reference picture. On the basis of the result of each inter prediction, the optimum prediction information for achieving high coding efficiency is found for updating. After performing inter prediction on all the reference pictures and the transform pictures, the finally updated optimum prediction information is encoded for transmission to the decoder.

As shown in the example in FIG. 24 at (b), the decoder receives the optimum prediction information from the encoder for decoding, and performs inter prediction through motion correction based thereon. The optimum prediction information may include information required for performing, by the decoder, the case of the optimum prediction efficiency selected by the encoder.

The optimum prediction information may include information indicating which reference picture or which transform picture is the reference picture used in inter prediction. Further, the optimum prediction information may include the transform information, and the transform information may mean information for transforming the reference picture into the transform picture. Further, the optimum prediction information may include information required for motion correction.

Figure 25:
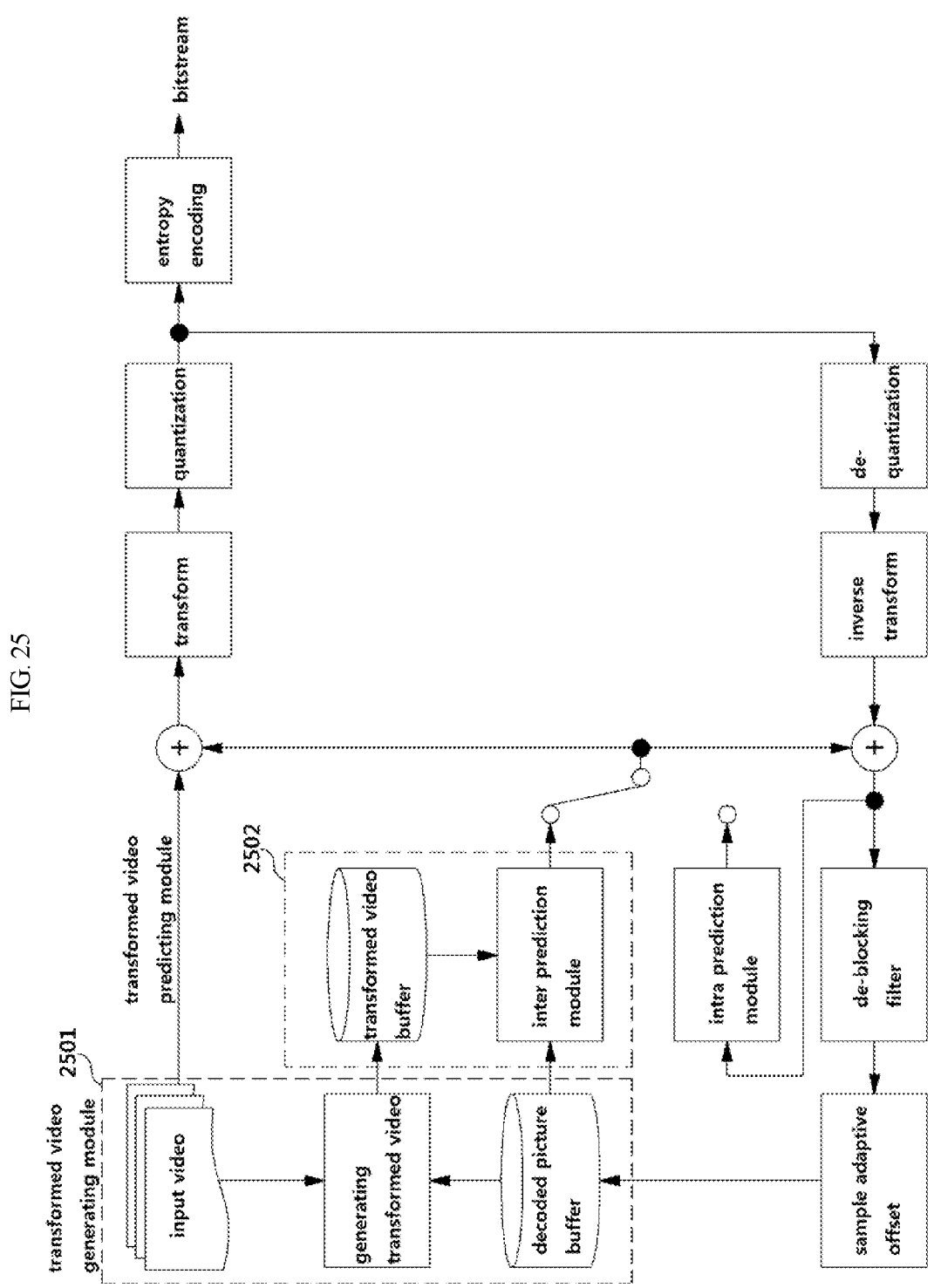
FIG. 25 is a block diagram illustrating a configuration of an apparatus for coding a video by using geometric transform according to an embodiment of the present invention.

FIG. 25 is a block diagram illustrating a configuration of an apparatus for coding a video by using geometric transform according to an embodiment of the present invention.

The transform image generation module 2501 may generate a transform image using the current input image and/or images stored in the decoded image buffer. The transform image means a geometric transform picture, and the transform image generation module 2501 may generate the geometric transform picture. The input image may mean the current picture, and the reconstructed image may mean a general reference picture. The transform image prediction module 2502 may store the generated transform image in the transform image buffer for management, and may perform inter prediction using both the reconstructed image stored in the decoded image buffer and the transform image stored in the transform image buffer. The process other than inter prediction may be the same as the conventional encoding/decoding process.

As the result of encoding, motion information and information on the selected reference picture may be obtained. Information on the selected reference picture may include an index value for identifying the selected reference picture among several reference pictures, and/or a value indicating whether the selected reference picture is the transformed reference picture. The information may be transmitted in various scale units. For example, when applied to a block-based prediction structure, the information is transmitted on a per-coding unit (CU) basis of a per-PU basis.

According to the embodiment of the present invention, the above-described method and/or apparatus may be applied to various video coding methods and/or apparatuses, and each detailed process proposed may be performed in various forms. When necessary, a new detailed process may be added and performed. Further, all of the above-described method and/or apparatus may be used, or a part thereof may be used when necessary.

Inter prediction performed in a general video encoding and decoding process considers that an object or the background in each picture of the video moves over time. Here, inter prediction is performed for each unit after division in the form of a unit, such as a coding unit, a prediction unit, and the like. In each unit, a region having a similar pixel value in a picture of another time zone is found considering motion of the object. In inter prediction, the found region may be represented by the motion information.

Here, the performance range of inter prediction may include a virtual region that is formed larger than the original size of the picture to be coded. However, the virtual region does not have pixel value information, so prediction is impossible or prediction accuracy is degraded, resulting in decrease in the coding efficiency. Alternatively, the prediction unit is reduced, so the coding efficiency decreases.

In the present invention, coding is defined including encoding and decoding.

Figures 26, 27:
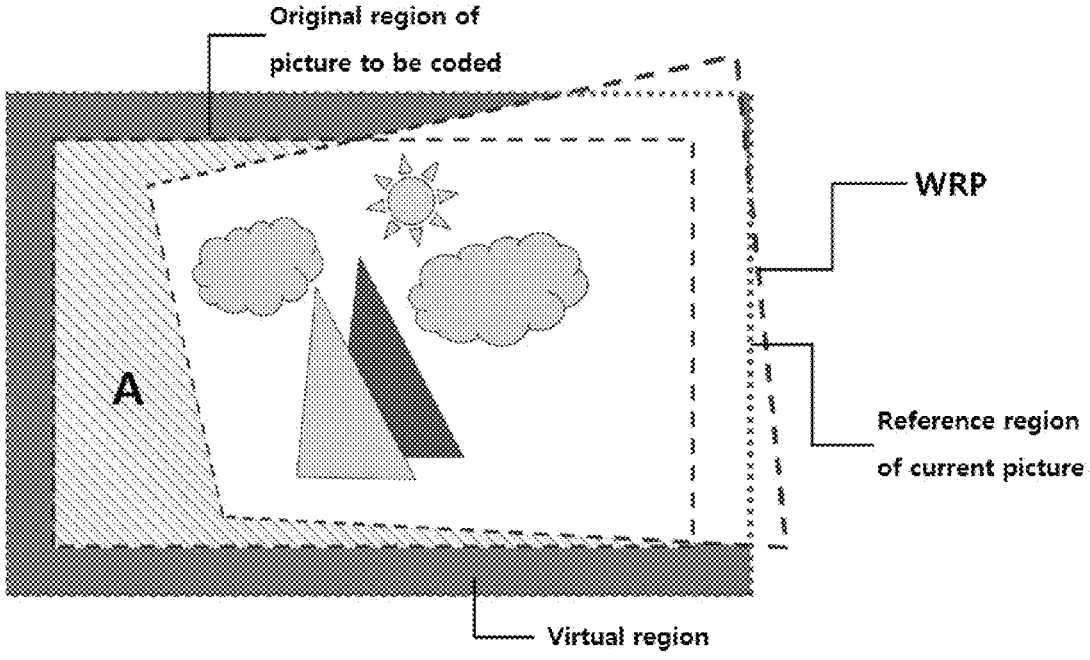
FIG. 26 is a diagram illustrating a reference region and a virtual region in performing inter prediction according to an embodiment of the present invention.
FIG. 27 is a diagram illustrating an example in which a region where pixel value information is not present is generated inside an original region of a picture to be coded in a WRP according to an embodiment of the present invention.

FIG. 26 is a diagram illustrating a reference region and a virtual region in performing inter prediction according to an embodiment of the present invention.

In general, the reference picture has the same size as the original region of the picture to be coded and is present in the same spatial position. For example, referring to FIG. 26, block A corresponds to block A'. Therefore, inter prediction is performed on block A referring to block A'. In inter prediction, condition motion of the image in the screen, a predetermined range from the position to be coded is searched for the region having the most similar pixel value. Here, the search range may deviate from the original region of the picture to be coded. For example, referring to FIG. 26, block A' deviates from the original region of the picture to be coded. In order to perform inter prediction on the region that deviates from the original region of the picture to be coded, in a general video coding method, it is possible to use the virtual region that is formed larger than the original region of the picture to be coded. According to the embodiment of the present invention, the sum of the virtual region and the original region of the picture to be coded may be defined as a reference region, and inter prediction may be performed within the reference region. In general, in the case of the reference picture, the pixel value is not present in the virtual region, so a process of allocating a pixel value to the virtual region is performed, which is called padding of the virtual region.

In the meantime, regarding the geometric transform reference frame or the geometric transform reference picture (a warped reference picture, WRP), when generating the WRP, geometric transform is performed referring to a general reference picture so as to implement the reference picture. Thus, a region where the pixel value information is not present may be generated inside the original region of the picture to be coded.

FIG. 27 is a diagram illustrating an example in which a region where pixel value information is not present is generated inside an original region of a picture to be coded in a WRP according to an embodiment of the present invention.

Since the WRP is generated through geometric transform, the size and the spatial position may be different from those of the original region of the picture to be coded. Therefore, unlike the case where the original region of the picture to be coded and the reference picture have the same size and the same spatial position, in the WRP, the region where the pixel value is not present may be generated even inside the original region of the picture to be coded even if it is not the virtual region.

Referring to FIG. 27, the hatched region A represent the region where the pixel value is not present even inside the original region of the picture to be coded. Further, as shown in the right edge of the figure, in the WRP, the pixel value information of the WRP may be present in a part or all of the virtual region.

According to the embodiment of the present invention, unlike the conventional encoding/decoding method in which a virtual region is defined outside the image size to be coded and only the virtual region where the pixel value is not present is padded, a boundary region is defined as an expanded region in which the virtual region where the pixel value information is not present or a part of the virtual region is combined with the region where the pixel value is not preset, which is generated due to the WRP, inside the original region of the picture to be coded. The boundary region may mean all the regions having no pixel value information in the reference region.

According to the embodiment of the present invention, in the method of encoding/decoding an image by using the WRP, the prediction efficiency of the motion information may be enhanced by padding the boundary region of the reference picture, thereby enhancing the codding efficiency. Here, the WRP may be involved in a case where the actual pixel value is generated and stored as well as a case where the pixel value is deduced virtually from the general reference picture through the global motion information for utilization.

The boundary region may mean a region that belongs to the reference region but not includes the pixel value information. For example, referring to FIG. 27, the boundary region may mean a region in which a region where the pixel value is not present inside the original region of the picture to be coded is combined with the virtual region.

FIG. 28 includes diagrams illustrating a boundary region according to an embodiment of the present invention.

Referring to FIG. 28 at (a), as shown in the right edge, the WRP may deviate from the reference region of the current picture. Since the reference region of the current picture means all the regions that the current picture is able to refer to in inter prediction, information outside the reference region of the current picture may not be used. Therefore, the region of the WRP that deviates from the reference region of the current picture may be removed.

Since the pixel value of the boundary region does not have information, it is impossible to be aware of a correct value. Thus, it is necessary to predict or arbitrarily define the pixel value. Predicting the pixel value of the boundary region or defining a predetermined value for setting is referred to as padding of the boundary region.

FIG. 29 includes block diagrams illustrating a configuration of an encoder/decoder using a padding technique of a boundary region according to an embodiment of the present invention.

Referring to FIG. 29 at (a), a global motion calculation module 2901 of the encoder receives the current picture and the reference picture to derive a relationship by the global motion between the current picture and the reference picture. Further, the global motion calculation module 2901 may process the derived relationship into the form available for encoding/decoding. The result derived by being processed in the global motion calculation module 2901 is referred to as global motion information.

A WRP generation module 2902 may generate the WRP using the global motion information and the reference picture. The WRP may mean a picture obtained by performing geometric transform on the reference picture in the form similar to the current picture.

A boundary region padding module 2903 performs padding on the boundary region of the WRP and the reference picture, thereby obtaining the WRP of which the boundary region is padded.

Referring to FIG. 29 at (b), a global motion decoding module 2911 of the decoder may decode a signal of the global motion information transmitted from the encoder. The decoder is unable to be aware of the information of the current picture, so the decoder decodes the signal transmitted from the encoder to obtain the global motion information.

A WRP generation module 2912 may generate the WRP using the global motion information and the reference picture. The WRP may mean a picture obtained by performing geometric transform on the reference picture in the form similar to the current picture.

A boundary region padding module 2913 performs padding on the boundary region of the WRP and the reference picture, thereby obtaining the WRP of which the boundary region is padded.

Although the encoder and the decoder differ in the method of obtaining the global motion information, the same global motion information is obtained, and through this, the process of generating the WRP and padding the boundary region is performed in the same manner.

Figure 30:
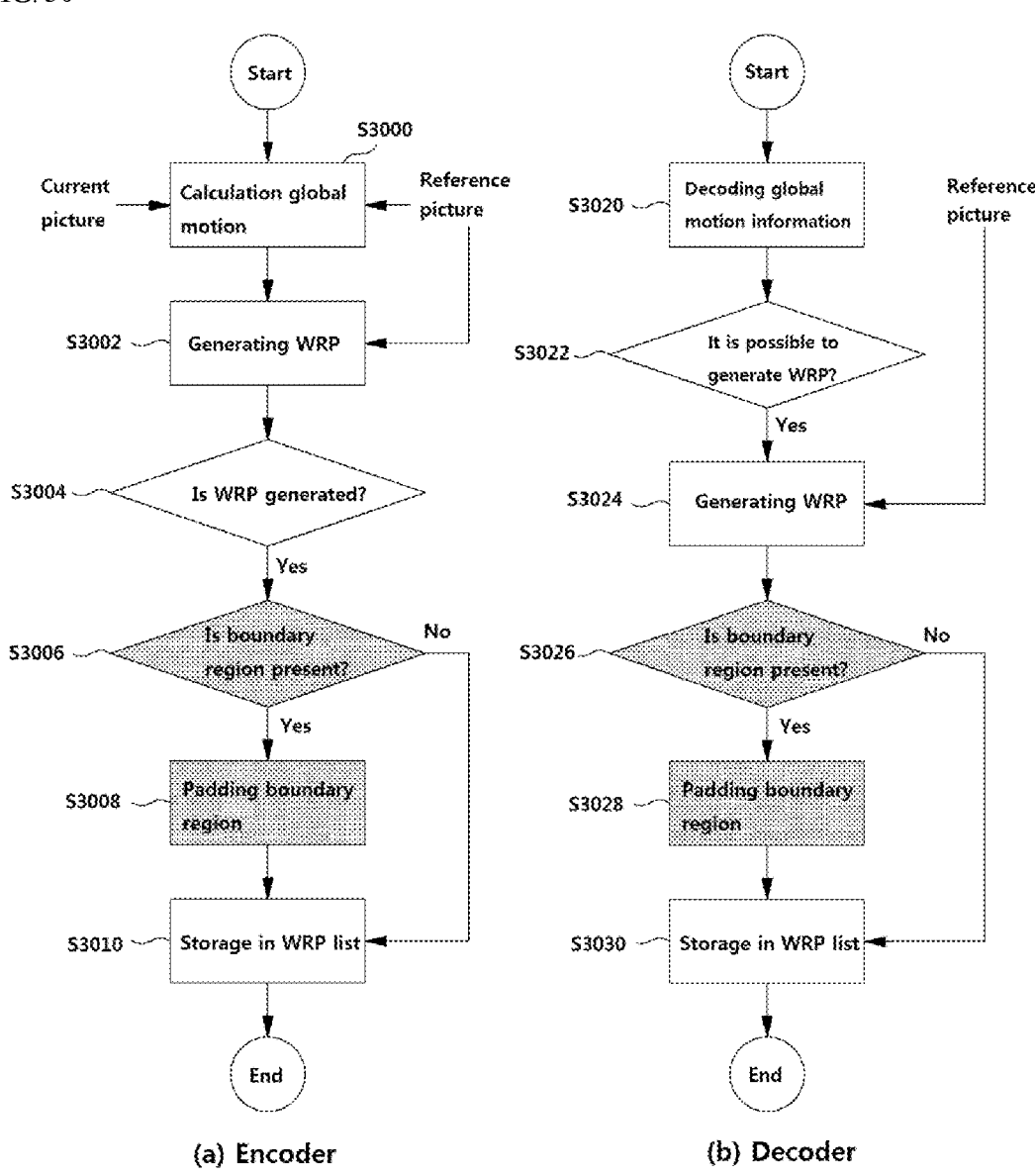
FIG. 30 includes flowcharts illustrating an operation of an encoder/decoder using a padding technique on a boundary region according to an embodiment of the present invention.

FIG. 30 includes are flowcharts illustrating an operation of an encoder/decoder using a padding technique on a boundary region according to an embodiment of the present invention.

Referring to FIG. 30 at (a), the encoder may receive the current picture and the reference picture to derive the relationship by the global motion between the current picture and the reference picture, and may process the derived relationship into the form available for encoding/decoding at step S3000 ("global motion calculation" step). The result derived by being processed at step S3000 is referred to as global motion information.

The WRP may be generated using the global motion information and the reference picture at step S3002 ("WRP generation" step). The WRP means a picture obtained by performing geometric transform on the reference picture in the form similar to the current picture. Further, the WRP may not be generated considering the derivation of the global motion relationship and the coding efficiency.

Whether the WRP is generated may be determined at step S3004 ("Is the WRP generated?" conditional statement step). Step S3004 is a conditional statement for determining whether to perform padding on the boundary region depending on whether the WRP is generated. When the WRP is not generated, boundary region padding of the WRP and boundary region padding using the WRP are not performed. When the WRP is generated, whether the boundary region is present in the WRP is checked.

Whether the boundary region of the WRP is present may be determined, and whether to perform padding on the boundary region may be determined depending on whether the boundary region is present at step S3006 ("Is the boundary region present?" conditional statement step). The WRP may be generated in various forms, and the boundary region may not be present depending on the global motion and the reference region. When the boundary region is present, the boundary region of the WRP is padded. When the boundary region is not present, padding on the boundary region is unnecessary, and is thus omitted.

The boundary region of the WRP or the reference picture may be padded at step S3008 ("boundary region padding" step). As the result of performing step S3008, the WRP of which the boundary region is padded may be obtained.

The generated WRP may be stored in a WRP list at step S3010 ("storage in the WRP list" step). The WRP list may mean a list storing and managing the WRP for inter prediction.

When boundary region padding is performed at step S3008, the WRP of which the boundary region is padded is stored in the WRP list for management. When boundary region padding is not performed, the WRP of which the boundary region is not padded is stored in the WRP list for management.

Referring to FIG. 30 at (b), the decoder may decode the encoded signal of the global motion information at step S3020 ("global motion decoding" step). The decoder and the encoder differ in the process of obtaining the global motion information. Specifically, the decoder is unable to be aware of information of the current picture, so the decoder decodes the signal encoded by the encoder to obtain the global motion information.

Whether it is possible to generate the WRP may be determined at step S3022 ("Is it possible to generate the WRP?" conditional statement step). Step S3022 is a conditional statement for determining whether to perform padding on the boundary region depending on whether it is possible to generate the WRP. When it is impossible to generate the WRP, boundary region padding of the WRP and boundary region padding using the WRP are not performed. Whether it is possible to generate the WRP is determined through decoding of the global motion information. When it is possible to generate the WRP, the WRP is generated.

The WRP may be generated using the global motion information and the reference picture at step S3024 ("WRP generation" step). The WRP may mean a picture obtained by performing geometric transform on the reference picture using the decoded global motion information.

Whether the boundary region of the WRP is present may be determined, and whether to perform padding on the boundary region may be determined depending on whether the boundary region is present at step S3026 ("Is the boundary region present?" conditional statement step). The WRP may be generated in various forms, and the boundary region may not be present depending on the global motion and the reference region. When the boundary region is present, the boundary region of the WRP is padded. When the boundary region is not present, padding on the boundary region is unnecessary, and is thus omitted.

The boundary region of the WRP or the reference picture may be padded at step S3028 ("boundary region padding" step). As the result of performing step S3028, the WRP of which the boundary region is padded may be obtained.

The generated WRP may be stored in a WRP list at step S3030 ("storage in the WRP list" step). The WRP list may mean a list storing and managing the WRP for inter prediction.

When boundary region padding is performed at step S3028, the WRP of which the boundary region is padded is stored in the WRP list for management. When boundary region padding is not performed, the WRP of which the boundary region is not padded is stored in the WRP list for management.

According to the embodiment of the present invention, by padding the boundary region of the WRP, it is possible to enhance the efficiency of the motion prediction coding process referring to the reference region that includes the boundary region. Further, when padding the boundary region of the reference picture including the WRP and the general reference picture, the WRP corresponding to the boundary region is used, thereby enhancing the efficiency of the motion prediction coding process including the boundary region.

Hereinafter, a method of padding the boundary region of the WRP using a fixed value will be described.

According to the embodiment of the present invention, the WRP may be padded using a fixed value, which means that the pixel value corresponding to the boundary region is set to an arbitrarily designated value. The arbitrarily designated value may mean a value that is checked or determined, and encoded by the encoder for transmission to the decoder, and may also mean a value designated in common to the encoder/decoder in the same manner.

Figure 31:
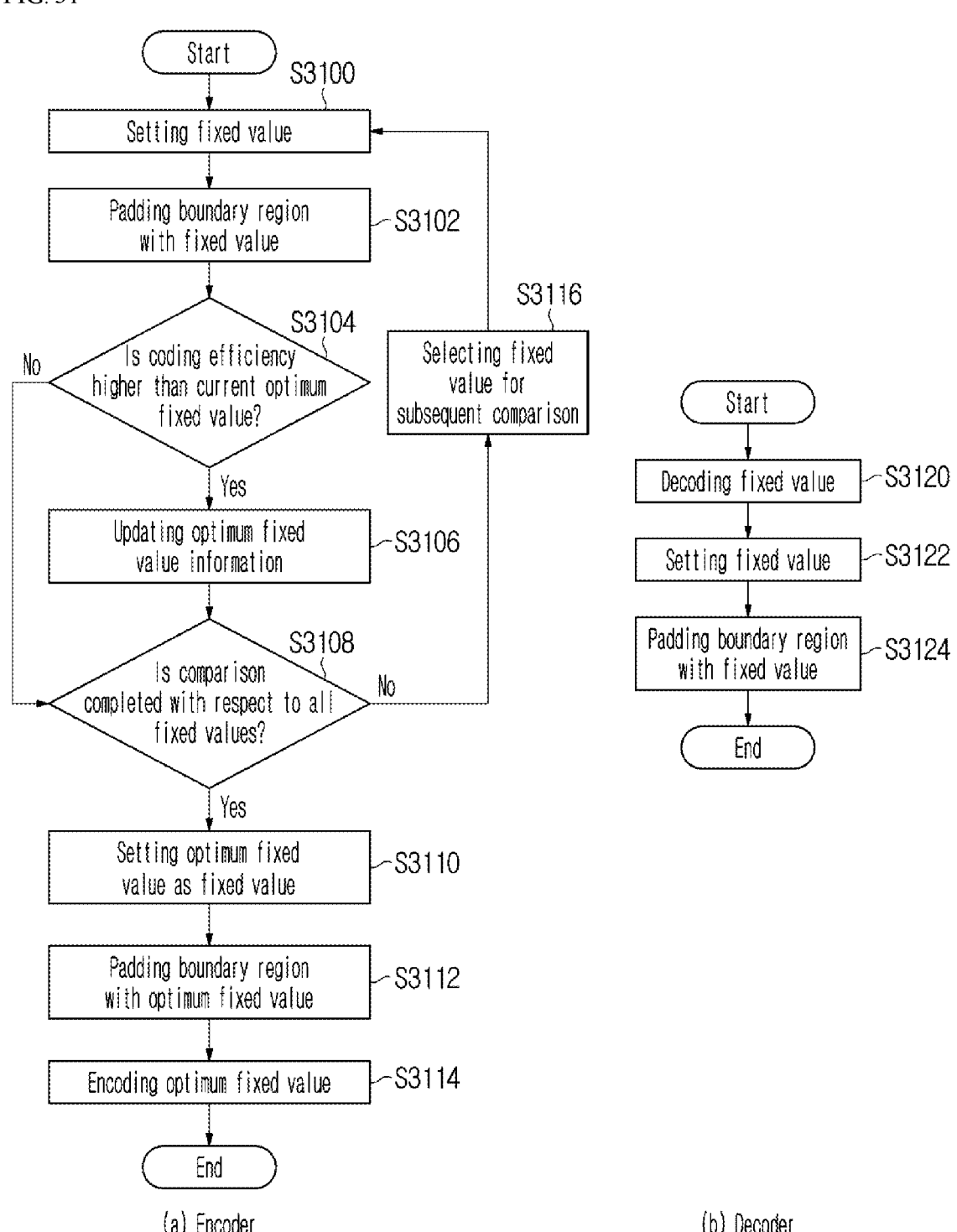
FIG. 31 includes flowcharts illustrating an operation of an encoder/decoder, which includes a process of comparing and determining a fixed value according to an embodiment of the present invention.

FIG. 31 includes flowcharts illustrating an operation of an encoder/decoder, which includes a process of comparing and determining a fixed value according to an embodiment of the present invention.

FIG. 31 at (a) shows a process of padding the boundary region of the geometric transform reference picture with a fixed value by the encoder, and the process may correspond to the operation of the boundary region padding module 2903 in FIG. 29 at (a).

Referring to FIG. 31 at (a), a fixed value may be set at step S3100.

The boundary region may be padded with the fixed value at step S3102.

Whether the coding efficiency is higher than the current optimum fixed value may be determined at step S3104.

As the result of the determination at step S3104, when the coding efficiency is higher than the current optimum fixed value, the optimum fixed value information is updated at step S3106.

Whether the comparison is completed with respect to all the fixed values may be determined at step S3108.

As the result of the determination at step S3108, when the comparison for all the fixed values is completed, setting of the optimum fixed value is completed at step S3110.

With the optimum fixed value set at step S3110, the boundary region may be padded at step S3112.

The optimum fixed value may be encoded at step S3114.

FIG. 31 at (b) shows a process of padding the boundary region of the geometric transform reference picture with a fixed value by the decoder, and the process may correspond to the operation of the boundary region padding module 2913 in FIG. 29 at (b).

The fixed value may be decoded at step S3120.

The fixed value may be set at step S3122.

Using the fixed value set at step S3122, the boundary region may be padded at step S3124.

FIG. 32 includes flowcharts illustrating an operation of an encoder/decoder using a specified fixed value according to an embodiment of the present invention.

Compared to the operation in FIG. 31 at (a) and 31 at (b), the encoder/decoder in FIG. 32 at (a) and 32 at (b) may omit the step of comparing and determining the fixed value and may use an arbitrarily specified fixed value. In the meantime, the step of comparing and determining the fixed value may be performed on the basis of the change in coding efficiency caused by the fixed value. Further, the step of comparing and determining the fixed value may be performed through comparison with the nearby value of the boundary region. Further, the step of comparing and determining the fixed value may be performed through the change in predicted coding efficiency.

Figure 33:
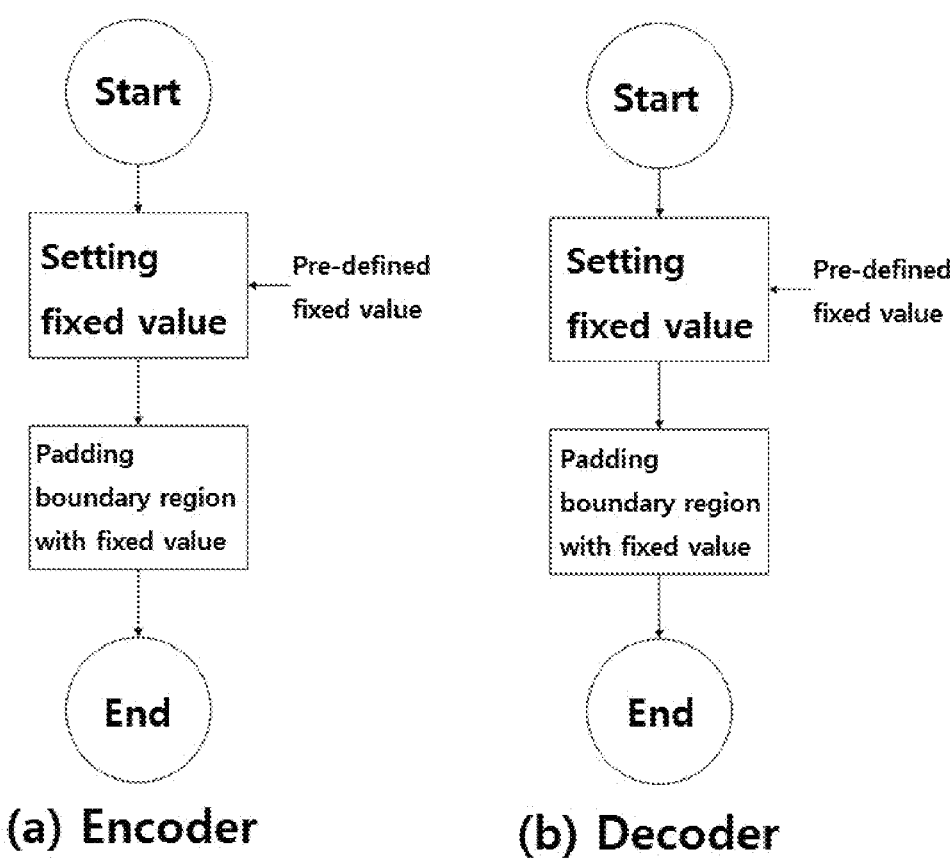
FIG. 33 includes flowcharts illustrating an operation of an encoder/decoder using a fixed value that is pre-defined in the encoder/decoder in the same manner according to an embodiment of the present invention.

FIG. 33 includes flowcharts illustrating an operation of an encoder/decoder using a fixed value that is pre-defined in the encoder/decoder in the same manner according to an embodiment of the present invention.

Referring to FIG. 33 at (a) and FIG. 33 at (b), the encoder/decoder predefines a fixed value (or an arbitrarily designated value) in the same manner, so padding with the same value is performed even though a signal transmission and reception (encoding/decoding) process is omitted. Hereinafter, a method of setting the fixed value according to an embodiment of the present invention will be described.

For example, after padding with all the pixel values, the optimum value is selected, thereby setting the fixed value. It is possible to check what pixel value for padding achieves the optimum coding efficiency by substituting all the pixel values one by one. In this case, at step S3116 ("selection of next comparison fixed value" step) in FIG. 31 at (a), as a fixed value candidate to be selected, all the available pixel values are possible. In the above method, all cases are compared, so computation complexity is the highest, but the coding efficiency may be enhanced. However, it may be necessary to transmit and receive a signal for informing of the fixed value.

As another example, the fixed value may be set by selecting one from several determined pixel values. Comparing all the pixel values has high computational complexity, so some values calculated at predetermined intervals or statistically are defined in advance and one of the values is selected for utilization. In this case, at step S3116 ("selection of next comparison fixed value" step) in FIG. 31 at (a), the fixed value candidate to be selected may be sifted out in advance. The fixed value candidates sifted out may be defined in advance in the encoder and the decoder in the manner, but the fixed value candidates may be transmitted and received through an additional signal. Compared to the method of comparing all the pixel values, the number of cases is reduced, so computational complexity is low. Further, although it is necessary to transmit and receive a signal for informing of the fixed value, the number of cases is reduced compared to the method of comparing all the pixel values, so the coding efficiency of the signal to be transmitted and received may be enhanced.

As still another example, the fixed value may be selected considering a range of values that the pixel values may have. A range of values that the pixel value of the image may have is determined. For example, in the case of an image of 8-bit depth, the range of values that each pixel may have is from zero to 255. Considering the range of pixel values, the smallest value, the largest value, the median value, and the like may be selected for utilization. For example, in the image of 8-bit depth, when the median value is selected as the fixed value, a value of 128 is selected as the fixed value. Further, an arbitrarily specified value may be set within a range of a predetermined value. FIG. 32 at (a) and FIG. 32 at (b) show an example of a case where an arbitrarily specified value is set. Since the fixed value is selected according to the determined case, the comparison and selection process is eliminated, thereby reducing the computational complexity. Further, since it is defined in advance which value to be selected, transmission and reception of the signal for informing of the fixed value may be omitted. FIG. 33 at (a) and FIG. 33 at (b) show an example of a case where the encoder and the decoder set the same value in advance, so transmission and reception of the signal for informing of the fixed value are omitted.

Hereinafter, a padding method using a picture will be described.

Pixel values of a boundary region may be referenced from a picture having the boundary region or another picture. Here, pictures that have referenced may include the general reference picture, the WRP, a picture to be encoded currently, and the like.

When using the general reference picture or the WRP, only a particular picture is used, or multiple general reference pictures or WRPs may be used. The boundary region may be padded using the pixel value or the pixel region of the referencing picture. When using the picture to be encoded currently, there may be a region that the decoder is unable to refer to. When the boundary region is padded using the region that the decoder is unable to refer to, it is necessary to transmit and receive a signal for the same decoding. In the case of a pre-decoded region that the decoder is able to refer to, the encoder and the decoder refer to the current picture of the pre-decoded region in the same manner, so transmission and reception of the signal are omitted. In the case of using multiple pictures, pictures of different types such as the general reference picture and the WRP, or the WRP and the current picture may be used.

For example, the adjacent pixel may be used.

When padding the boundary region of the WRP, padding is performed using the pixel value of the pixel closest to the pixel position of the boundary region from the referencing picture. There are various methods of determining an adjacent pixel to be used, for example, a method of calculating the Euclidean distance, a method using the x-axis distance, a method using the y-axis distance, a method using a city-block distance, a method using a chessboard distance, and the like. Alternatively, only a particular pixel may be selected according to the determined method and the boundary region may be padded with the corresponding pixel value.

Figure 34:
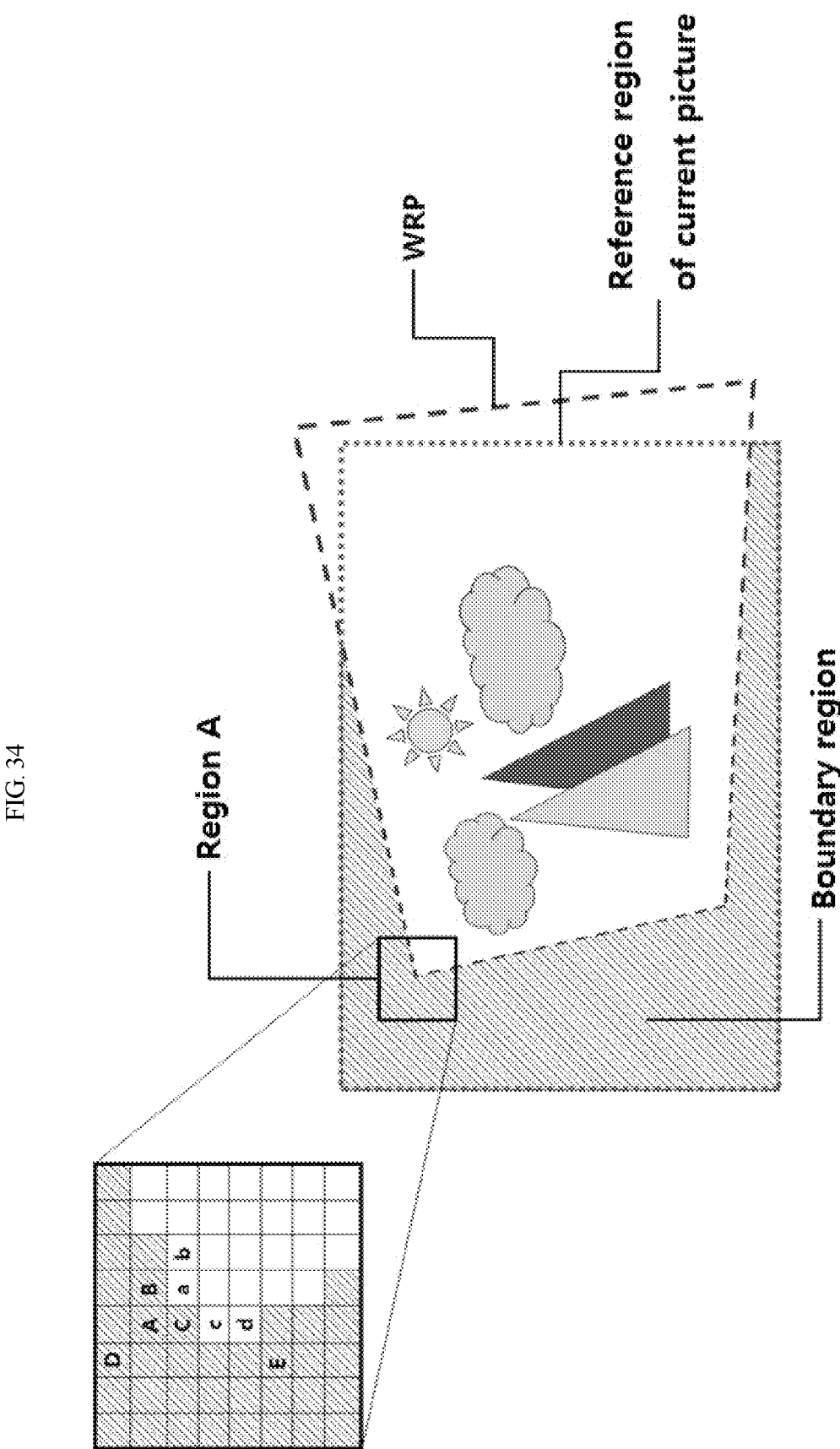
FIG. 34 is a diagram illustrating a boundary region padding process using an adjacent pixel according to an embodiment of the present invention.

FIG. 34 is a diagram illustrating a boundary region padding process using an adjacent pixel according to an embodiment of the present invention.

Referring to FIG. 34, the upper left grid pattern is that region A is enlarged, and each of the small squares means a pixel. The pixel value of the hatched boundary region may be padded from the WRP region in white. Here, when using the pixel of the closest WRP, the value of pixel A is padded from the value of pixel a. Further, the value of pixel B may be padded from the value of pixel a. Further, the value of pixel C may be padded from the value of pixel a or pixel c. Further, the value of pixel E may be padded from the value of pixel d. Further, the value of pixel D may be padded from the value of pixel a. The above process may be performed in the entire boundary region in the same manner rather than only in region A.

In the meantime, multiple adjacent pixels may be used rather than only one adjacent pixel. For example, in FIG. 34, in the case of pixel C, the distance from pixel C to pixel a is the same as the distance from pixel C to pixel c. Therefore, padding may be performing using the average value of two pixels. In the case of pixel B, pixel a is the closest pixel, but pixel b is also the very adjacent pixel, so padding may be performed through the weighted average. Not only two pixels but also multiple pixels may be selected, and all the pixels within a predetermined distance may be used. As the above-described method, by using multiple pixels, more appropriate padding may be performed.

As another example, an average pixel value may be used. A particular region may be designated from the referencing picture, and padding may be performing using the average of pixel values of the region. Here, the particular region may mean the entire referencing picture, a region within a predetermined distance from the pixel position in the boundary region, a partial region designated according to the pixel position in the boundary region, a region corresponding to a set or a subset of pixels of a portion that meshes with the boundary region, and the like. For example, in FIG. 34, when region A is a designated partial region, the average of pixel values of the WRP region corresponding to region A is set as the pixel value in the boundary region of region A. In the meantime, the average value may mean an arithmetical average, a geometrical average, a weighted average, a median, and the like.

As still another example, a reference picture region may be used.

The reference picture region may mean a set of partial or all pixel values of a referencing picture. According to the embodiment of the present invention, the reference picture region may be fetched to or may be matched to the boundary region for use.

Figure 35:
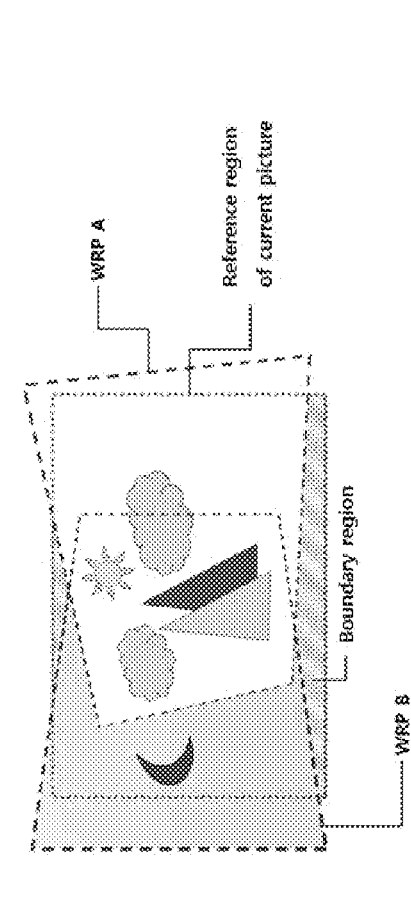
FIG. 35 includes diagrams illustrating a boundary region padding process using a WRP region according to an embodiment of the present invention.

FIG. 35 includes diagrams illustrating a boundary region padding process using a WRP region according to an embodiment of the present invention.

For example, as shown in FIG. 35 at (a) and FIG. 35 at (b), when multiple WRPs are present, WRP B has image information corresponding to the boundary region of WRP A. Conversely, WRP A may have image information corresponding to the boundary region of WRP B. In this case, as shown in the example in FIG. 35 at (c), regarding the boundary region of WRP A, the boundary region may be padded by fetching or matching corresponding pixel values in WRP B. Further, regarding the boundary region of WRP B, the boundary region may be padded by fetching or matching corresponding pixel values in WRP A. In the meantime, in the process of fetching the pixel values corresponding to the boundary region, a process of finding the position corresponding to the boundary region or of performing prediction to correct the position may be included.

Figure 36:
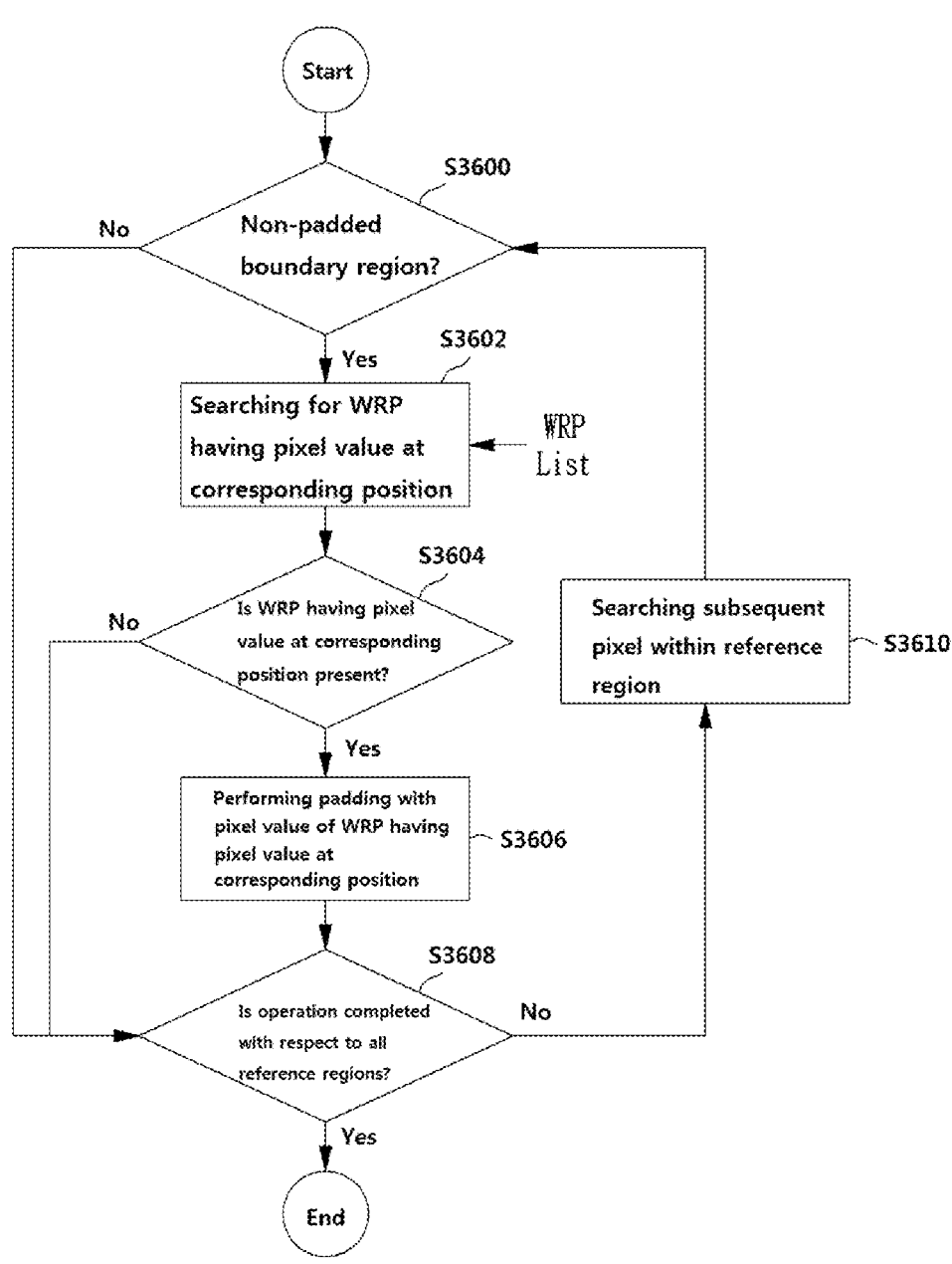
FIG. 36 is a flowchart illustrating a boundary region padding process using a WRP region according to an embodiment of the present invention.

FIG. 36 is a flowchart illustrating a boundary region padding process using a WRP region according to an embodiment of the present invention.

For a non-padded boundary region, among all the WRPs in the WRP List, the WRP having the pixel value at the corresponding position is found and the boundary region is filled with the pixel value at the corresponding position, thereby performing padding. Here, the WRP list may mean a set of all the WRPs that the current picture is able to refer to. Further, the corresponding position may mean the case of the same spatial coordinates of the reference regions in different reference pictures.

Whether the region is a non-padded boundary region may be determined at step S3600.

As the result of the determination at step S3600, when the region is the non-padded boundary region, the WRP having the pixel value at the corresponding position is found at step S3602. Here, the meaning of having the pixel value at the corresponding position may be that the corresponding position is not the boundary region. Further, a case where padding is performed even though the corresponding position is the boundary region may be involved.

Whether there is a WRP having the pixel value at the corresponding position may be determined at step S3604.

As the result of the determination at step S3604, when the WRP having the pixel value at the corresponding position is present, padding is performed using the pixel value of the WRP that has the pixel value at the corresponding position at step S3606.

Referring to FIG. 35, assuming that the leftmost and topmost coordinates in the reference region of the current picture are (0,0), it is found that the position of (0,0) in FIG. 35 at (a) is the boundary region. In FIG. 35 at (b), the position of (0,0) belongs to WRP B, thus having a pixel value. Here, the position of (0,0) in FIG. 35 at (a) and the position of (0,0) in FIG. 35 at (b) are corresponding positions, and at the position of (0,0) in FIG. 35 at (a), FIG. 35 at (b) is "the case of having the pixel value at the corresponding position". Conversely, at the position of (0,0) in FIG. 35 at (b), the corresponding position is the boundary region, so FIG. 35 at (a) is "the case of not having the pixel value". Therefore, in the boundary region of WRP A, the position of (0,0) may be padded with the pixel value of the position of (0,0) in WRP B.

After the operation at step S3606, the operation at step S3608 and/or step S3610 may be performed.

In the meantime, in addition to reference region padding between WRPs, the method shown in FIGS. 34 to 36 may be used for padding between the WRP and the general reference picture.

Figure 37:
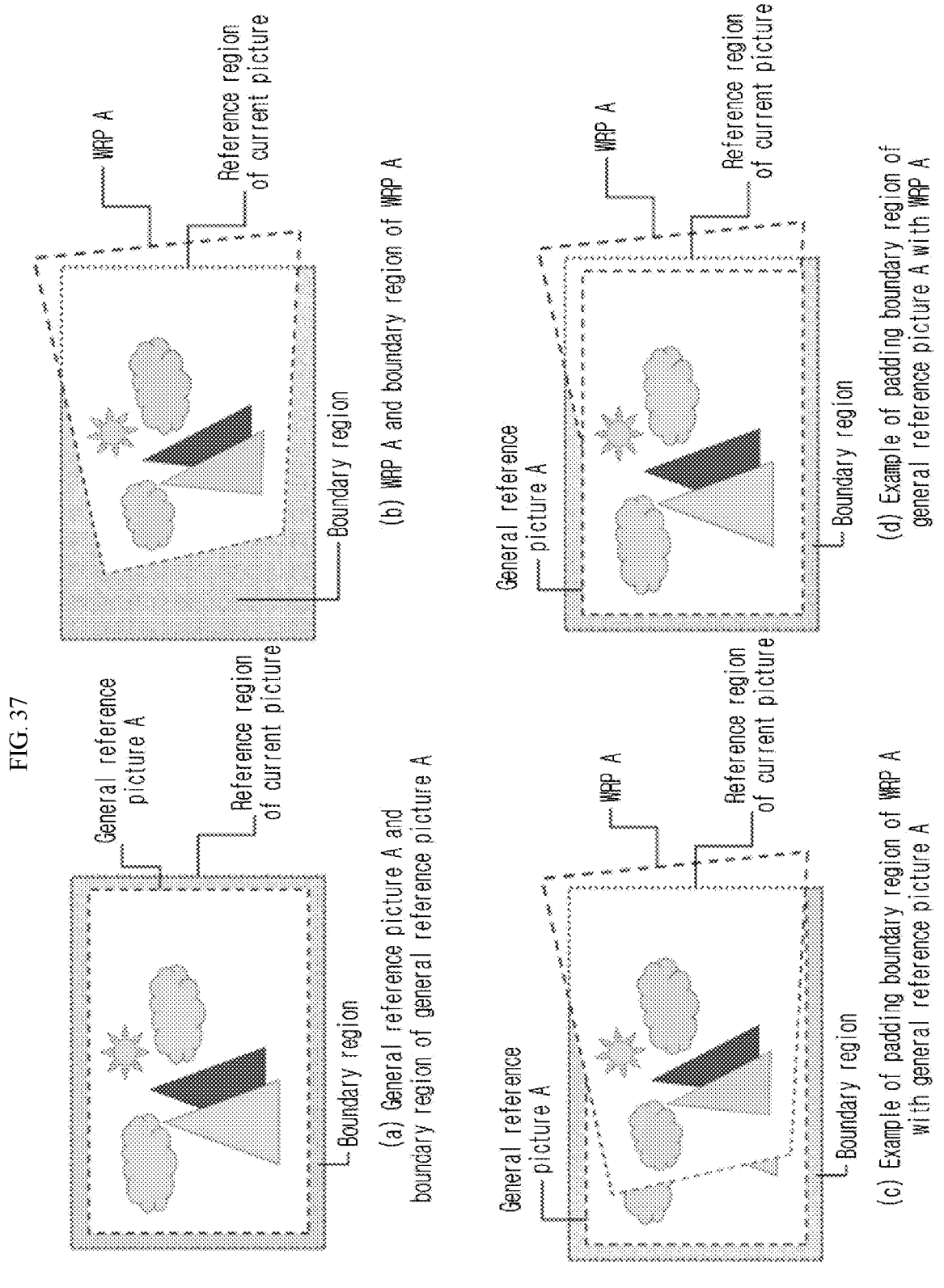
FIG. 37 includes diagrams illustrating a boundary region padding process between a WRP and a general reference picture according to an embodiment of the present invention.

FIG. 37 includes diagrams illustrating a boundary region padding process between a WRP and a general reference picture according to an embodiment of the present invention.

Since the WRP is the reference picture obtained by performing geometric transform on the image to be similar to the picture to be encoded, different WRPs have high similarity and continuity. However, the general reference picture has not subjected to the geometric transform process to be similar to the picture to be encoded, so such similarity or continuity is low. However, considering the characteristic of video frames having spatiotemporal similarity, the general reference picture also have similarity, so boundary region padding using the reference picture region from the general reference picture may be used for the boundary region of the WRP. Further, in this case, it is expected that the coding efficiency of an additional signal caused by selective use of the WRP and the general reference picture is enhanced. That is, this is the case where the WRP is used although prediction similar to the general reference picture is performed on the boundary region part of the WRP. Thus, the change in the signal indicating whether the WRP and the general reference picture are selected is reduced, which is advantageous for entropy coding, and the like.

According to the embodiment of the present invention, the above-described methods in FIGS. 31 to 37 may be used in combination for padding.

In addition to the above-described padding method, there are various padding methods. The padding methods have respective advantages and disadvantages, and may be used in different cases. Therefore, in order to obtain better padding effect, multiple padding methods may be used in combination.

For example, according to a preset setting value, it is possible to select one of multiple padding methods or multiple padding methods for use.

As another example, the padding method may be selected according to predetermined conditions such as the position and the characteristic of the boundary region, presence of other WRPs, comparison of efficiency after performance, and the like. Further, the padding method to be used may be selected differently depending on in units of a video, a sequence, a GOP, a slice, a frame, the position within the boundary region, the characteristic within the boundary region, and the like.

As another example, multiple padding methods may be used in a merged manner. For example, in the case of a method using the closest pixel and a method using an average pixel value, the average of the results obtained by performing the two methods on each pixel in the boundary region may be used as the pixel value. Alternatively, weighting factors may be applied to regions so as to generate the pixel value using the weighted average. The merging method may be applied to multiple available padding methods. Alternatively, as shown in the example in FIG. 35 at (c), when padding the boundary region by utilizing the pixel value of the other WRP corresponding to the boundary region of the WRP, padding is performed on the remaining boundary region by using the fixed value, or padding of the boundary region is performed using the adjacent pixel or the average pixel value.

According to the embodiment of the present invention, the padding value may be corrected. The effect of padding may be further enhanced by correcting the padded value. The correction methods may include various methods such as blurring, brightness change, filtering, gradation, and the like. Different methods may be used for each determined section or region, or multiple methods may be used in combination.

Blurring means that the pixel value within the image is transformed to be similar to the nearby pixel value considering the nearby pixel value, and the like. This has the same meaning as eliminating or reducing the high frequency component of the image or strengthening the low frequency component. Regarding the pixel value of the padded boundary region within the WRP, a phenomenon that the pixel value rapidly changes at the boundary of the non-boundary region may occur depending on the padding method. This rapid change in the pixel value may cause a reduction of the prediction efficiency in image encoding or a reduction of the coding efficiency due to generation of the high frequency component. Therefore, by using blurring at the boundary between the boundary region within the WRP and the non-boundary region, it is possible to prevent the rapid change of the pixel value and prevent the reduction of the coding efficiency.

Figure 38:
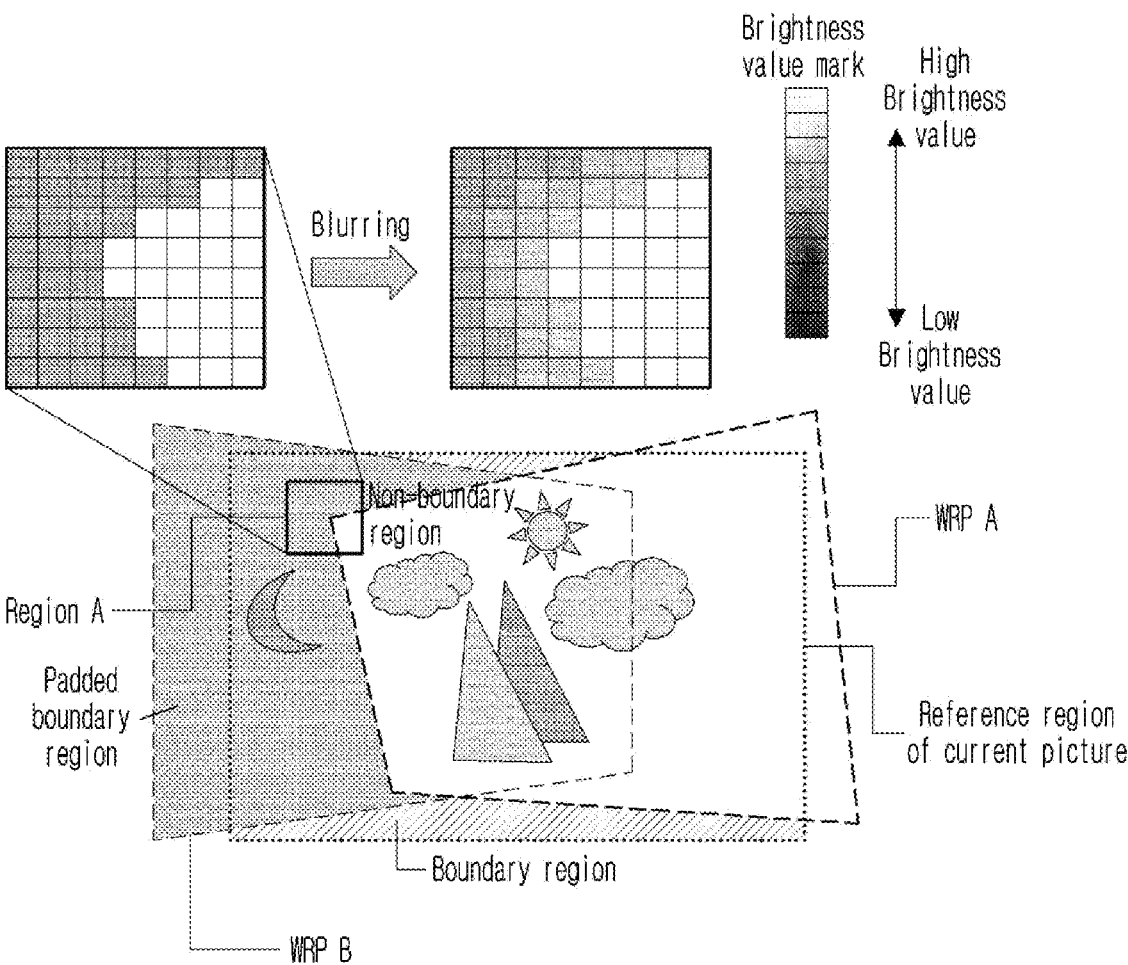
FIG. 38 is a diagram illustrating a boundary region padding correction process using a blurring method according to an embodiment of the present invention.

FIG. 38 is a diagram illustrating a boundary region padding correction process using a blurring method according to an embodiment of the present invention.

Referring to FIG. 38, the boundary region of WRP A is padded using WRP B that has the pixel value corresponding to the boundary region of WRP A. Since WRP B has dark pixel values overall compared to WRP A, it is found that the brightness value rapidly changes at the boundary between the boundary region padded using WRP B and the non-boundary region which is the region of WRP A. Here, blurring may be performed on region A. When comparing the enlarged portion of region A after blurring with the enlarged portion of region A before blurring, it is found that at the boundary portion with the non-boundary region, the pixel value of the padded boundary region is changed to the brightness value similar to that of the non-boundary region.

In the meantime, blurring at the boundary region of the WRP may use the global motion information to distinguish the boundary region and the non-boundary region. Further, the contact line between the boundary region and the non-boundary region may not be horizontal or vertical, so the operation is performed considering the geometric shape.

Figure 39:
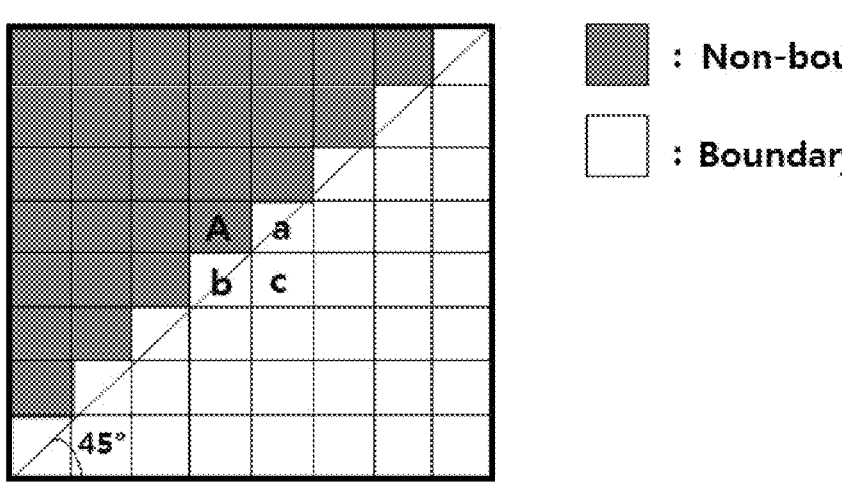
FIG. 39 is a diagram illustrating a blurring method considering a geometric shape according to an embodiment of the present invention.

FIG. 39 is a diagram illustrating a blurring method considering a geometric shape according to an embodiment of the present invention.

Referring to FIG. 39, when the boundary between the boundary region and the non-boundary region is in a diagonal direction at an angle of 45 degrees, the value of pixel A of the non-boundary region is blurred to be similar to that of pixel c by using pixel c rather than pixel a or pixel b in the boundary region. However, since pixel A is adjacent to pixel a and pixel b, the blurred pixel value may be calculated using the weighted average using both values of pixel a and pixel b.

Further, blurring may be used inside the boundary region in addition to the boundary between the boundary region and the non-boundary region. For example, the prediction efficiency may be reduced because excessive high frequency components remain inside the padding region depending on the padding value. In this case, blurring may be used inside the boundary region to enhance coding efficiency.

A brightness change method is a method of changing the overall brightness of all or a part of the boundary region. When using the padding method using the reference region, even though the padded region and the WRP region relate to the same object or background, the average brightness value may differ due to, for example, fade-in and fade-out effects in an image, temporal change in a photographing environment, and the like. As described above, when the overall brightness of the non-boundary region and the padded boundary region varies, it is possible to make the continuous state between the boundary region and the non-boundary region by brightening or darkening the overall pixels in the boundary region. The coding efficiency may be enhanced by making the non-boundary region and the boundary region to have the continuous state.

Figure 40:
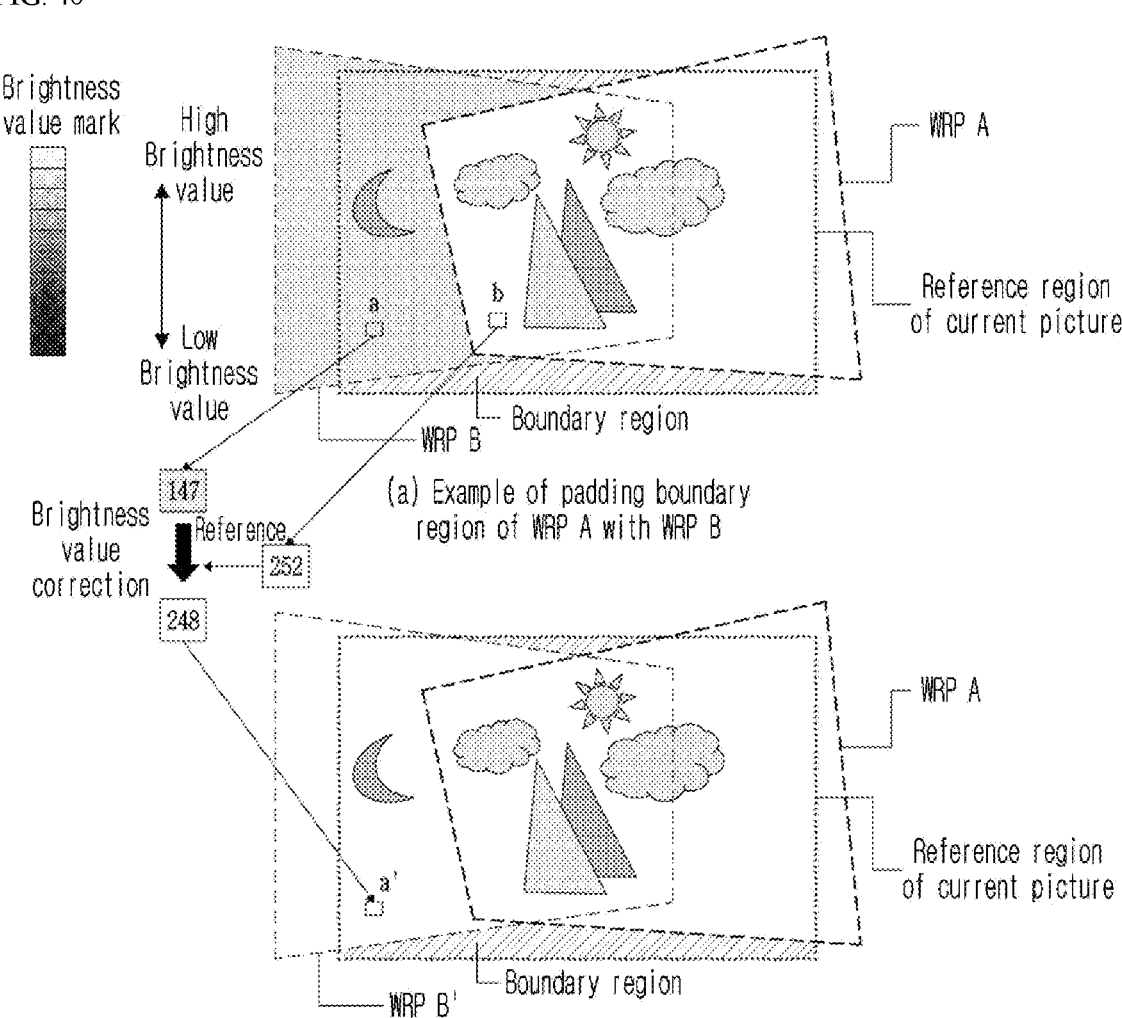
FIG. 40 includes diagrams illustrating a boundary region padding correction method using brightness change according to an embodiment of the present invention.

FIG. 40 includes diagrams illustrating a boundary region padding correction method using brightness change according to an embodiment of the present invention.

FIG. 40 at (a) shows that WRP B used in boundary region padding has overall dart brightness values compared to WRP A. In FIG. 40 at (b), it is found that the boundary region and the non-boundary region are made to have a more continuous state by correcting the brightness difference to increase all the brightness values in the padded boundary region. The letter a denotes a pixel corresponding to the padded WRP B region and the pixel has the brightness value of 147. Further, the letter b is a pixel belonging to the non-boundary region and also denotes a representative pixel indicating the overall brightness of WRP A and having the brightness value of 252. The representative pixel may be obtained at a particular point within the image, but may be calculated through an average of the total brightness of the image. The expression a' denotes pixel a with the brightness value corrected and has the brightness value of 248. The brightness value may be corrected considering the representative pixel indicating the overall brightness of the non-boundary region and the brightness value that means the overall brightness of the padded boundary region. Since the overall brightness value of the padded boundary region is lower than that of pixel b, the pixels belonging to the padded boundary region are corrected to be brighter, thereby making the padded boundary region and the non-boundary region have the continuous state. It is found that pixel a' calculated by correcting pixel a has a brightness value similar to that of pixel b through the above process.

In addition, it is possible to correct the pixel value of the boundary region by constructing an appropriate filter considering the characteristic of the image, and the like and by using the filter. Further, it is possible to correct the pixel value of the boundary region by using gradation. The gradation may mean that the pixel value is corrected by setting gradual and continuous brightness change in pixel values from the boundary between the boundary region and the non-boundary region.

According to the present invention, within the geometric transform reference picture, it is possible to perform padding on the boundary region which is an enlarged region in which the pixel value information is not preset in the reference region, thereby enhancing the prediction accuracy of the encoder/decoder and the coding efficiency.

According to the present invention, there is provided a method of decoding an image, the method including: receiving motion information; obtaining a geometric transform picture (a warped reference picture, WRP) by using the motion information; and performing padding on at least one of boundary regions among the WRP and a reference picture.

In the method of decoding the image according to the present invention, the motion information may include global motion information between a current picture and the reference picture.

In the method of decoding the image according to the present invention, the obtaining of the geometric transform picture may include obtaining the WRP by using the global motion information and the reference picture.

In the method of decoding the image according to the present invention, the performing of padding on the boundary region may include padding the boundary region by using a fixed value.

In the method of decoding the image according to the present invention, the fixed value may be obtained by using at least one among all available pixel values, a predefined pixel value, and a range that a pixel value may have.

In the method of decoding the image according to the present invention, the performing of padding on the boundary region may include performing padding by using at least one picture among a general reference picture, the WRP, and a current encoding target picture.

In the method of decoding the image according to the present invention, the performing of padding by using the at least one picture may include performing padding by using at least one among a pixel adjacent to a pixel of the boundary region, a pixel within a predetermined region, and a reference picture region.

In the method of decoding the image according to the present invention, the method may further include correcting a pixel value of at least one boundary region on which the padding has been performed.

In the method of decoding the image according to the present invention, the correcting may include correcting by using at least one among blurring, brightness change, filtering, and gradation.

In the method of decoding the image according to the present invention, the performing of padding by using the at least one picture may include performing padding by using the WRP having a pixel value at a position corresponding to a padding target pixel in a WRP list.

Further, according to the present invention, there is provided a method of encoding an image, the method including: determining motion information; obtaining a geometric transform picture (a warped reference picture, WRP) by using the motion information; and performing padding on at least one of boundary regions among the WRP and a reference picture.

In the method of encoding the image according to the present invention, the motion information may include global motion information between a current picture and the reference picture.

In the method of encoding the image according to the present invention, the obtaining of the geometric transform picture may include obtaining the WRP by using the global motion information and the reference picture.

In the method of encoding the image according to the present invention, the performing of padding on the boundary region may include padding the boundary region by using a fixed value.

In the method of encoding the image according to the present invention, the fixed value may be obtained by using at least one among all available pixel values, a predefined pixel value, and a range that a pixel value may have.

In the method of encoding the image according to the present invention, the performing of padding on the boundary region may include performing padding by using at least one picture among a general reference picture, the WRP, and a current encoding target picture.

In the method of encoding the image according to the present invention, the performing of padding by using the at least one picture may include performing padding by using at least one among a pixel adjacent to a pixel of the boundary region, a pixel within a predetermined region, and a reference picture region.

In the method of encoding the image according to the present invention, the method may further include correcting a pixel value of at least one boundary region on which the padding has been performed.

In the method of encoding the image according to the present invention, the correcting may include correcting by using at least one among blurring, brightness change, filtering, and gradation.

Further, a computer-readable recording medium according to the present invention may store a bitstream generated by the method or apparatus for encoding the image according to the present invention.

Although the exemplary methods described in the present invention are expressed as a series of operations for clarity of description, the order of the steps is not limited thereto. When necessary, the steps may be performed simultaneously or in a different order. In order to realize the method according to the present invention, other steps may be added to the illustrative steps, some steps may be excluded from the illustrative steps, or some steps may be excluded while additional steps may be included.

The various embodiments of the present invention are not intended to list all possible combinations, but to illustrate representative aspects of the present invention. The matters described in the various embodiments may be applied independently or in a combination of two or more.

Further, the various embodiments of the present invention may be implemented by hardware, firmware, software, or combinations thereof. In the case of implementation by hardware, implementation is possible by one or more application specific integrated circuits (ASICs), digital signal processors (DSPs), digital signal processing devices (DSPDs), programmable logic devices (PLDs), field programmable gate arrays (FPGAs), general processors, controllers, micro controllers, microprocessors, and the like.

The scope of the present invention includes software or machine-executable instructions (for example, an operating system, an application, firmware, a program, and the like) that cause operation according to the methods of the various embodiments to be performed on a device or a computer, and includes a non-transitory computer-readable medium storing such software or instructions to execute on a device or a computer.

The invention claimed is:

1. A method of decoding an image, the method comprising:

obtaining global motion information;

generating, prediction sample of a warping region by performing an inter prediction on the basis of the global motion information; and generating a corrected warping region by correcting a pixel value of the pixel within the predicted warping region using neighboring pixels, wherein the pixel value of the pixel within the warping region is corrected by using the global motion information and a gradual difference between values of the different neighboring pixels adjacent to the pixel within the warping region.

2. The method of claim 1, wherein the global information includes affine transform information.

3. A method of encoding an image, the method comprising:

determining global motion information;

generating, prediction sample of a warping region by performing an inter prediction on the basis of the global motion information; and generating a corrected warping region by correcting a pixel value of the pixel within the predicted warping region using neighboring pixels, wherein the pixel value of the pixel within the warping region is corrected by using the global motion information and a gradual difference between values of the different neighboring pixels adjacent to the pixel within the warping region.

4. A method of storing a bitstream into a non-transitory computer readable recording medium, the method comprising:

determining global motion information;

generating, prediction sample of a warping region by performing an inter prediction on the basis of the global motion information; and generating a corrected warping region by correcting a pixel value of the pixel within the predicted warping region using neighboring pixels, wherein the pixel value of the pixel within the warping region is corrected by using the global motion information and a gradual difference between values of the different neighboring pixels adjacent to the pixel within the warping region.

* * * * *